US008760756B2

(12) United States Patent
Price et al.

(10) Patent No.: US 8,760,756 B2
(45) Date of Patent: Jun. 24, 2014

(54) AUTOMATED SCANNING CYTOMETRY USING CHROMATIC ABERRATION FOR MULTIPLANAR IMAGE ACQUISITION

(75) Inventors: Jeffrey H. Price, Rancho Santa Fe, CA (US); Martin Weinigel, Wittenberg (DE); Derek N. Fuller, San Diego, CA (US); Albert L. Kellner, San Diego, CA (US)

(73) Assignee: Burnham Institute for Medical Research, La Jolla, CA (US)

( * ) Notice: Subject to any disclaimer, the term of this patent is extended or adjusted under 35 U.S.C. 154(b) by 982 days.

(21) Appl. No.: 12/587,923

(22) Filed: Oct. 14, 2009

(65) Prior Publication Data

US 2010/0172020 A1    Jul. 8, 2010

Related U.S. Application Data

(60) Provisional application No. 61/196,190, filed on Oct. 14, 2008.

(51) Int. Cl.
*G02B 21/00*    (2006.01)

(52) U.S. Cl.
USPC .......................................................... 359/368

(58) Field of Classification Search
USPC ............................ 359/379, 382, 383; 250/226
See application file for complete search history.

(56) References Cited

U.S. PATENT DOCUMENTS

| | | | | |
|---|---|---|---|---|
| 4,561,731 A | * | 12/1985 | Kley | .................................. 349/1 |
| 5,161,052 A | | 11/1992 | Hill | .............................. 359/377 |
| 6,038,066 A | * | 3/2000 | Baumann | ...................... 359/368 |
| 6,055,097 A | * | 4/2000 | Lanni et al. | .................... 359/386 |
| 6,188,514 B1 | | 2/2001 | Saito et al. | ..................... 359/381 |
| 6,495,818 B1 | * | 12/2002 | Mao | ............................... 250/226 |
| 6,640,014 B1 | | 10/2003 | Price et al. | ..................... 382/255 |
| 6,674,574 B1 | * | 1/2004 | Aono | ............................ 359/383 |
| 6,847,480 B2 | * | 1/2005 | Steenblik et al. | .............. 359/368 |
| 7,262,419 B2 | | 8/2007 | Richardson | ................ 250/458.1 |
| 7,289,199 B2 | * | 10/2007 | Yonetani et al. | ............... 356/124 |
| 7,493,039 B2 | * | 2/2009 | Yamamoto | .................... 396/430 |
| 7,564,620 B2 | * | 7/2009 | Winterot et al. | .............. 359/381 |
| 8,164,622 B2 | * | 4/2012 | Crandall | ......................... 348/79 |
| 2001/0026400 A1 | | 10/2001 | Yoshikawa | ..................... 359/676 |
| 2002/0113210 A1 | | 8/2002 | Treado et al. | .................. 250/331 |
| 2003/0033090 A1 | * | 2/2003 | Callaway et al. | ................ 702/19 |
| 2003/0112504 A1 | * | 6/2003 | Czarnetzki et al. | ........... 359/383 |
| 2003/0184730 A1 | | 10/2003 | Price | .............................. 356/39 |
| 2004/0159773 A1 | | 8/2004 | Fein et al. | ................... 250/208.1 |
| 2006/0244907 A1 | | 11/2006 | Simmons | ....................... 351/162 |

FOREIGN PATENT DOCUMENTS

| | | | | |
|---|---|---|---|---|
| JP | H07-177527 | | 7/1995 | ............... H04N 9/09 |
| JP | H08-289191 | | 11/1996 | ............. H04N 5/232 |
| JP | 09189849 A | * | 7/1997 | ............... G02B 7/28 |

(Continued)

OTHER PUBLICATIONS

Machine Translation of JP-09189849A from http://www.ipdl.inpit.go.jp/homepg_e.ipdl; document retrieved on Sep. 9, 2013.*

(Continued)

*Primary Examiner* — Frank Font
(74) *Attorney, Agent, or Firm* — Terrance A. Meador

(57) ABSTRACT

In an automated scanning cytometry system, chromatic aberration is used for multiplanar image acquisition.

20 Claims, 40 Drawing Sheets

(56) References Cited

FOREIGN PATENT DOCUMENTS

| JP | 10-221607 | 8/1998 | ............ G02B 21/00 |
| JP | H10-31161 | 10/1998 | ............ G02B 21/02 |
| JP | 11-052255 | 2/1999 | ............ G02B 21/36 |
| JP | 2000-009591 | 1/2000 | ............ G01M 11/00 |
| JP | 2000-512401 | 9/2000 | ............ G02B 21/00 |
| JP | 2005-202092 | 7/2005 | ............ G02B 7/28 |
| JP | 2006-003543 | 1/2006 | ............ G02B 21/26 |
| JP | 2007-047228 | 2/2007 | ............ G02B 21/02 |
| JP | 2008-116900 | 5/2008 | ............ G02B 21/06 |
| JP | 2009-525495 | 7/2009 | ............ G02B 21/00 |
| WO | 2009/055429 A1 | 4/2009 | |

OTHER PUBLICATIONS

Office Action for JP 2011-531034, mailed Dec. 13, 2013, with translation.

International Search Report and Written Opinion, mailed Jan. 29, 2010 in PCT/US09/05633, filed Oct. 14, 2009.

Extended European Search Report, mailed May 24, 2013 in EP 09820901.8.

* cited by examiner

FIG. 17

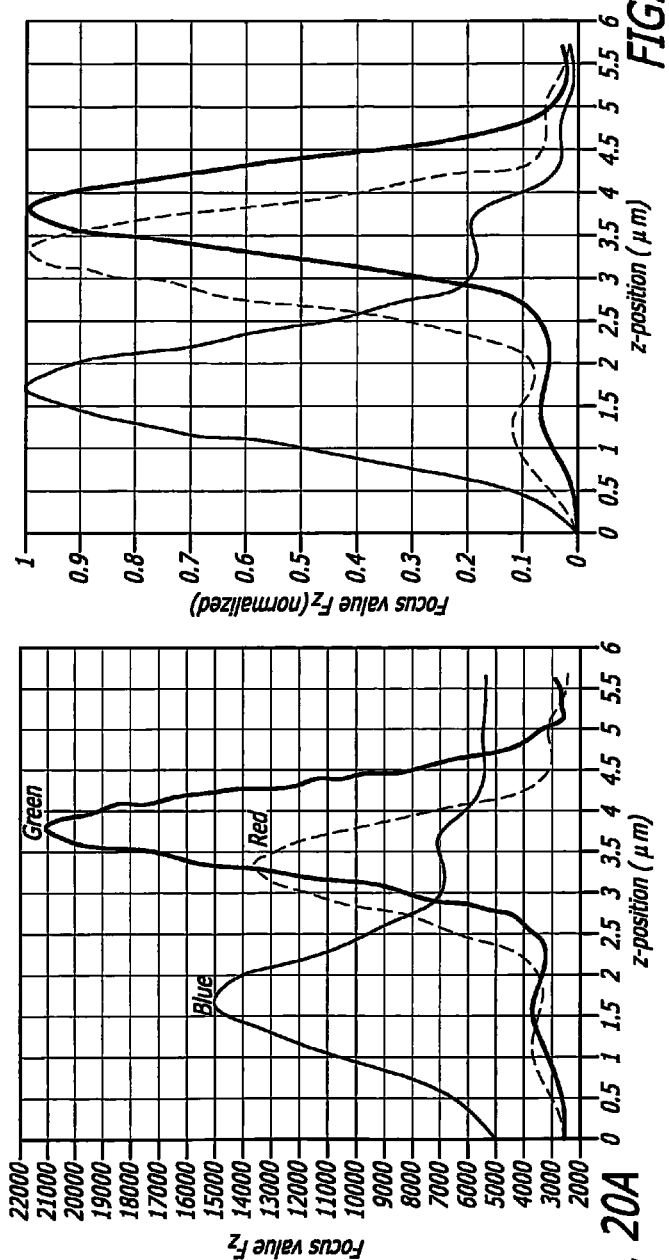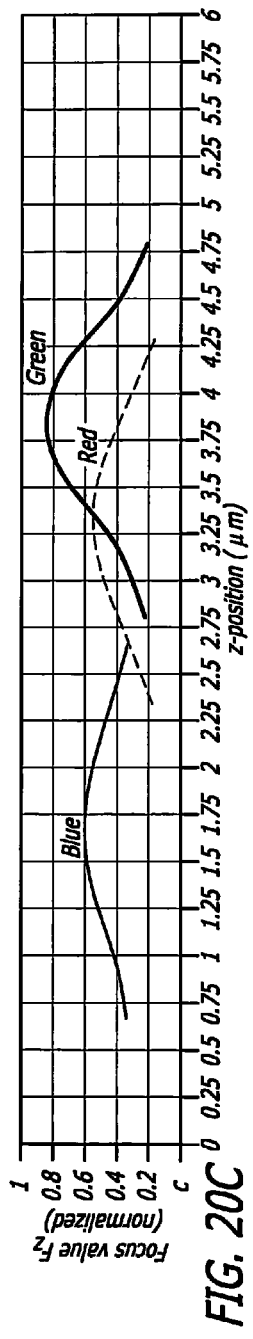
FIG. 20A
FIG. 20B
FIG. 20C

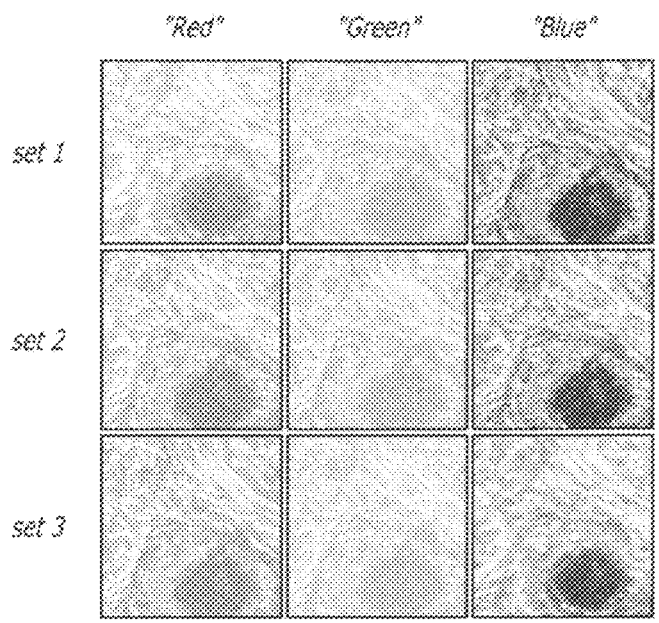
FIG. 26
FIG. 27
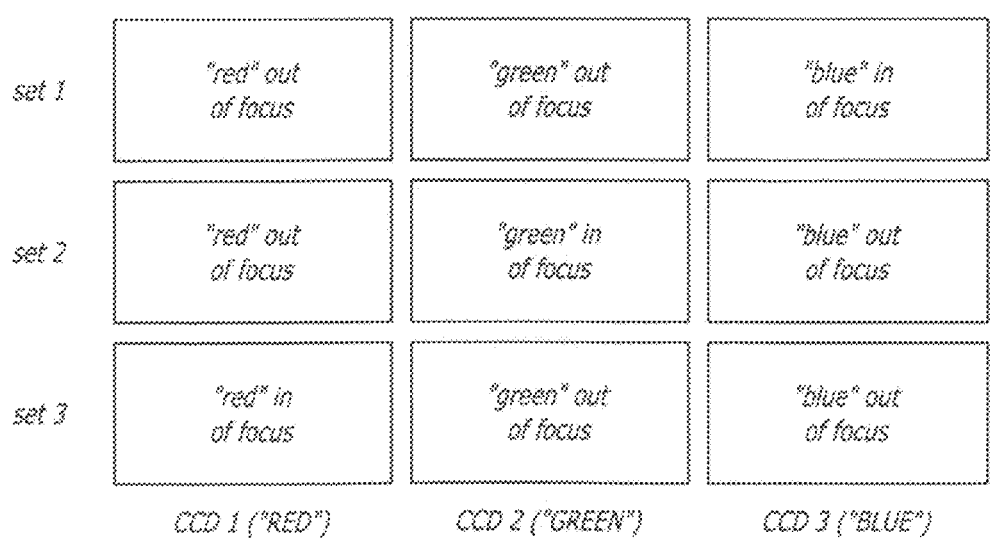

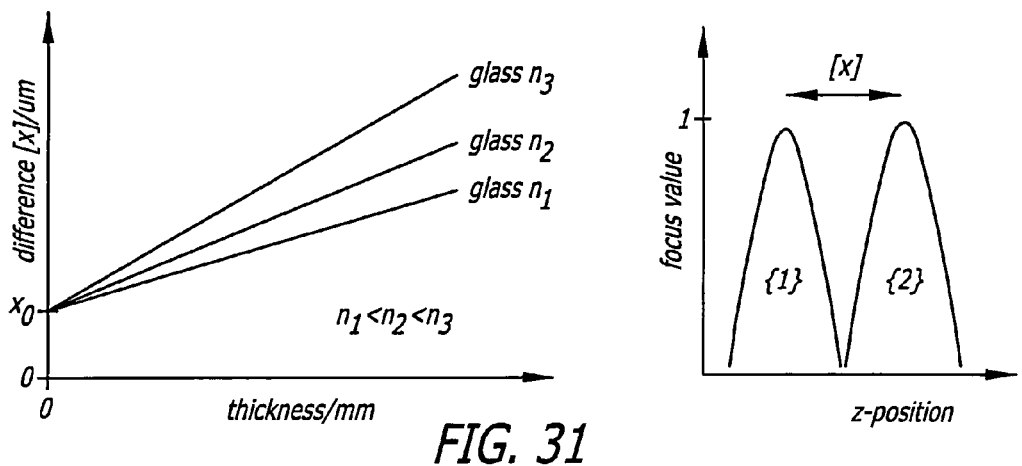
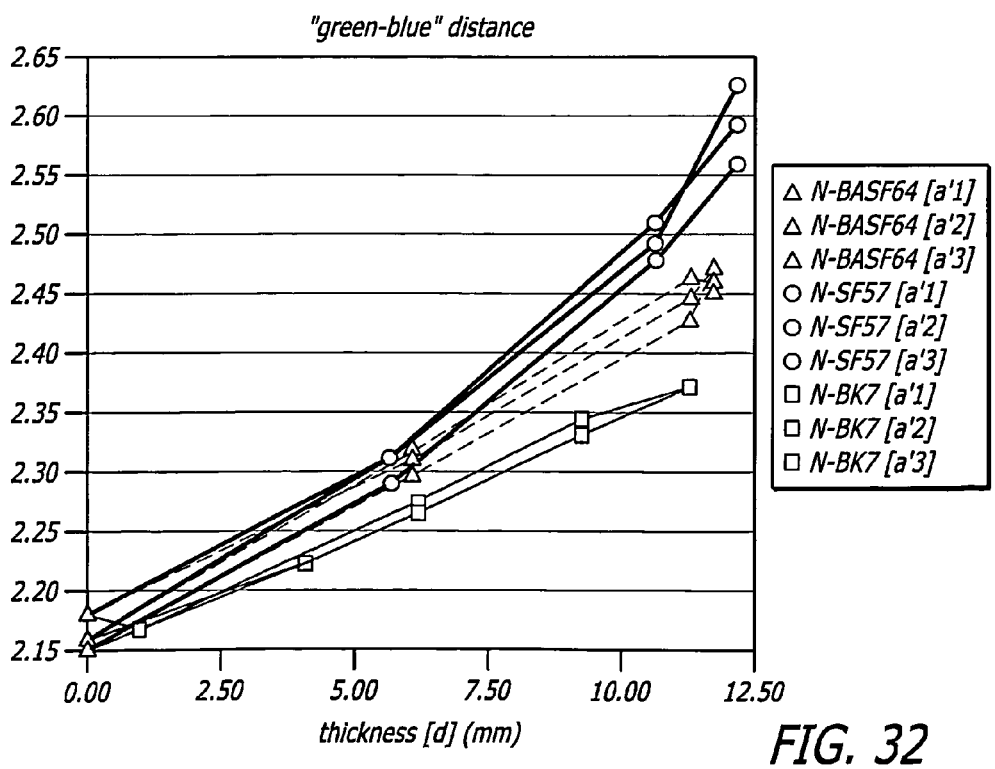
FIG. 31
FIG. 32

|  |  |  |
|---|---|---|
| "red" out of focus | "green" out of focus | "blue" in focus |
| "red" out of focus | "green" in focus | "blue" out of focus |
| "red" in focus | "green" out of focus | "blue" out of focus |
| CCD 1 ("RED") | CCD 2 ("GREEN") | CCD 3 ("BLUE") |

Set 1 / Set 2 / Set 3

FIG. 36

AUTOMATED SCANNING CYTOMETRY USING CHROMATIC ABERRATION FOR MULTIPLANAR IMAGE ACQUISITION

The invention described herein was made in part with United States government support under NIBIB Grant No. R01 EB006200-03 and NHGRI Grant No. U54 HG003916-03, both awarded by the National Institutes of Health. The United States government has certain rights in this invention.

This application claims priority of U.S. Provisional Application for Patent 61/196,190, filed Oct. 14, 2008.

BACKGROUND

This specification relates to microscope-based screening of biological material. More particularly, the specification concerns the acquisition of images at each of a plurality of depths along an optical axis in a three-dimensional specimen. Alternatively, the specification concerns the acquisition of images at each of a plurality of planes spaced along an optical axis in a three-dimensional specimen. Preferably, one object plane is acquired for each of a plurality of colors which are focused by a lens at different focal points in the space occupied by a three-dimensional specimen.

Revealing fundamental molecular mechanisms of diseases requires microscope-based screening of biological material. When the biological material is supported on a microscope slide, a multiwall plate, or other equivalent device, and the optical information obtained from images acquired by the microscope is utilized to make measurements of cells, the screening process is referred to as "image cytometry"; if the slide or plate is scanned to acquire a succession of images and cell measurements at a corresponding succession of locations, the process is referred to as "scanning cytometry". Automated scanning cytometry is scanning cytometry enhanced by automation of system functions such as scanning, focus, image acquisition and storage, and so on. In automated scanning cytometry, high-resolution scans require medium-to-high numerical aperture (NA) objectives which have depths of field similar to the thicknesses of cell monolayers. To be able to focus such a layer for quantitative and qualitative analysis, autofocusing helps to achieve good image quality.

A cytometer is an instrument designed to count cells and measure their properties in order to: obtain quantitative and qualitative information for biomedical studies. Scanning cytometry, in contrast to flow cytometry, utilizes stage scanning of cells and tissues attached to substrates in synchronism with fully automated image processing to make quantitative measurements of large cell populations. Moreover, the cell classification is more precise than in flow cytometry since the cells that are attached in-situ maintain their normal shapes and are not suspended in a fluid stream. However, the increasing precision is limited by lower speed. A flow cytometer can have a scanning rate of 20-30 kHz (cells/second), whereas an image cytometer typically works at 100 Hz. To close the gap in scanning speed, especially for high-resolution scans that require high numerical objectives, on-the-fly auto focusing has been developed to ensure high image quality during high speed scanning.

In this regard, in contrast to classical flow cytometry, image cytometry has the advantage of a two-dimensional (2-D) representation of image information, containing a quantity of cells and their relocation (one flow cytometer, the ImageSream by Amnis, http://www.amnis.com/, also images cells in a flow stream). The 2-D extension has had the disadvantage of lower speed in comparison to the one-dimensional (1-D) flow cytometry. (Bravo-Zanoguera, M. E. & Price, J. H. Simultaneous Multiplanar Image Acquisition in Light Microscopy. SPIE Proc. Optical Diagnostics of Biological Fluids and Advanced Techniques Analytical Cytology 3260 (1998)). However, to detect ultra rare cells, such as cancer cells, which is an important part in biomedical applications, scanning image cytometry is currently the best method because it offers the opportunity to analyze the specimen in greater detail using high resolution images. In order to identify those ultra rare cells within large cell populations, it is desirable that this process be automated. (Bajaj, S., Welsh, J. B., Leif, R. C. & Price, J. H. Ultra-rare-event detection performance of a custom scanning cytometer on a model preparation of fetal nRBCs. *Cytometry* 39, 285-294 (2000); Morelock, M. M., et al. Statistics of assay validation in high throughput cell imaging of nuclear factor kappaB nuclear translocation. *Assay Drug Dev Technol* 3, 483-499 (2005); and, Prigozhina, N. L., et al. Plasma membrane assays and three-compartment image cytometry for high content screening. *Assay Drug Dev Technol* 5, 29-48 (2007)).

To accomplish automated scanning cytometry, the stage movement, specimen illumination, and image acquisition have to be automated by a host computer. To be able to classify individual cells small features, such as cell borders, have to be distinguished. See M. Bravo-Zanoguera: "Automatic on-the-fly focusing for continuous image acquisition in high-resolution microscopy", Proc. Opt. Diag. Living Cells, pp. 243-252, 1999. For this reason, objectives with a high numerical aperture (e.g. 0.7) and magnification (e.g. 40×) are needed. Due to the increased lateral resolution and corresponding reduction in depth of field it is necessary to refocus the specimen for each field of view. Images taken out of focus are not able to offer sufficient information since a stable auto focus algorithm for medium and high re the image quality is reduced. (Bravo-Zanoguera, M. E. Dissertation, University of California (2001)). Therefore, a fully automated scanning cytometry system needs solution scans. (Oliva, M. A., Bravo-Zanoguera, M. & Price, J. H. Filtering out contrast reversals for microscopy autofocus. *Applied Optics* 38, 638-646 (1999)).

Automated cytometers are currently used in clinical and industrial applications. Clinical applications include screening systems (e.g. prescreening of cervical cancer), rare event detection systems (e.g. genetic screening) and hematology systems. Industrial applications include pharmaceutical (e.g. drug screening); food and cosmetics (e.g. bacteria count analysis) as well as routine work in biomedical research. (Bravo-Zanoguera; M. E. & Price, J. H. Simultaneous Multiplanar Image Acquisition in Light Microscopy. SPIE Proc. Optical Diagnostics of Biological Fluids and Advanced Techniques Analytical Cytology 3260 (1998)).

Incremental scanning, which requires the stage to be motionless while acquiring an image, is used in conventional automated cytometers to keep track of the focus while the entire specimen is scanned. In incremental scanning, a motorized mechanism also moves the specimen (or the objective) perpendicular to the optical axis (z-direction) to collect an axial series of images, also termed a "z-stack" of optical sections. Phase contrast, fluorescence, differential interference contrast (DIC) and other contrast enhancement mechanisms can be used to test for the sharpest image and adjust focus. After autofocusing, a fluorescence (typically, but also sometimes a bright field, phase contrast, DIC or other) image is acquired for the purpose of measuring cell properties. The first field of each specimen is focused manually (or with a longer automatic search range as is routine in drug screening with each new well) and the image is acquired. All subsequent fields are adjusted automatically during the use of an objective positioner (PIFOC, Physic Instrumente http://www.physikinstrumente.com/en/products/prdetail.php?sortnr=200375), or by motorized focus actuators sold with the microscope (e.g., Nikon model Eclipse TI-e, http://www.nikoninstruments.com/ti/), or using a plate positioner (http://www.physikinstrumente.com/en/products/prdetail.php?sortnr=201546, or Mad City Labs, http://www.madcitylabs.com/nanoz500.html). This positioner is moved through a specific number of steps ($\Delta z$) in the z-direction. The autofocus is performed by collecting and analyzing a sequence of images, acquired at different test object planes at different z-positions. (Bravo-Zanoguera, M. E. Dissertation, University of California (2001)). An analog autofocus circuit generates voltages with respect to the images taken by the CCD camera at the different z-positions. During the z-movement the highest voltage of the circuit corresponds to the best focused image acquired at best focal position. After finding the best focal position, the image is acquired and the stage is moved to the next field, where the best focal position of the previous field is used as the origin of the new field focus search. (Bravo-Zanoguera, M. E. Dissertation, University of California (2001)). This method needs at least seven to nine different test object planes in order to obtain sufficient data and an accurate best focal position for cells and tissues on slides, coverslips and microtiter plates. (Bravo-Zanoguera; M., Massenbach, B., Kellner, A. & Price, J. High-performance autofocus circuit for biological microscopy. *Review of Scientific Instruments* 69, 3966-3977 (1998); and, Price, J. H. & Gough, D. A. Comparison of phase-contrast and fluorescence digital autofocus for scanning microscopy. *Cytometry* 16, 283-297 (1994)) In a sequence for incremental scanning, a focal function curve is obtained by the movement through the fields ( . . . , n−1, n, n+1 . . . ). The motion of the z-position is in control of a host computer.

The speed of the z-position movement is limited by vibrations originating from the acceleration of the stage during its start and stop motion. (Bravo-Zanoguera, M. E. Dissertation, University of California (2001)). Resultantly, sequential acquisition of the test object planes care done approximately at 3 Hz (3 fields/s), which results in a scanning time of 60 to 90 minutes for the entire slide.

Continuous scanning eliminates microscope stage acceleration and thus the scanning speed is improved while high resolution is maintained. (Bravo-Zanoguera, M. E. Dissertation, University of California (2001); Bravo-Zanoguera, M. E., Laris, C. A., Nguyen, L. K., Oliva, M. & Price, J. H. Dynamic autofocus for continuous-scanning time-delay-and-integration image acquisition in automated microscopy. *Journal of Biomedical Optics* 12, 34011/34011-34016 (2007); Bravo-Zanoguera, M. E. & Price, J. H. Simultaneous Multiplanar Image Acquisition in Light Microscopy. *SPIE Proc. Optical Diagnostics of Biological Fluids and Advanced Techniques Analytical Cytology* 3260 (1998); and Nguyen, L. K., Bravo-Zanoguera, M. E., Kellner, A. L. & Price, J. H. Magnification Corrected Optical Image Splitting Module for Simultaneous Multiplanar Acquisition. *Proc. Of SPIE, Optical Diagnostics of Living Cells III* 3921, 31-40 (2000)). To be able to scan a specimen by moving the stage at a constant velocity in the x- or y-directions, multiple test object planes are acquired simultaneously in the z-direction, a parallel autofocus algorithm determines the best focal position at each field and the focus is updated in a closed-loop-feedback correction manner several times per microscope field of view. (Bravo-Zanoguera, M. E. & Price, J. H. Simultaneous Multiplanar Image Acquisition in Light Microscopy. *SPIE Proc. Optical Diagnostics of Biological Fluids and Advanced Techniques Analytical Cytology* 3260 (1998)). To avoid the effects of start and stop acceleration, 1-D CCD sensors, also called line cameras, were first used in continuous scanning. (Castleman, K. R. The PSI automatic metaphase finder. *J Radiat Res* (Tokyo) 33 Suppl, 124-128 (1992); Shippey, G., Bayley, R., Farrow, S., Lutz, R. & Rutovitz, D. A fast interval processor (FIP) for cervical prescreening. *Anal Quant Cytol* 3, 9-16 (1981); Tucker, J. H., et al. Automated densitometry of cell populations in a continuous-motion imaging cell scanner. *Applied Optics* 26, 3315 (1987); and Tucker, J. H. & Shippey, G. Basic performance tests on the CERVIFIP linear array prescreener. *Anal Quant Cytol* 5, 129-137 (1983)). In this application the image readout from a line camera is synchronized with the stage motion to collect 2-D images. Especially for low-brightness specimens (e.g., fluorescently stained tissues), the time-delay-and-integrate (TDI) method of synchronizing the electronic representation of the image on an area CCD camera with optical image moving over the face of the CCD chip increases sensitivity. (Bravo-Zanoguera, M. E., Laris, C. A., Nguyen, L. K., Oliva, M. & Price, J. H. Dynamic autofocus for continuous-scanning time-delay-and-integration image acquisition in automated microscopy. *Journal of Biomedical Optics* 12, 34011/34011-34016 (2007); and Netten, H., Van Vliet, L. J., Boddeke, F. R., De Jong, P. & Young, I. T. A fast scanner for fluorescence microscopy using a 2-D CCD and time delayed integration. (1994)). The combination of continuous stage motion with multiplanar image acquisition considerably increases the scanning speed and allows for future continuous-scanning three-dimensional (3-D) imaging. Thus, multiplanar image acquisition replaces the serial process of sequential scanning by performing parallel calculations of focus and synchronous acquisition of all images. Multiplanar image acquisition can create a scanning speed which is just limited by the pixel acquisition rate of the camera, thereby enabling 2-D scanning cytometry that may reach the speed of 1-D flow cytometry. (Bravo-Zanoguera, M. E., Laris, C. A., Nguyen, L. K., Oliva, M. & Price, J. H. Dynamic autofocus for continuous-scanning time-delay-and-integration image acquisition in automated microscopy. *Journal of Biomedical Optics* 12, 34011/34011-34016 (2007)).

A multiplanar image acquisition system, also called the "volume camera", is able to acquire multiple image planes of the z-direction simultaneously. (Bravo-Zanoguera, M. E., Laris, C. A., Nguyen, L. K., Oliva, M. & Price, J. H. Dynamic autofocus for continuous-scanning time-delay-and-integration image acquisition in automated microscopy. *Journal of Biomedical Optics* 12, 34011/34011-34016 (2007)). See also U.S. Pat. No. 6,640,014. In this regard, multiplanar image acquisition is based on the use of multiple CCD cameras, focused on multiple object planes. Such a stack of 2-D images represents one volume image of the specimen. Additional computational work combining the 2-D images provides 3-D imaging. The existence of such a volume camera with multiple object planes enables the rapid calculation of the best focal positions of a specimen during scanning.

However, the axial displacement of the object planes in a volume camera produces some variance in magnification, which alters the sampling rate of the imaging system and thus the performance of the autofocus algorithm. Such changes in magnification can be corrected by a computer, magnification correction optics, or if they are too small to alter the autofocus performance, can be neglected altogether. The lens, representing the microscope objective of the volume camera, magnifies the specimen, and multiple object planes within the specimen space are in focus simultaneously. Sensors are placed at different axial positions within the image space, where each sensor acquires one object plane and the corresponding information to calculate the in-focus position.

One such volume camera utilizes an array of nine optical fiber bundles coupled to an array of Time Delay and Integration (TDI) CCD cameras which are connected to an array of analog autofocus circuit boards. (Bravo-Zanoguera, M. E., Laris, C. A., Nguyen, L. K., Oliva, M. & Price, J. H. Dynamic autofocus for continuous-scanning time-delay-and-integration image acquisition in automated microscopy. *Journal of Biomedical Optics* 12, 34011/34011-34016 (2007)). The array of fiber bundles is arranged in a staircase pattern that provides the necessary axial displacement to acquire multiplanar images. However, due to the side-by-side arrangement of the fibers, there is spatial displacement which induces a spatial delay that has to be corrected by the computer. Furthermore, the volume camera is expensive to build and maintain because of the complex setup and supporting structure of the system as well as the optical inefficiency of the fiber bundles (60 percent transmittance). (Bravo-Zanoguera, M. E. & Price, J. H. Simultaneous Multiplanar Image Acquisition in Light Microscopy. *SPIE Proc. Optical Diagnostics of Biological Fluids and Advanced Techniques Analytical Cytology* 3260 (1998)).

These disadvantages led to a second design for simultaneous image acquisition in an image splitting system using a combination of beam splitters and mirrors to produce an eight channel multiplanar imaging system. See U.S. Pat. No. 6,839,469. The beam splitters are more effective and less fragile than the fiber bundle of the volume camera. In contrast to the fiber bundle system of the volume camera, spatial differences are prevented since the image originates from only one field of view. The system produces eight identical, non-inverted images at the optical output. Because of different z-positions, each object plane has a different magnification, which can be corrected by coupling each optical output channel through a zoom relay lens system, which focuses the image on one of the eight TDI CCD cameras. (Nguyen, L. K., Bravo-Zanoguera, M. E., Kellner, A. L. & Price, J. H. Magnification Corrected Optical Image Splitting Module for Simultaneous Multiplanar Acquisition. *Proc. Of SPIE, Optical Diagnostics of Living Cells III* 3921, 31-40 (2000)). In contrast to the fiber optical system of the volume camera, in which the fibers are glued to the sensors, the magnification optics can easily be added to the image splitting system. (Nguyen, L. K., Bravo-Zanoguera, M. E., Kellner, A. L. & Price, J. H. Magnification Corrected Optical Image Splitting Module for Simultaneous Multiplanar Acquisition. *Proc. Of SPIE, Optical Diagnostics of Living Cells III* 3921, 31-40 (2000)). Finally it is important to note that the image splitting system divides the light into eight channels, and also has glass-air interfaces. Thus, the intensity of each optical output to each individual camera is reduced significantly.

Multiplanar image acquisition speeds autofocus by enabling simultaneous testing of the relative sharpness of multiple axial planes. CCD cameras axially displaced relative to each other focus on different planes in the specimen space. This enables acquisition of multiple test object planes and thus allows for tracking focus and future 3-D imaging. An improved version of a volume camera, consisting of a series of mirrors and beam splitters, divides the volume image within the specimen into eight 2-D images. However, this system still suffers from optical aberrations due to huge amounts of glass. Correcting those aberrations is a very expensive and painstaking process.

The following specification proposes a solution to the suboptimal performance of volume imaging devices in acquiring mutiplanar images and autofocusing, which utilizes the chromatic aberrations inherent in all optics and thereby reduces the amount beamsplitting optical glass and the number of relay lenses required to acquire a given number of focus axially-displaced test images.

SUMMARY

In an automated scanning cytometry system, chromatic aberration is used for multiplanar image acquisition in the space occupied by a tissue specimen (specimen space). Preferably, one object plane is acquired for each of a plurality of colors which are focused by a lens at different focal planes in the specimen space.

Chromatic aberration is also used for image-based autofocus, which focuses a lens directly in the specimen space by acquiring a stack of images displaced along a single optical axis of an optical transmission path, measuring resolution and/or sharpness of the acquired images, and finding a best focus based on the measurements. Chromatic aberration along the optical axis provides differences in focus needed for acquiring multiple focal planes simultaneously.

Focus differences may be adjusted or changed by controlling the displacements of these focal planes along the optical axis. Focal plane separation may be controlled by inserting optical elements of various dispersions and thicknesses in the optical path. Focal plane separation can also be controlled by changing the particular wavelengths of light since chromatic aberration usually increases as the differences in wavelengths also increases. Further control over focal plane separation can also be achieved by placing axial motion control actuators on the CCD chips in an RGB camera.

As one example, using polychromatic illumination of a specimen space, a 3-chip CCD color camera with three color coded independent CCDs enables the acquisition of three object planes in the specimen space viewed through a microscope lens, simultaneously, one for each color. The axial focus offsets to each of the object planes are caused by chromatic aberration of the lens.

In a further example, a 3-chip CCD color camera with a triple bandpass color filter enables a method for rapid sampling of axial optical space for autofocus of a microscope lens. Relatedly, a microscope with a multiport design may include multiple such cameras within the microscope setup, e.g., three RGB cameras producing nine axial displaced object planes within a specimen space viewed by the lens of the microscope (adapters such as the Nikon Multi-Image Module and Roper Dual-Cam, http://www.photometrics.de/DualCam.html, enable two RGB cameras per microscope port, further conveniently expanding multiplanar image acquisition). A multiplanar image acquisition system using such a setup may be capable of acquiring almost perfectly laterally registered 2-D images in parallel from different object planes simultaneously.

Further, the distances between the object planes may be changed by changing chromatic aberration within the system. Thus, the automated scanning cytometry system may be tuned by adjustment of one or more of the components of chromatic aberration for optimally tracking focus and also enabling 3-D imaging, wherefore such a tunable system may replace the volume cameras and the image splitting systems of the prior art.

The method and apparatus described in this specification may be practiced with customized optical elements, or may utilize high resolution and efficient light transmission from commercially available optical components, thereby elimi-

BRIEF DESCRIPTION OF THE DRAWINGS

FIG. 17 is a table showing a hierarchy of measurements;

FIG. 20 includes three graphs, each showing three focal function curves;

FIG. 26 illustrates multiplanar image acquisition using human skin cells;

FIG. 27 is a diagram illustrating multiplanar image acquisition using a thin optical element;

FIG. 31 is an assumed trend of an experiment;

FIG. 32 is a plot of green-blue distance versus thickness of glass samples with different indices of refraction;

FIG. 36 illustrates binary versions of the grayscale images of FIG. 35;

DETAILED DESCRIPTION OF THE PREFERRED EMBODIMENTS

Figure 1:
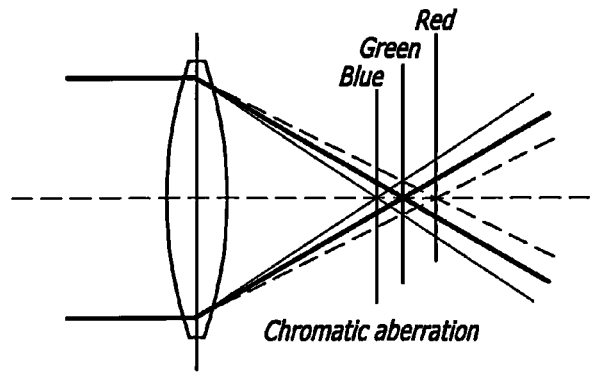
FIG. 1 is an illustration of chromatic aberration of a thin lens.

A light microscope delivers a magnified image of a specimen. When in focus, the 2-D image of the specimen has its highest spatial frequencies, or the most contrast over the shortest distances, enabling resolution and measurement of small details of the specimen. Using optical devices, a light microscope modifies the final 2-D image of the specimen. These devices in the optical train of the microscope include an illuminator, condenser, specimen, objective lens, ocular and the camera.

Optical lenses are associated with many intrinsic faults which are called aberrations. Thus, there is no ideal lens to form an ideal non-distorted image. There are at least two types of aberrations: chromatic and monochromatic. Monochromatic aberrations include spherical aberrations.

Spherical aberrations are caused by different radii provided by a lens. Thus, paraxial monochromatic light, passing this multi radii lens, will not interfere within the same focal position. Such a characteristic results in a blurring around the focal point. Hence, an image is produced out of those focal points, and the image is also blurred.

Chromatic aberrations are the result of the properties of the index of refraction. The index of refraction n depends on two parameters: The media which the light passes and the wavelength of the light. In this regard, refraction is the change of the direction of a light wave when passing from one transparent medium into another transparent medium. This change in direction is caused by the change of velocity of the light wave through the change of transparent media. The angle of refraction $\theta_2$ depends on the angle of incidence $\theta_1$. This relationship between different angles in different media is presented in eq. (1), which is also called Snell's Law and is one of the basic formulas in optics. In eq. (1) the light wave travels through medium 1 and 2 with the index of refraction $n_1$ and $n_2$.

$$n_1 \sin \theta_1 = n_2 \sin \theta_2 \quad (1)$$

Eq. (2) represents the ratio between the velocities of light passing from one transparent medium $n_1$ into another transparent medium $n_2$ with the velocities $v_1$ and $v_2$. For normalization, all velocities are calculated versus the speed of light c in vacuum. Thus, the refractive index can be calculated for every transparent material.

$$n = \frac{v_1}{v_2} = \frac{c}{v} \quad (2)$$

The speed of light in vacuum is constant for each wavelength. However, any other transparent medium influences the speed of light with respect to the wavelength. According to eq. (2) the index of refraction n will become a function of the wavelength, $n=n(\lambda)$. This phenomenon is called "dispersion."

Optical media responds with a higher index of refraction for shorter wavelengths than longer wavelengths. An increasing index of refraction causes the angle of refraction to become bigger. Thus, polychromatic light travelling through a lens causes multiple focal lengths, with respective focal points, as shown in FIG. 1.

For example, in FIG. 1, the red, green, and blue components of polychromatic light passing through the lens 100 are focused at respective focal planes Blue, Green, and Red that are normal to the axis 105 of the lens 100. The focal planes are displaced from the lens 100 by respective focal lengths that are related to the wavelengths of the colors and the lens's index of refraction. A focal length is measured from the plane that is normal to the axis 105 and that passes through the center of the lens 100 to the focal plane of interest. One such focal length, to the plane Blue where blue light is focused. The axial positions (the z-positions) of the focal planes with respect to the lens 100 correspond to the magnitudes of their focal lengths. Thus, if the z-position of the plane Red is 0, the z-position of the plane Blue where blue light is focused is the magnitude of the focal length. In another example, referring again to FIG. 1, presume that the light passing through the lens 100 is monochromatic, and that it can be changed in color. As the color of the light is changed, the focus is changed as well, as are the focal length to and z-position of the focal plane. More completely, adjustment of focal lengths and z-positions can be done by adjustment of either or both of the chromatic characteristics of the light and the index of refraction of the lens.

The method and apparatus described herein use chromatic aberration characteristics of an objective lens to form multiple object planes within a specimen space through which an optical axis of the objective extends. Using light consisting of multiple wavelengths, a lens system (such as the objective lens of a light microscope) is not able to focus on a single object plane in the specimen space because of chromatic aberration. The wavelength dependence of the index of refraction produces multiple focal points which are located in corresponding object planes. The critical insight was that a multiplanar image might be acquired in continuous or incremental scanning microscopy by taking advantage of the natural chromatic aberration characteristics given by each lens system.

Figure 2:
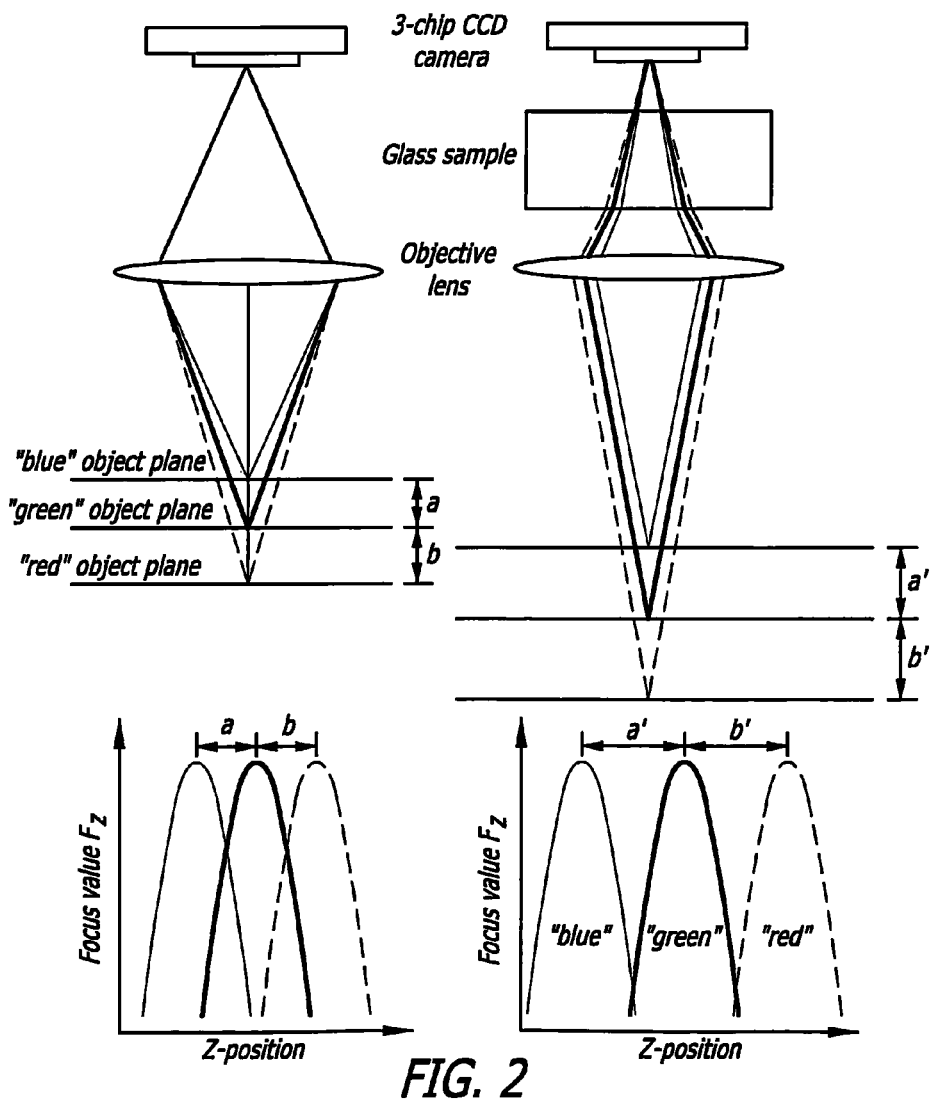
FIG. 2 illustrates multiplanar image acquisition using chromatic aberration.

Using a 3-chip CCD color digital camera with three independent CCDs for the wavelengths (respectively colors) "red", "green" and "blue", three of those object planes may be acquired simultaneously. FIG. 2 presents a simple illustration of the concept. Inserting different sorts of glass into the path of light will enhance the effect of chromatic aberration by changing the distances between the object planes formed by the "red", "green" and "blue" wavelengths. The distance a between the object planes provided by the "blue" and "green" wavelength is changed to a' and the distance b between the object planes formed by the "green" and "red" wavelength is changed to b'.

Three cameras, each with the 3-chip CCD technology described above, may be attached on one light microscope to produce nine different object and image planes, respectively. After acquiring all nine images in the z-direction simultaneously, the computer may process a 3-D image of a specimen (volume scanning), or when using a thin specimen, the computer (or autofocus circuit) can determine the best focal position. Benefits of this method may include an increase in resolution, high light intensity to each individual camera, and a compact opto-mechanical design. The existence of chromatic aberrations provided by each objective and the absence of an expensive mechanical support structure enable this system to be inexpensive but effective for multi-chromatic applications.

An automated scanning cytometry system using chromatic aberration for multiplanar image acquisition may be characterized by focal displacements at a plurality of different wavelengths, for example, three different wavelengths. In such a system, the distances between the object planes for a plurality of colors, for example, "red", "green" and "blue", may be controlled (increased or decreased) using different kinds of glass to introduce and vary the amount or effect of chromatic aberration within the optical light path. Accordingly, simultaneous acquisition of the images from those object planes may be implemented by using a 3-chip CCD camera.

Figure 3:
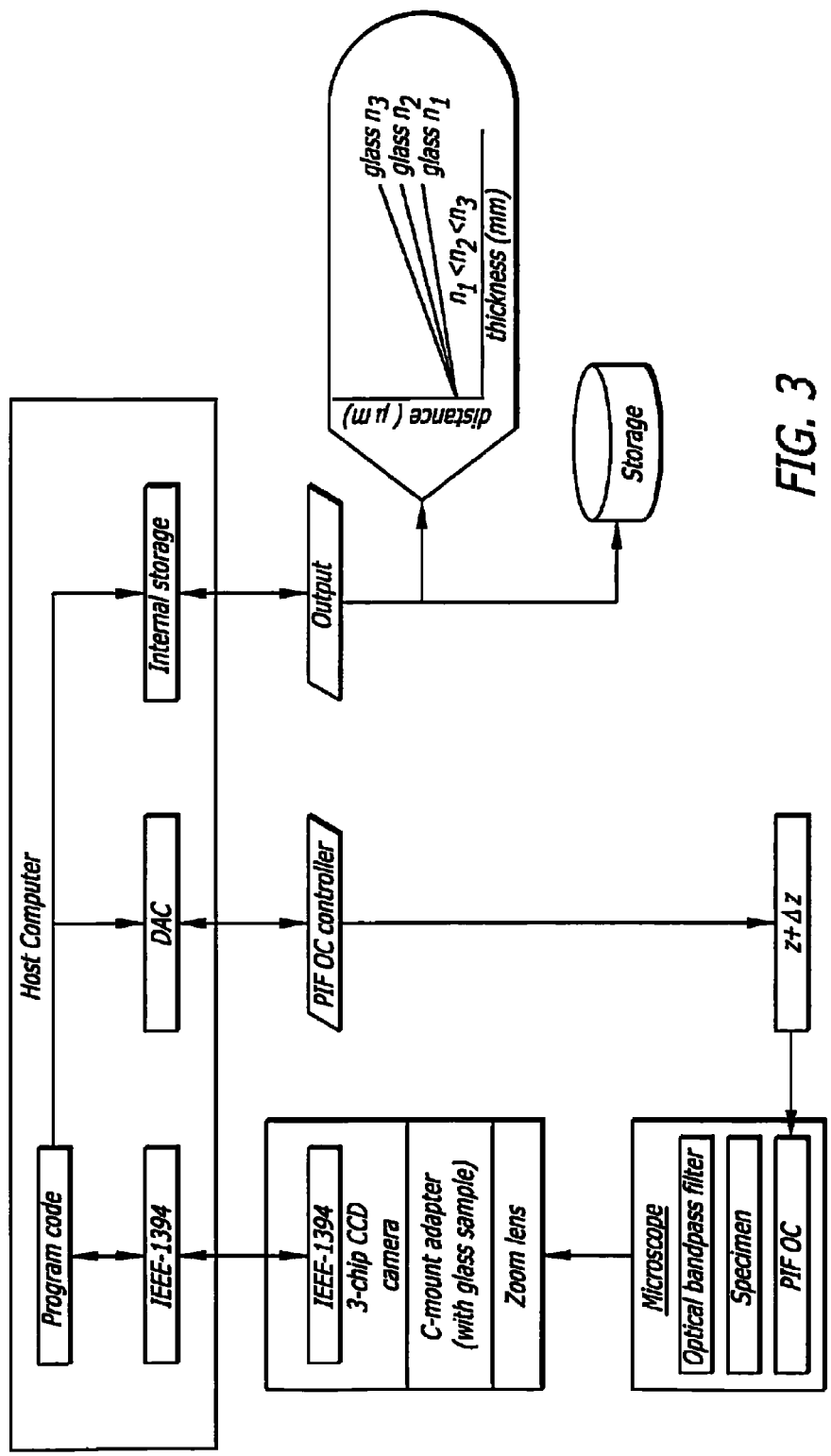
FIG. 3 is a block diagram of an automated scanning cytometry system using chromatic aberration for multiplanar image acquisition.
Figure 4:
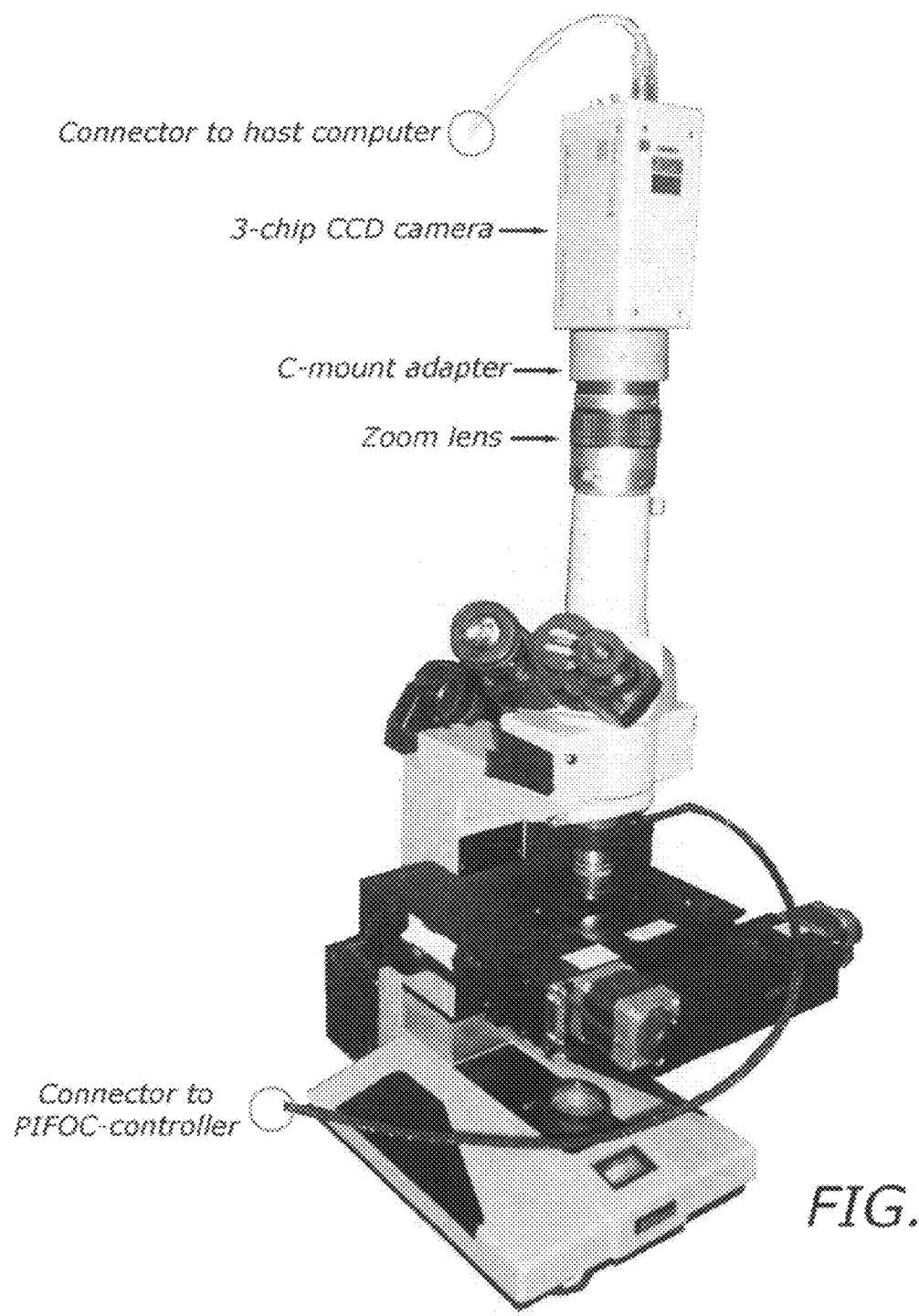
FIG. 4 illustrates a microscope modified for use in the system of FIG. 3.

A block diagram of an automated scanning cytometry system using chromatic aberration for multiplanar image acquisition is shown in FIG. 3, and a microscope for such a system is shown in FIG. 4, although the fluorescence light source. The specimen, here the micrometer slide, is placed on the microscope stage and the microscope optics produce an enlarged image of the specimen at the phototube as well as in the eyepieces. A zoom lens connected to the phototube produces an image of the specimen at the CCDs of the 3-chip CCD camera. A C-mount adapter is placed between the zoom lens and the camera. It holds the camera and houses the glass samples.

As per FIG. 3, images acquired by the 3-chip CCD camera may be transferred to the host computer by using a IEEE-1394 interface. Preferably, the host computer runs program code which calculates digital focus values out of the acquired images. By using a digital to analog converter (DAC) the digital focus values are converted into analog voltages. A piezoelectric objective positioner controller (PIFOC) uses an analog voltage to produce a reference voltage which, in turn, controls the position of the PIFOC, and thereby, the position of the microscope objective. Focus values are stored into the host computer and are used for an appropriate presentation at the screen.

Figure 5:
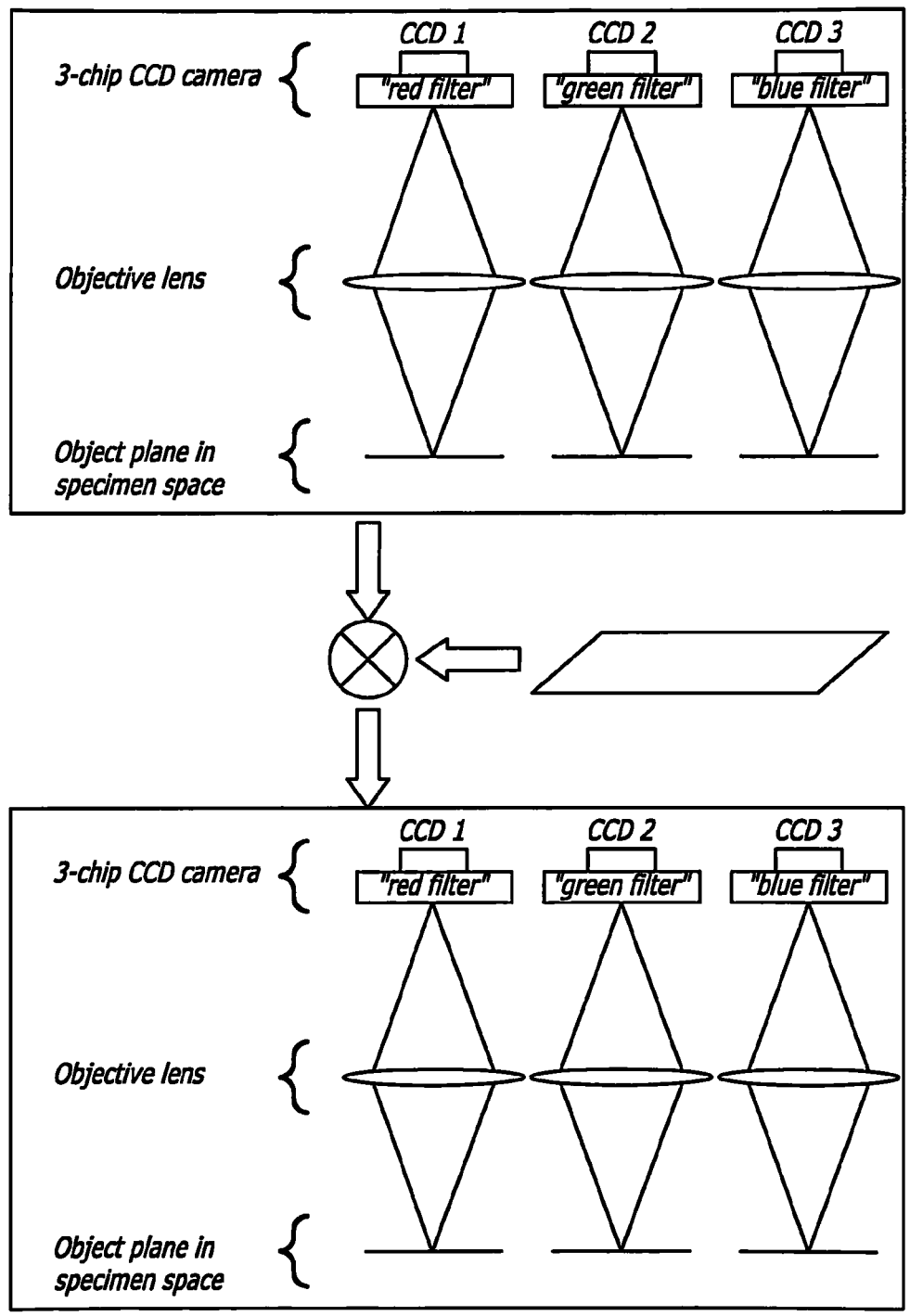
FIG. 5 illustrates variability of object planes within a specimen space.

Using a white light source to illuminate the specimen and assuming no optical aberration within the imaging system, the system is able to produce just one common object plane for each wavelength. As illustrated in FIG. 5, placing a 3-chip CCD color camera within the image plane of an ideal microscope produces one and the same object plane within the specimen space where CCD 1, CCD 2 and CCD 3 may correspond to "red", "green" or "blue" wavelengths, respectively. Inducing chromatic aberrations will cause the object planes for "red", "green" and "blue" to drift apart from each other. In spite of the same optical path lengths between the objective lens and the CCDs, they will not focus the same object plane within the specimen space. Thus, three object planes within the specimen space are observed simultaneously by the 3-chip CCD camera.

In addition to the characteristic chromatic aberration of a given optical setup, it is also possible to induce additional chromatic aberration by inserting an optically transmissive element with an index of refraction different from the ambient air in the light path between the CCDs and the specimen space. For example, a coplanar glass element may be used. In such a case, the induced chromatic aberration depends on the thickness of the element, the index of refraction, and the position of the element within the light path. Increasing chromatic aberration should cause increasing distances between single object planes. Such distances have been measured those with respect to the thickness and the index of refraction of the glass elements. The measuring was done by acquiring the focal function curves for each of the "red", "green" and "blue" object planes, which represent distances between corresponding best focal positions.

The measurements were made with a Nikon Optiphot (I) upright microscope, used in phase contrast illumination mode. A standard Osram 12V/50 W was used as the light source for transmitted light microscopy (bright field and phase contrast). The optics included a Nikon CF Fluor DL 20×, 0.75 NA objective with phase 3 bright phase contrast and a Nikon 0.52 NA long working distance condenser. For system measurements, the optically transmissive element was a Nikon 10 µm/division stage micrometer slide which is very thin relative to the depth of field.

During the measurements the microscope objective was moved and focus changed with a 100 µm range piezoelectric objective positioner (PIFOC, Polytec PI, Costa Mesa, Calif.) model P-720.00 and an E-810.10 closed-loop controller (Polytec PI). The position of the PIFOC was controlled by the DAC on a National Instruments (Austin, Tex.) PCI-6031E data acquisition board with a digital resolution of 16 bit that provides a minimal digital step size of about 1.5 nm. Images were acquired every 20.0 nm through a 4.0 µm range.

The images were magnified with a Nikon CCTV 0.9-2.25 zoom lens onto a Hitachi HV-F31F 3-CCD video camera with a pixel size of 4.65×4.65 µm$^2$ and 1024(H)×768(V) active picture elements with a horizontal frequency response of 28.8 MHz. The camera has a built-in ADC and an IEEE 1394 Firewire outlet which is connected to an Open Host Controller Interface IEEE 1394 port of a StarTech 2 port PCI IEEE 1394 Firewire PCI-card in a Dell Precision 380, P4 630 3.00 GHz PC.

Multiple wavelengths ("red", "green" and "blue", for example) create multiple spatial cutoff frequencies (or resolution limits), one for each wavelength. With the zoom lens adjusted to 0.975, images acquired with the "red" and "green" chips were 1.23 and 1.07 times oversampled and images acquired with the "blue" chip were 0.91 times undersampled (by Nyquist sampling of the Rayleigh resolution criterion).

Figure 6:
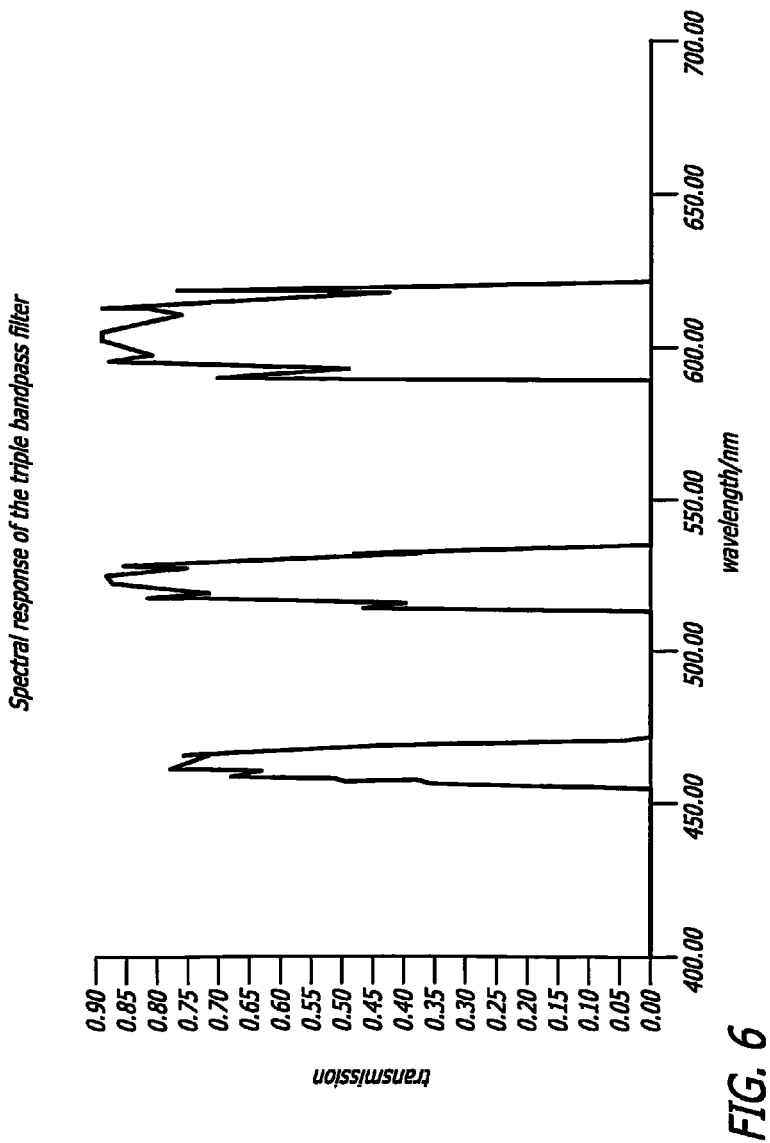
FIG. 6 illustrates spectral response of an exemplary triple bandpass filter.
Figure 7:
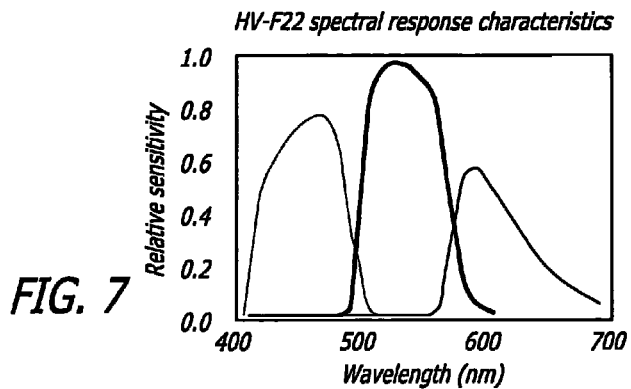
FIG. 7 illustrates a spectral response of a 3-chip CCD camera.

Unimodal and accurate focal function curves arise when the depth of field is as small as possible. Isolating the wavelengths for "red", "green" and "blue" contribute to a small depth of field and thereby contribute to a sharp focus function curve. For this reason a Chroma 61000V2M triple bandpass filter, with the spectral response as illustrated in FIG. 6 was chosen. The relationships of the pass bands to the spectral response characteristic of the 3-chip CCD camera can be seen by comparison with FIG. 7.

The lamp may not create an evenly illuminated image. To help create an evenly illuminated field of view, a 0.5-degree diffuser from "Physical Optics Cooperation" was used.

Figure 8:
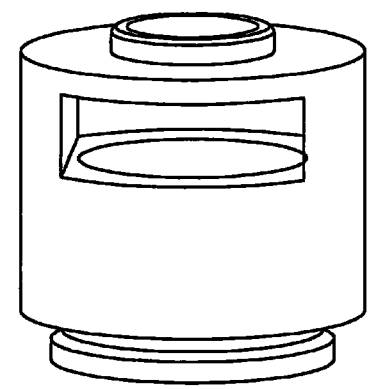
FIG. 8 illustrates a modified C-mount adapter used to fix glass samples in the microscope of FIG. 4.
Figure 9:
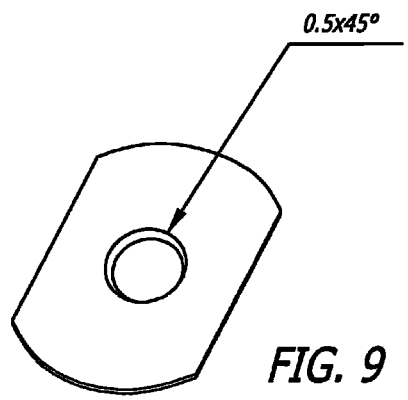
FIG. 9 illustrates a shifter used in the adapter of FIG. 8.
Figure 10:
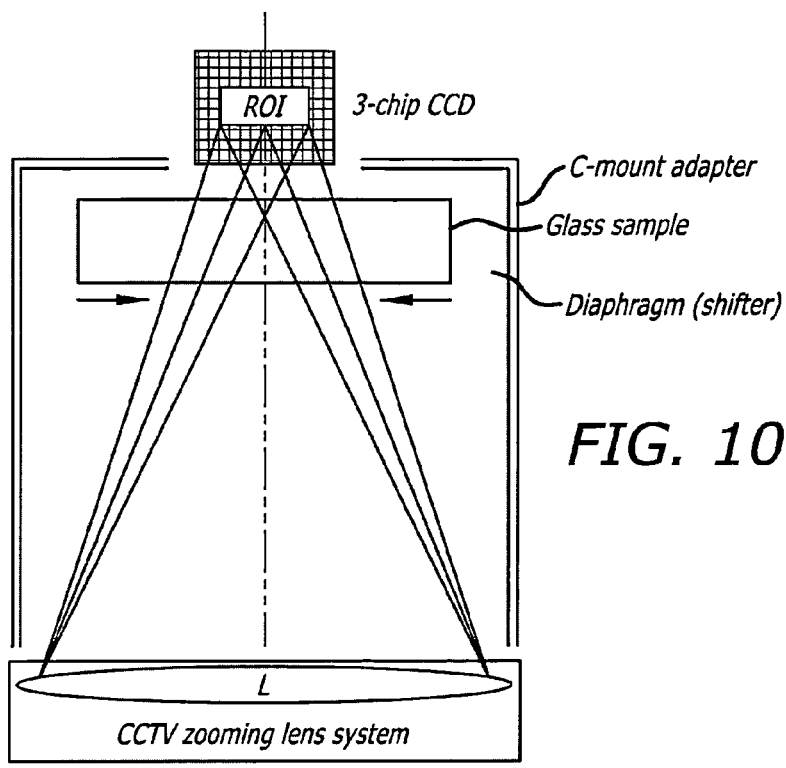
FIG. 10 illustrates assembly of the adapter, shifter and glass samples.

A C lens-mounting adapter connects the Nikon CCTV 0.9-2.25 zoom lens with the 3-chip CCD camera. The C-mount adapter, modified as shown in FIG. 8, provided physical space to insert different glass elements within the optical light path. The modified C-mount adapter was made of aluminum and its outer and inner surfaces were black anodized to decrease reflections and scattering of light. A shifter, shown in FIG. 9, was constructed to support, center, and remove glass elements within the C-mount adapter. A schematic of the assembly is shown in FIG. 10.

To prevent artificial vignetting of the image a maximum diameter of the hole within the shifter may be chosen. Vignetting causes shadowing at the edges of the image, which leads to reduction of light intensity, and thus to lower contrast. The smearing at the border of a captured image attenuates high frequencies and influences the shape of the focal function curve. In regard to a particular diameter of a disc-shaped glass element, for example about 11.80 mm, a maximum diameter of the hole within the shifter was selected, in this case, 11.00 mm.

Figure 11:
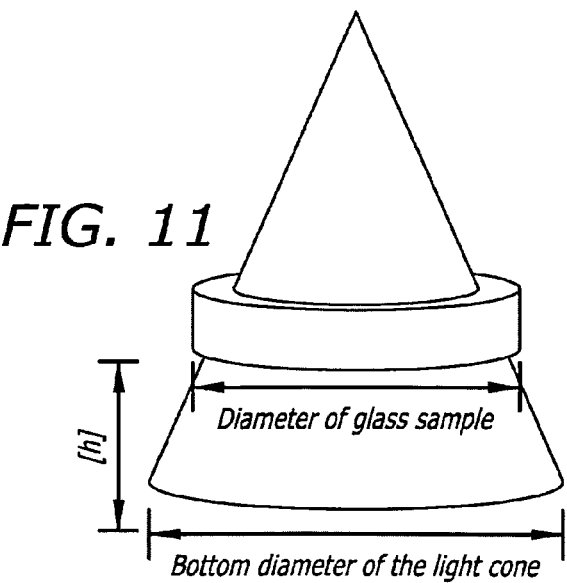
FIG. 11 illustrates the position of a glass sample within a light cone.

Even with the diameter of the shifter limited, there are additional ways to minimize the effect of vignetting. For example, the shifter may be placed as close as possible to the input optic of the camera. This accounts for the fact that the diameter of the light cone at the height [h] has to be the same or smaller than the diameter of the hole within the shifter which is pictured in FIG. 11.

Figure 12:
FIG. 12 illustrates the phase contrast image of a micrometer slide used to acquire focal function curves.

Additional steps may be taken to further reduce vignetting. Much of the remaining shadowing may be eliminated with a region of interest (ROI) in the image minimized, for example, to 640×30 pixels. Vignetting is significantly, if not completely eliminated when each beam of light which emerges from the field of view within the specimen, can be captured by each pixel of the ROI. The result of no vignetting is seen in FIG. 12, as an acquired picture of an optical element constituted of a micrometer slide. No shading occurs at the edges of the captured image. Dealing with those conditions can improve the shape of the focus function curves to create more reproducible measurements.

Computer program code was written in National Instruments Labview® 7.1 software, extended by the National Instruments IMAQ1394 driver, for controlling the Hitachi HV-F31F 3-chip CCD video camera. The results were stored in a Microsoft® Excel® document. The flowchart in FIG. 13 as annotated in table 2 provides a review of the entire operational structure of the source code of the measurement setup. In the following description of the code, the ending *.vi stands for a subroutine, where vi is short for Virtual Instrument (VI). A VI can be chosen from the internal Labview® library or can be custom programmed.

TABLE 1

| Step | Functions |
| --- | --- |
| a) Acquiring the frame at the current z-position in a processable data form. | 1. The IMAQ1394 Init.vi contains the National Instruments IMAQ1394 driver which creates a unique reference to the Hitachi HV-F31F 3-chip CCD video camera with the configuration of the camera. It also triggers the camera.<br>2. The IMAQ ColorimageToArray.vi extracts a 32-bit 2-D array of the color image arising from the unique camera reference.<br>3. The split number function splits the 32-bit color array into three 8-bit grayscale arrays. Each 8-bit array contains either the "red", "green", or "blue" fraction of the color image. |
| b) Calculating the focal function curve of each 8-bit grayscale array. | 1. The program code convolves each 8 bit grayscale image with a 31 tap bandpass filter and squares each filtered pixel, sums the results over all pixels and divides the sum by the square of the average image intensity (to correct for illumination instability) as shown in Equation 3.<br>2. An error check subroutine validates the focus value $F_z$ for each of the three grayscale images.<br>3. Program code writes the focus values $F_z$ into the corresponding central arrays for the colors "red", "green" and "blue". |
| c) Providing the relative distances at the output. | 1. The program code creates a subarray which called a restricted power weighted average (PWA)-interval for calculating a reliable best focal position.<br>2. The program code calculates the PWA of the restricted PWA-interval.<br>3. The program code executes the Excel output.vi, which opens an Excel work sheet to save the best focal positions for "red", "green" and "blue". |
| d) Repeating the operational structure at the next z-position. | The program code moves the PIFOC through the next focal position. |

In TABLE 1, step a) represents initiation of measurement, which causes the Hitachi HV-F31F 3-chip CCD video camera to be triggered by the IMAQ1394 Init.vi via the Open Host Controller Interface IEEE1394 port of the host computer. It is important to ROI with the highest number of contrast reversals, e.g. black and white bars. A color image derived by the Hitachi HV-F31F 3-chip CCD video camera reference has to be converted into a 32 bit easy to handle 2-D array by the IMAQ ColorImageToArray.vi. Each value of the 32 bit 2-D array was coded by the following bit depth: [{8 bit}; {8 bit}; {8 bit}; {8 bit}]=[{empty}; {"red" image}; {"green" image}; {"blue" image}]. Using the split number function, the color array can be broken into three 8 bit grayscale arrays which correspond to the colors "red", "green" and "blue". Thus, the individual CCDs of the Hitachi HV-F31F 3-chip CCD video camera may each be represented by an 8 bit grayscale array, wherein each grayscale array corresponds to a respective one of the "red", "green" and "blue" images.

Step b) represents extraction of information about the focal position and the sharpness of the image of a current z-position. Each array has to be processed independently by an autofocus algorithm with a reliable focus function. Preferably, the autofocus algorithm comprises and image content process. See U.S. Pat. No. 5,790,710 and J. H. Price, D. A. Gough: "Comparison of phase-contrast and fluorescence digital autofocus for scanning microscopy", Cytometry 16, pp. 283-97, 1994. One such autofocus function is given by eq. (3):

$$F_z = \frac{\sum_X \sum_Y (h(x) \otimes i_z(x, y))^2}{[\sum \sum \frac{i_z(x, y)}{XY}]^2} \quad (3)$$

where $h(x)$ is a high pass finite impulse response (FIR) filter, i is the image, x, y, and z are the pixel and axial positions, and n and m are the lateral dimensions of the image.

Figure 14:
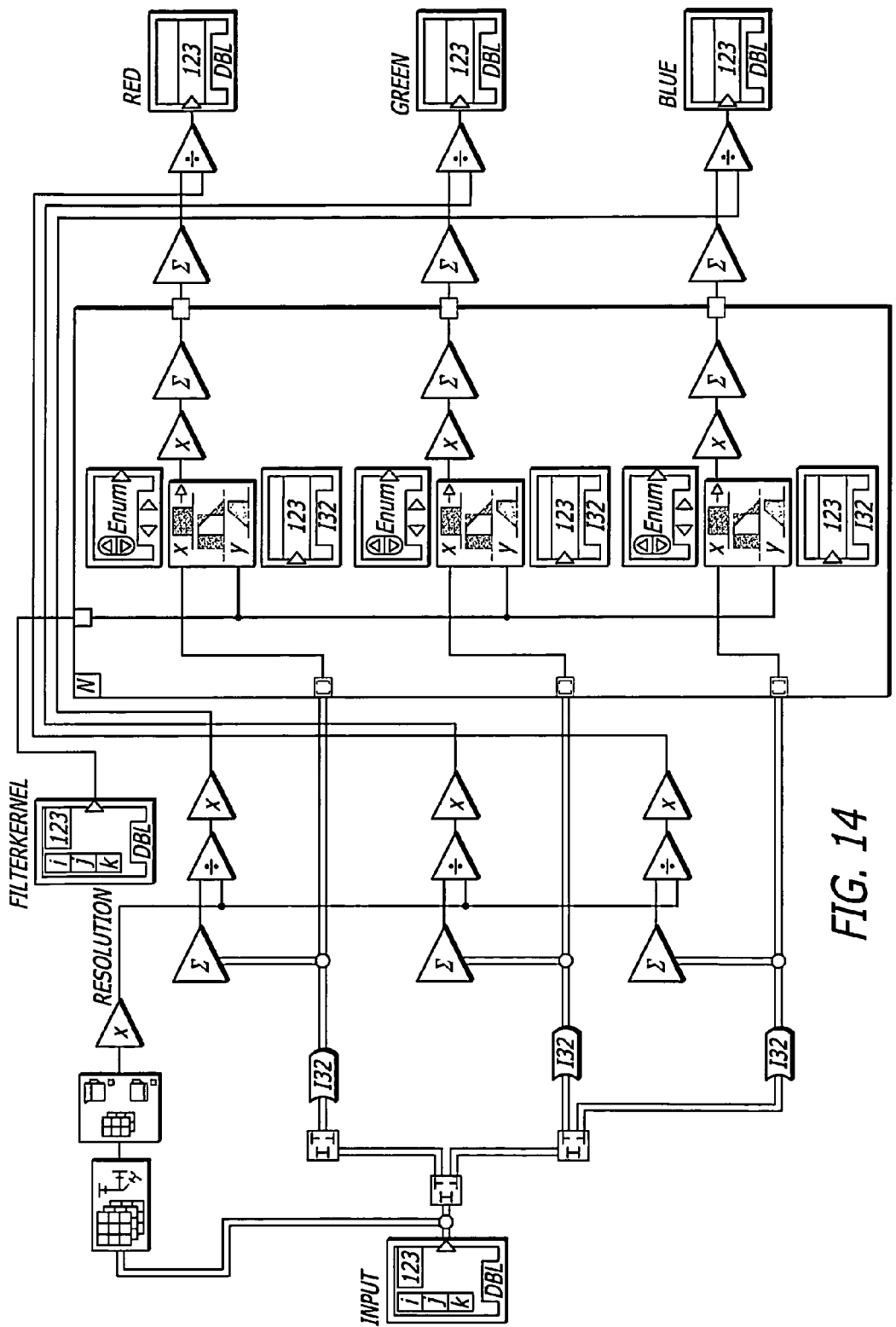
FIG. 14 is a block diagram of an array splitting process, a convolution function, and a correction for lamp fluctuations.

In eq. (3), the focus value $F_z$ is calculated by the sum of the squared values of the isolated high frequency components divided by the square of the integrated intensity of the image $i_z$ to decrease fluctuations in illumination. The high frequency components are the results of the convolution of a 1-D filter kernel in x-direction with each row of the image. The filter $h(x)$ is the 1-D 31 tap convolution highpass filter with the following filter kernel: {0.00701, −0.00120, 0.00185, −0.01265, −0.01211, 0.08346, −0.04688, −0.18633, 0.27488, 0.13864, −0.58840, 0.22454, 0.66996, −0.74667, −0.30163, 1.00000, −0.30163, −0.74667, 0.66996, 0.22454, −0.58840, 0.13864, 0.27488, −0.18633, −0.04688, 0.08346, −0.01211, −0.01265, 0.00185, −0.00120, 0.00701}. This 31 tap filter is centered at $0.84f_c$ and produces a unimodal best focal function curve.[15] The output values are sensitive to light intensity changes such as lamp fluctuations. Thus, the normalization by the square of the summed intensity of the image $i_z$ corrects such fluctuations. FIG. 14 represents a block diagram produced by the Labview® program for calculating $F_z$. The extraction of the three color arrays by the split number function of step a) is shown, too.

Figure 13:
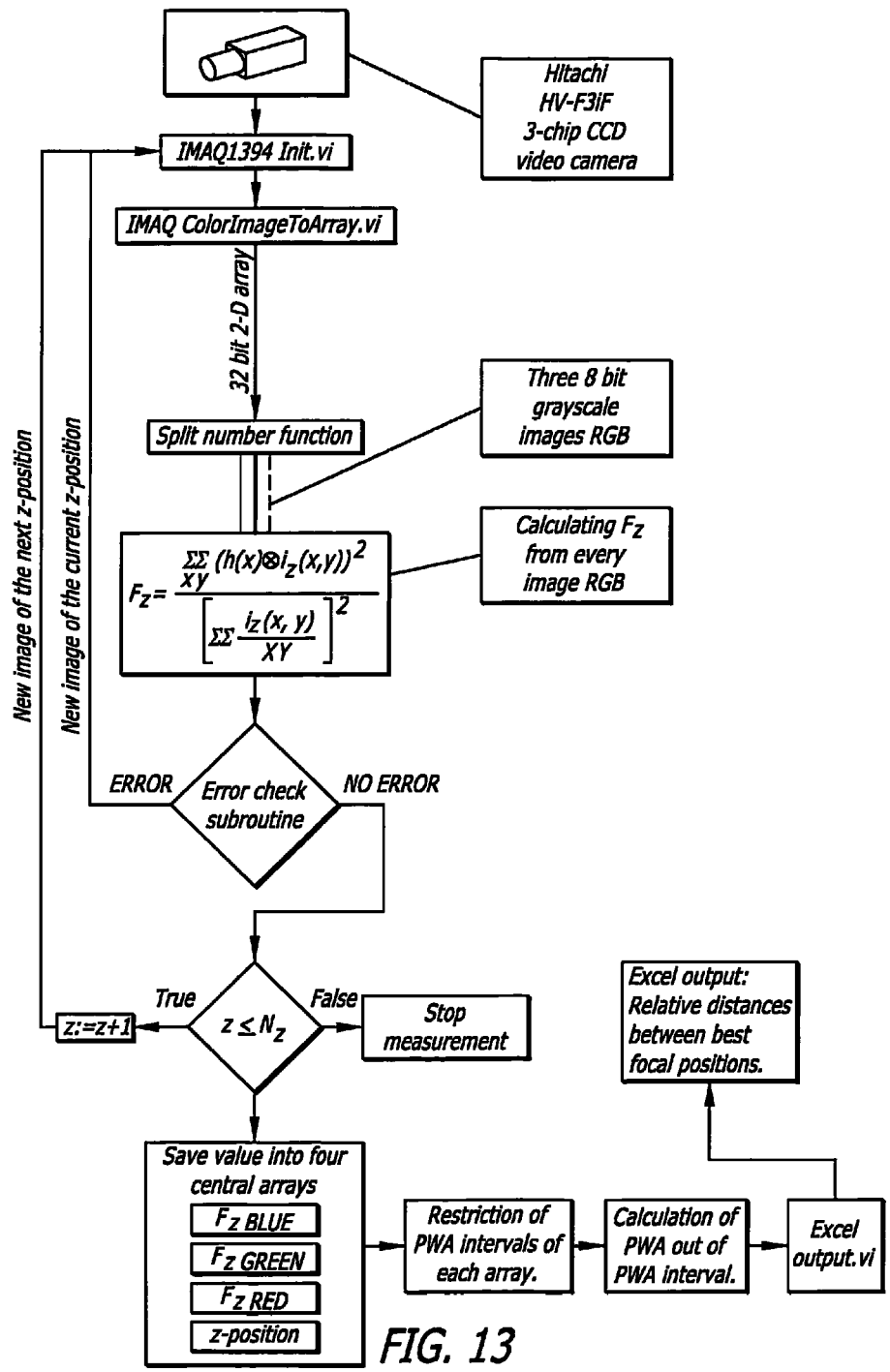
FIG. 13 is a flowchart representing the control mechanization of an automated scanning cytometry system using chromatic aberration for multiplanar image acquisition.

According to FIG. 14 each image provides a set of three values $F_z$ for the "red", "green" and "blue" image. To store those values $F_z$, four central arrays, as they are represented in FIG. 13 are necessary. Three of them, which are the focal function arrays $F_{z\ RED}$, $F_{z\ GREEN}$ and $F_{z\ BLUE}$, are designed to carry the focal values $F_2$ with respect to the z-position. The z-position is regulated by the PIFOC control routine and is stored in the fourth array, called z-position array.

However, resolution increases (and depths of field decrease), focus measurements may be distorted by environmental factors such as vibration, heat, and power fluctuations. For example, undamped vibrations can degrade the focal function curve and produce sharp single local maximums. When the actual global maximum of the focal function curve is close to the best focal position, the true focus position can be influenced by vibrations. Other environmental influences may also degrade the focal function curve and thus also the true focus position. Once example of such a randomly occurring error possibly associated with operation of the video camera deformed the image and caused the focal function to produce a sharp single local maximum analog to the maximum, which may have been caused by vibrations. Manifestly, these effects can be substantially mitigated, if not avoided altogether by a system construction including mechanical isolation of optical elements and a well-conditioned uninterruptible power source.

Figure 15:
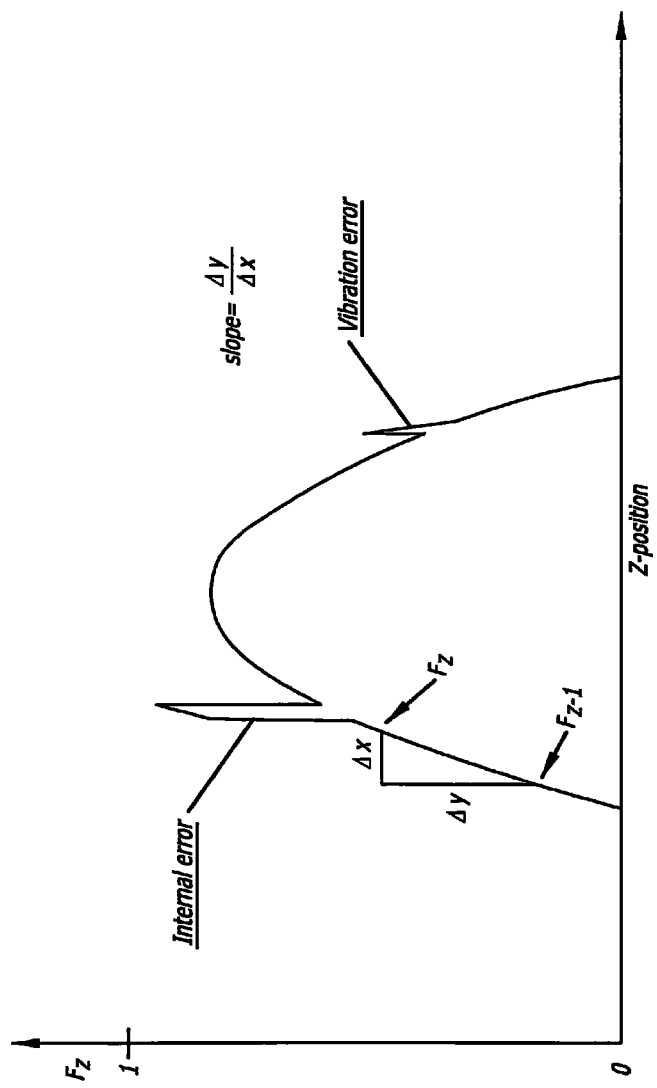
FIG. 15 is a focal function curve, with errors shown as local maximums.

In fact, in order to determine to scope and magnitude of environmental and operational effects, error checks may be provided in system software. In this regard, an error check subroutine was written into the Labview® code. This subroutine works as a Boolean comparator of a default maximum slope (in %) and the current slope (in %) of the focal function curve. The default maximum slope is necessary for initializing the system and can be estimated by the experimenter. It just effects the time needed for one measurement, not the focus values $F_z$. The current slope is calculated by the differential quotient of the current value $F_z$ and the previous value $F_{z-1}$, where the prime value $F_{z=0}$ is maintained without the error check subroutine. In case the current slope of the focal function curve is bigger than the default maximum slope, an error warning occurs and a new image will be acquired at the same z-position. If the new value $F_z$ passes the error check subroutine, the value $F_z$ is stored into the central arrays. FIG. 15 shows a focal function curve including an environmental error caused by vibrations and a system operational error associated with an intermittent camera malfunction.

Figure 16:
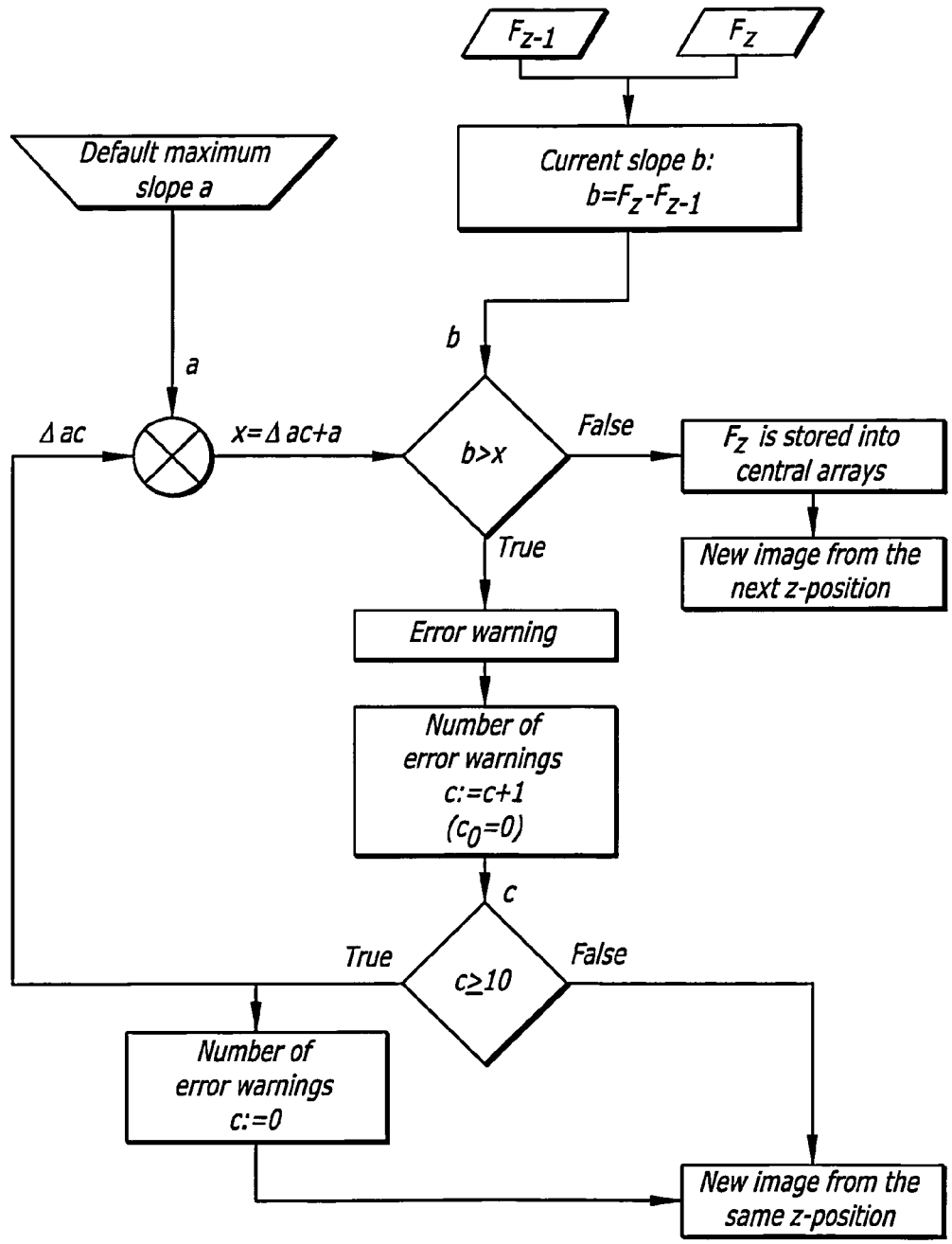
FIG. 16 is a flowchart of an error check subroutine.

In cases where the trend of the focal function curve itself shows a slope that is bigger than the default maximum slope, the error check subroutine does not stop providing error warnings, even though there is no mechanical vibration or camera malfunction. For this reason, the default maximum slope may be treated as an upwardly dynamic value. In the exemplary error subroutine, this slope increases when there are ten successive error warnings at the same z-position. At this point, the changed default maximum slope becomes an adjusted maximum slope. Presuming that errors caused by vibration or operational malfunctions usually in general last for about four error warnings the error check subroutine may be qualified to create relatively smooth focal function curves. Aside from the side peaks and the global peak position, no local maximum occurs. Connectivity of the error check subroutine with autofocus values is represented in the flowchart of FIG. 16.

Figure 17:
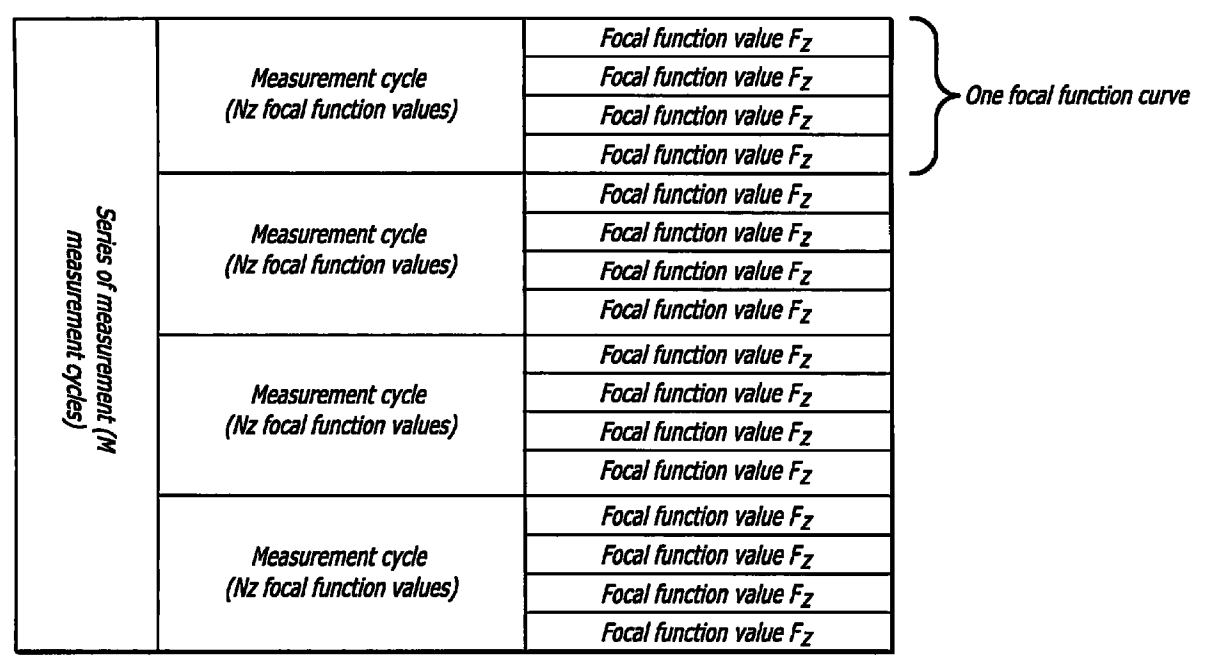
Figure 18:
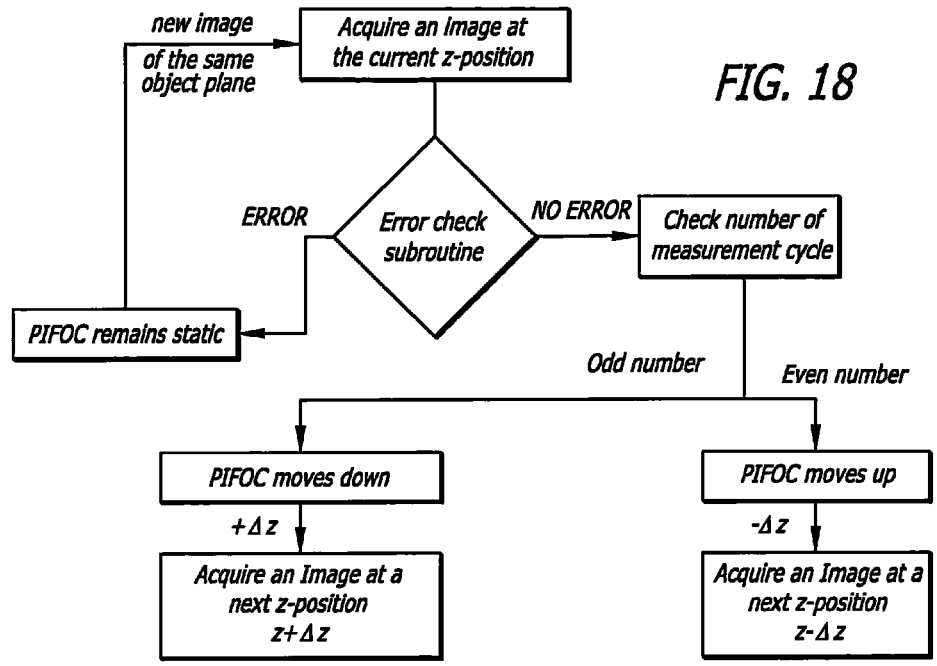
FIG. 18 is a flowchart of a control routine for a piezoelectric objective positioner controller.

Presume that one focus function curve for each color is acquired when the PIFOC is moved through a z-axis interval (search range), which includes the best focus position. Note that "best focus position" relative to the focus measurement camera(s) is predetermined in a calibration procedure in reference to another focus function curve simultaneously recorded using the fluorescence camera at the appropriate fluorescence wavelength. In the following explanation, acquiring one set of focal function curves, including the focal function curves for "red", "green" and "blue", is referred to as a measurement cycle. One measurement cycle is one element of one series of measurements. FIG. 17 represents the hierarchy of the measurements. In an exemplary set of measurements, for example, the z-axis interval (search range) for one measurement cycle was set to a range of about 4 μm with 200 samples (z-positions), with a step size Δz of about 20 nm. Images $i_Z$ were acquired at each z-position. The movement of the object plane of the objective through the best focal position of the specimen is controlled by a PIFOC control routine. The PIFOC control routine was used for experiments directed to showing that chromatic aberration is sufficient for sampling axial imaging space. The causal connection of the PIFOC control routine described below is shown in the flowchart of FIG. 18.

The PIFOC control routine may cause the PIFOC to remain unchanged if one of the mentioned errors occurs. In such a case, the system is able to acquire a new image of the same object plane. Or, to avoid unnecessary delays, the focus measurement in error may simply be excluded from the best focus calculation. When no error occurs, the number of the actual measurement cycle determines whether the PIFOC moves up or down. A series of measurements of about twenty measurement cycles, for instance, may consist of ten odd and ten even numbered cycles performed as ten forward and ten backward motions. Each of these motions, either the forward or the backward motion, is divided into a specific number of different z-positions within the measurement interval. For controlling the PIFOC in closed loop mode, each z-position corresponds to a direct current (DC) voltage value. For example, a voltage of 10 V may match an amplitude of the PIFOC of 100 μm. To be able to provide this voltage as an analog output of a standard data acquisition element such as the NI PCI-6031E data acquisition board, the Labview® DAQ (data acquisition) Assistant, which includes a compatible hardware driver, is used. The DC voltage data input of the DAQ Assistant is fed by a Simulate Signal function, provided by the Labview® code.

As thus far described, the system is able to capture focal function curves such as are plotted in xy-graphs A, B, and C per FIG. 20. A visual comparison of focal function curves with various maximums and minimums is difficult. However, normalized focal function curves can easily be compared to each other. The normalized focal function curve A of FIG. 20 can be generated by a normalization algorithm which subtracts the minimum focus value from every focus value $F_z$ of the entire focal function curve and afterwards divides each focus value $F_z$ by its maximum value $F_z$. Thus, the maximum of each focal function curve is normalized to 1.0 and the minimum is normalized to zero. In FIG. 20, the normalization of graph A is shown in graph B.

Figure 19:
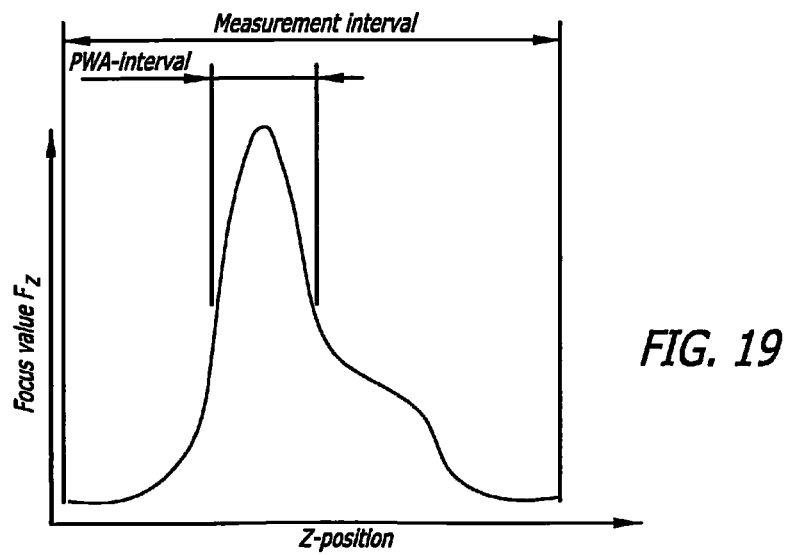
FIG. 19 is a graph representing a symmetrical power weighted average (PWA)-interval.

Step c) extracts the best focal positions from the acquired focal function curves. For example, the best focal position, may be obtained by calculating a power weighted average (PWA) out of the stored focal function values F. See U.S. Pat. No. 5,790,710 in this regard. Using the PWA, as it is implemented in eq. (4) for example, may require a relative symmetric interval around the peak position of the focal function curve. If the focal function curve is not symmetric, the best focal position $W_a$ may shift in that direction which includes most values $F_z$, and this shift is more of a problem for low powers of n in eq. 4 and during calibration where z is large. FIG. 19 presents such a symmetrical PWA-interval. Without the PWA-interval, the calculation of the PWA over the entire measurement interval could produce an error that could be larger than the corrected error.

$$W_a = \frac{\sum_z z(F_z)^n}{\sum_z (F_z)^n} \qquad (4)$$

For symmetrical focal function curves, each focal function curve may be restricted to a constant PWA-interval. For example, the PWA-interval may be centered at the approximate peak position of the focal function curve. The restricted PWA-interval in graph C of FIG. 20 shows that each focal function curve is almost symmetrical.

Figure 21:
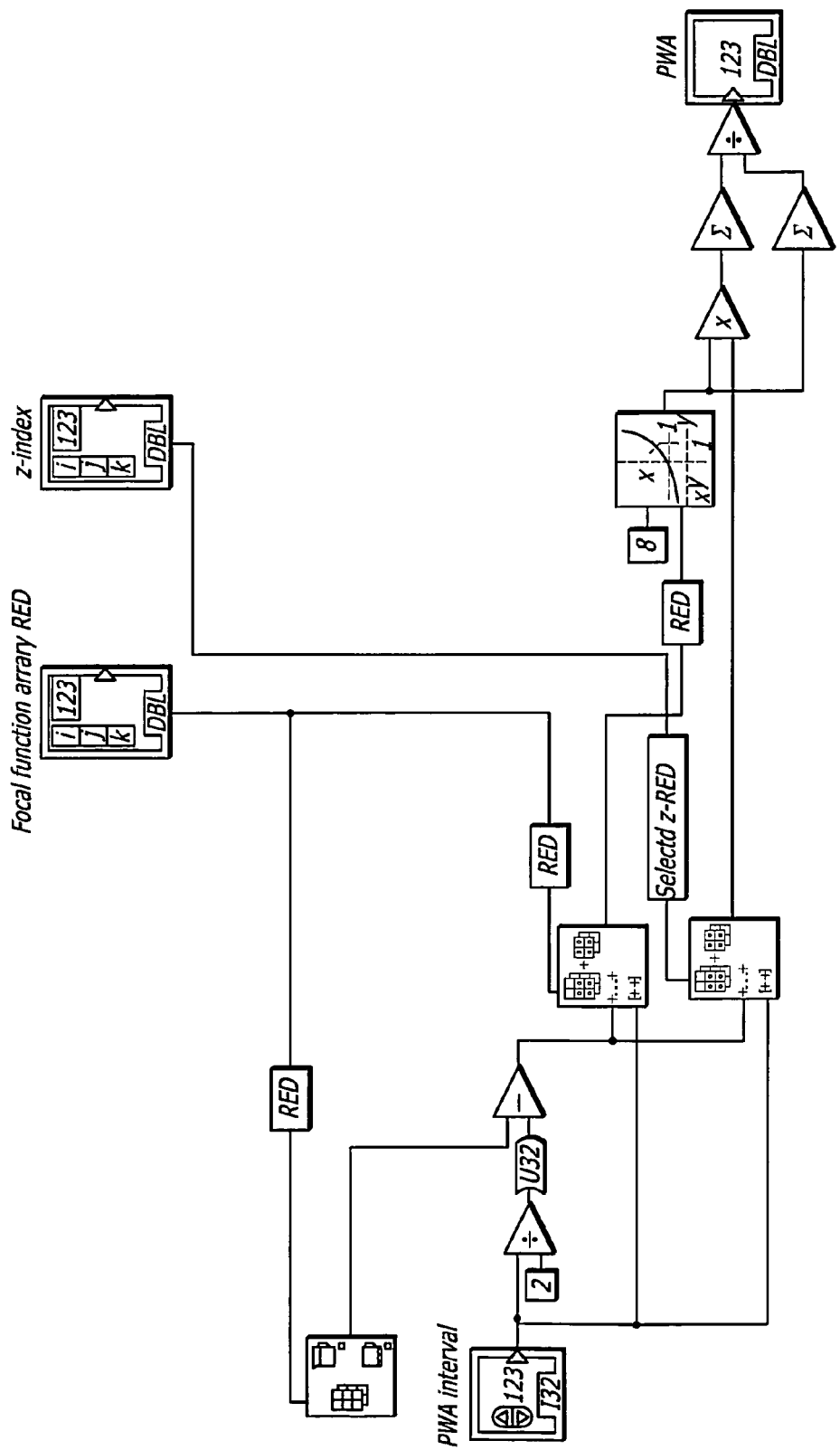
FIG. 21 is a block diagram showing a PWA algorithm in combination with a restricted PWA interval.

Realization of a PWA with a restricted PWA interval may be realized, for example, by searching the maximum value $F_z$ using the Labview® Array Max & Min tool. In this case, the predetermined maximum index of the focal function array may be used as the center of the PWA interval. Using the Array Subset tool, a restricted array for each focal function curve for the wavelengths "red", "green" and "blue" and a restricted array for the corresponding z-positions can be isolated. For example, in FIG. 21, the PWA is calculated using the "red" central array and its corresponding z-index. On the left part the PWA-interval is restricted and on the lower right part the PWA is calculated using the restricted data.

Figure 22:
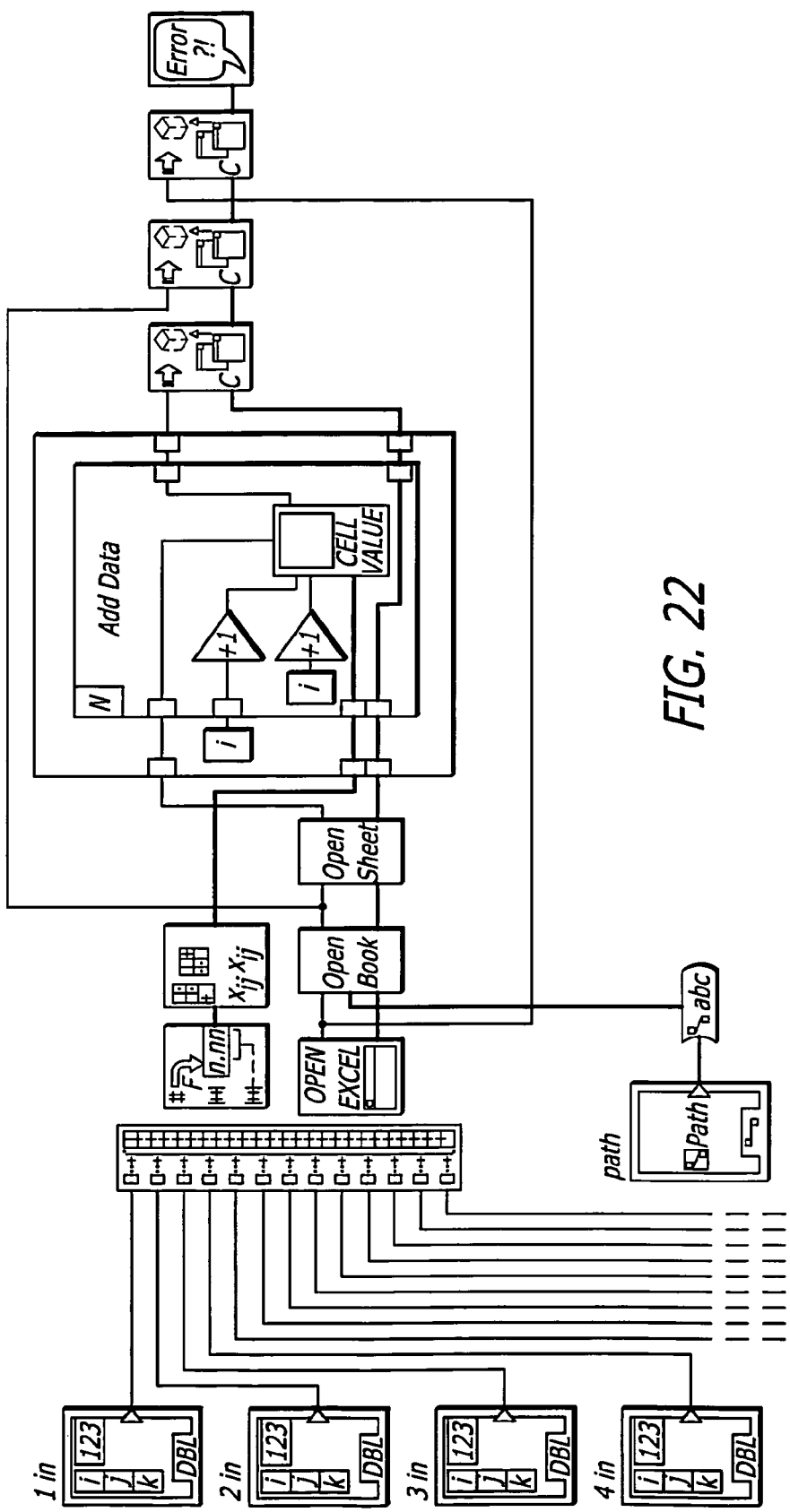
FIG. 22 is a diagram of a spreadsheet output.

Preferably, the calculated PWA, respectively the best focal position, is stored into an array which is connected to the Excel® output.vi. When the entire series of measurements is executed, three arrays "red", "green" and "blue" are given as the input of the Excel® output.vi. The Excel output.vi shown in FIG. 22 is a modified version of the Excel® Macro Example.vi from the NI Example database. It opens a given *.xls Excel® worksheet and writes down the cell values. The user may verify the acquired data by saving the Excel® worksheet.

It may be noted that, due to the instability of the z-axis with respect to the temperature, processing of the absolute best focal positions will provide data that interferes with a temperature dependent function. In such a case, calculating just the distances between the best focal positions may eliminate the influence of temperature. For an understanding of this effect, the Excel® worksheet was used to calculate distances between the "red" and the "green" best focal positions as well as the distances between the "blue" and the "green" best focal positions. Parallel to the distances the standard deviation (SD) is determined. A SD higher than five percent may reveal temperature effects which can affect the later-calculated average.

Glass as a well researched optical material is described in a substantial body of knowledge about its properties. Preferably, although not necessarily, glass elements are used to produce the desired chromatic aberration. Advantageously in this regard, glass has a relatively small temperature coefficient and exhibits a wide range of dispersion. With respect to transmitted wavelength, low-dispersion glass with high Abbe-numbers, such as N-BK7, exhibits a relatively low variation of the index of refraction. High-dispersion glass with small Abbe-numbers, such as N-SF66, exhibits a relatively large variation of the index of refraction.

Figure 23:
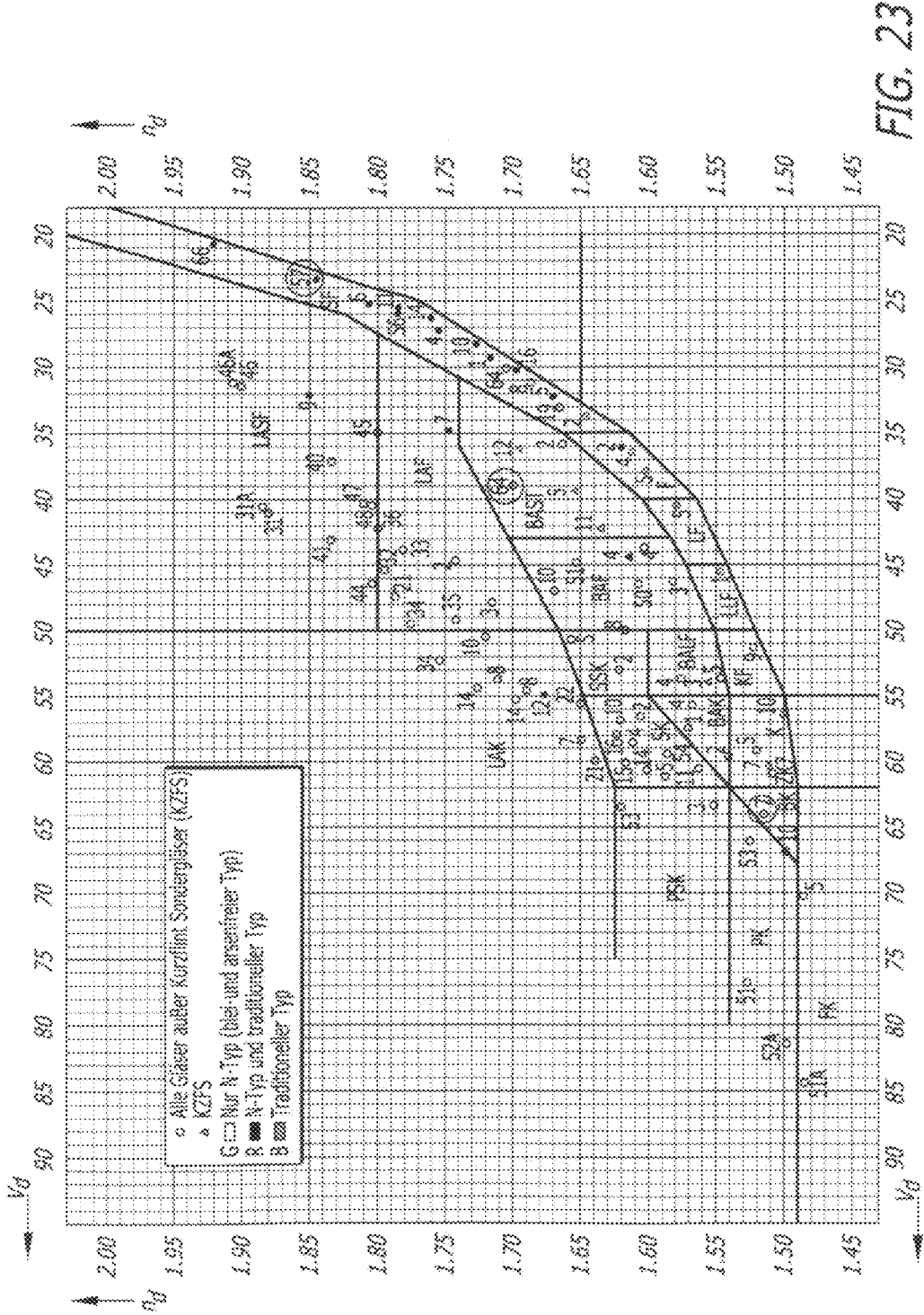
FIG. 23 is an Abbe-Diagram provided by Schott®.

FIG. 23 presents an Abbe-diagram. It nearly contains many of the types of glass used in industry. When using glass as the dispersing optical element, price, availability, mechanical sensitivity and a distribution within a desired dispersion range should be considered. For example, the red circled instances of optical glasses, N-SF57 (Schott), N-BASF64 (Schott) and N-BK7 were used for an experimental setup to measure performance of an automated scanning cytometry system and method using chromatic aberration for multiplanar image acquisition.

For the measurement, three pieces of N-SF57 ($n_e$ 1.85504) with a thickness of 5.70 mm, 10.70 mm and 12.20 mm, three pieces of N-BASF64 ($n_e$ 1.70824) with a thickness of 6.10 mm, 11.30 mm and 11.80 mm and five stacks of N-BK7 ($n_e$ 1.51872) with a thickness of 1.00 mm, 4.10 mm, 6.20 mm, 9.30 mm, 11.40 mm were used. Stacks of N-BK7 were made of 1.00 mm plain microscope slides by Fisher Scientific (catalog No. 12-549). They were put together with Cargille non-drying immersion oil, formula: Code 1248; Type B, n(e)=1.5180+/−1-0.0002.

Oil immersion was used to fill the gaps between the optical components, eliminating the glass-air interfaces. As a result, the occurrence of reflections was reduced and optical transmission as well as light efficiency of the entire system was increased. Without an index of refraction matching oil immersion, the transmission of light would be 96% at every interface. For a stack of 11 slides there are 22 glass-air interfaces. Considering a transmission of 96% (without antireflective (AR)-coatings) and 22 interfaces, its total optical efficiency calculated using eq. (5) would be about 40.7%. However, oil immersion thickens the stack and thus the true thickness has to be determined. A Fisher scientific microscope cover glass (catalog No. 12-542C), with a 0.10 mm thickness, was used as an infinitely thin, two surface air reference. Table 2 presents the used lot of glass.

$$\text{opt.efficiency} = \text{opt.transmission}^{(number of glass-air interfaces)} \quad (5)$$

TABLE 2

| Glass sample | Diameter (mm) | Thickness (mm) | Length (mm) | Width (mm) |
|---|---|---|---|---|
| N-SF57 5.5 | 11.90 | 5.70 | | |
| N-SF57 11 | 15.90 | 10.70 | | |
| N-SF57 12 | 21.00 | 12.20 | | |
| N-BASF64 5.5 | | 6.10 | 15.20 | 15.20 |
| N-BASF64 11 | 28.70 | 11.30 | | |
| N-BASF64 12 | 37.00 | 11.80 | | |
| Coverslip | | 0.10 | 25.00 | 25.00 |
| 1 slide N-BK7 | | 1.00 | 75.60 | 25.10 |
| 4 slides N-BK7 | | 4.10 | 75.60 | 25.10 |
| 6 slides N-BK7 | | 6.30 | 75.60 | 25.10 |
| 9 slides N-BK7 | | 9.30 | 75.60 | 25.10 |
| 11 slides N-BK7 | | 11.30 | 75.60 | 25.10 |

Experiment 1:

Experiment 1 was carried out to evaluate the use of chromatic aberration in combination with a microscope imaging system for realizing a parallel scan of multiple object planes. A 3-chip CCD camera enabled the system to form three independent images and their corresponding object planes. Due to the chromatic aberration characteristics those object planes were axially separated. Thus, the specimen could be sampled axially in three different object planes at the same time. The goal was to vary the distances between those object planes by varying the chromatic aberration. Different planar glass samples were placed within the optical light path to alter the chromatic aberration.

The experiment was done with the system configuration specified in this detailed description. Each glass sample was used for one series of measurements. The glass sample was centered on top of the shifter and the shifter itself was placed within the C-mount adapter. Considering the expansion of the microscope parts, the system was warmed up before the measurement started. Ignoring the warm up could cause the focal function curves to shift out of the measurement interval in z-direction. Thus, that the glass would also become a part of the system, it was preheated with a Fisher Scientific model 77 slide warmer. The environmental temperature within the laboratory fluctuated between 22 to 24° C. The warmed up temperature of the C-mount adapter was about 27° C. To roughly overcome the temperature difference of about 5° C., the slide warmer was set to 28° C.

Figure 24:
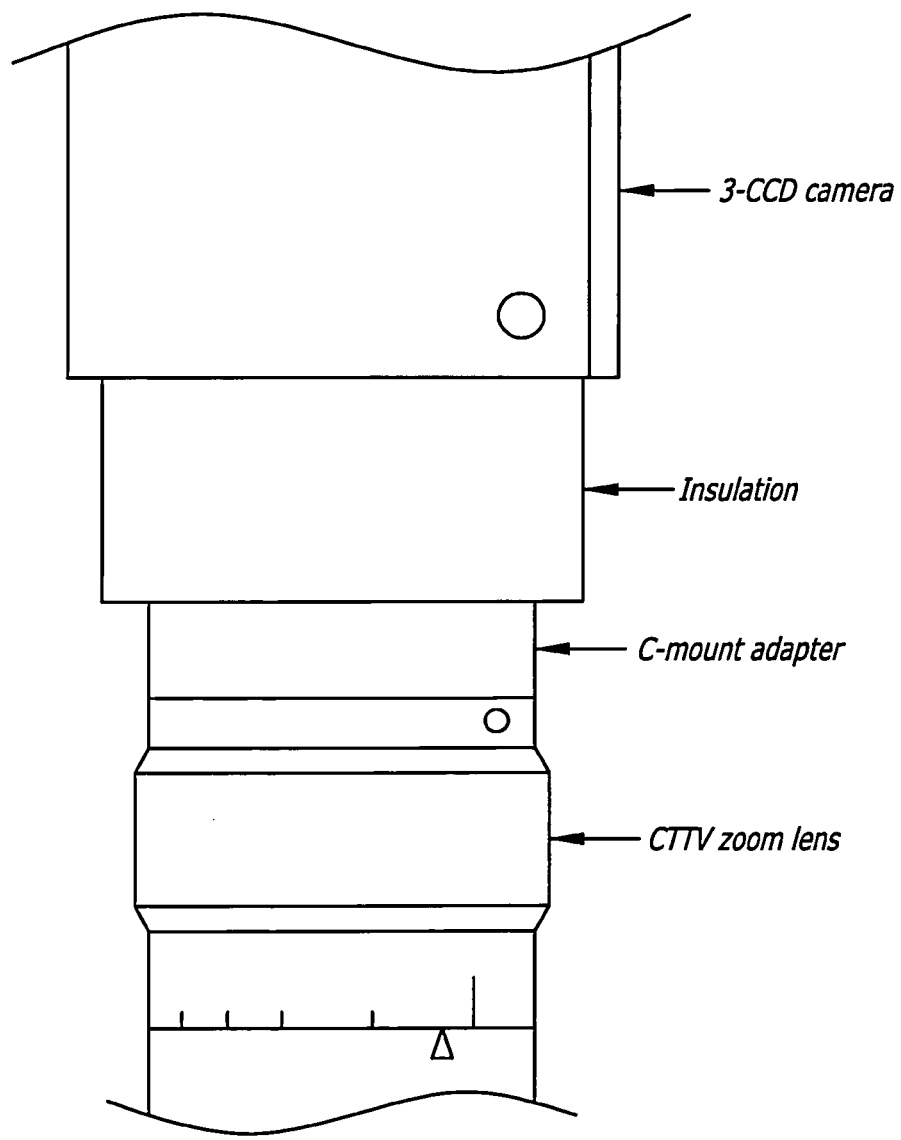
FIG. 24 shows positioning of insulation at the C-mount adapter of FIG. 8.

However, it was noted that lightly streaming air around the microscope and light scattering still produced some local maximums within the focal function curves. To prevent this and keep the temperature steady, the hole of the C-mount adapter was sealed with insulation as shown in FIG. 24.

The configuration of the Labview® program required that the camera receive a ROI of 640×30 Pixels and a 32 bit RGB color image. A larger ROI decreased the measurement speed and without increasing the SNR. The ROI was centered within the image of the micrometer slide to capture a maximum number of black to white reversals.

The search range in z-direction was set to 4.00 μm with a step size of 20 nm. Thus, the acquired focal function curve provided a resolution of 200 samples per measurement cycle. The default maximum slope (modulus) was set to five percent to prevent local maxima caused by CCD malfunctions or vibrations. To achieve correct comparison of the current slope and default slope, the very first value of $F_z$ had to be free of these errors. The PWA interval was set to 100 samples with the absolute maximum at the center of the interval. To obtain approximately symmetrical PWA intervals, the focal function curves were best possibly centered within the search range. The number of measurement cycles done for one sort of glass was 20; thus, each piece of glass was used for 20 measurement cycles, and each measurement cycle yielded a set of three best focal positions for "red", "green" and "blue".

An Excel® file served as the output of the Labview® code. This file was used to calculate the distances between the acquired best focal positions of the object planes. When the measurement was completed, the file was saved manually. Afterwards, 20 successively acquired distances for one piece of glass were averaged to one average distance. At least two of those average distances are obtained for each piece of glass.

Experiment 2:

Experiment 2 was carried out to verify that the imaging system was capable of simultaneous acquisition of 2-D images by parallel focusing on axially displaced object planes within a specimen space. Using an infinite thin specimen, like the microscope micrometer slide, allowed for a successively sweeping through the individual object planes defined by the "red", "green" and "blue" wavelengths. The assistance of the focal function curves which indicate the best focal position for each wavelength enabled the identification of images with maximum resolution.

Figure 25:
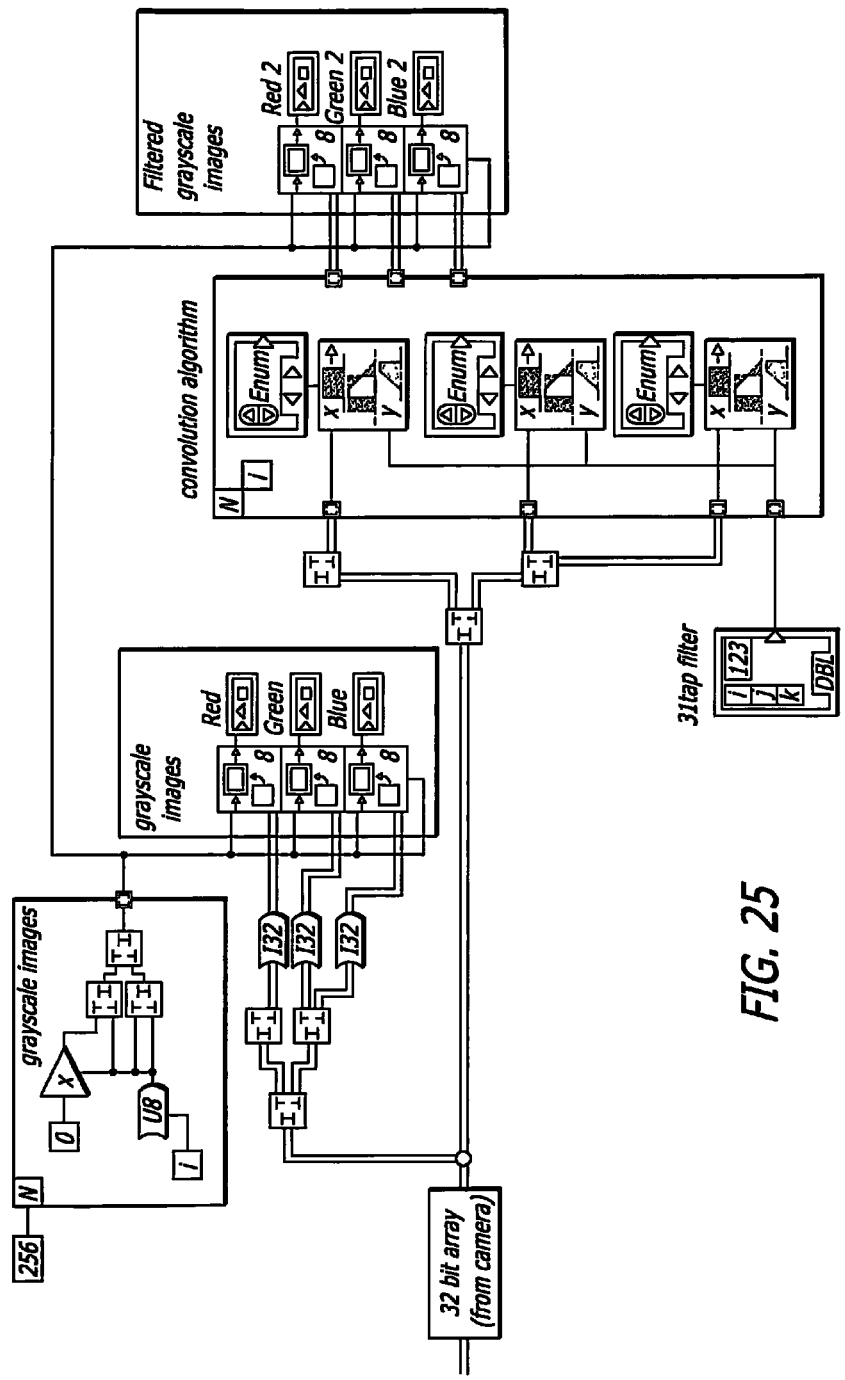
FIG. 25 is a schematic diagram of for simultaneously providing three original and filtered grayscale images.

The experiment ran with the imaging system configuration specified in this detailed description and a stage micrometer slide was used as a test specimen. For acquiring images, a modified section of the program code was required. In FIG. 25, the section of the program code was upgraded to create three grayscale images and three spatial filtered grayscale images, each of them corresponding to one object plane within the specimen space. For the spatial filtering, the 31 tap highpass filter was used. Highpass filtering enabled visualization of high spatial frequencies in the images. The three grayscale images and their corresponding filtered grayscale images were simultaneously displayed on the computer screen.

Since the object planes were estimated to be separated by just a submicron, human vision was not able to distinguish adjacent object planes. Corresponding to FIG. 26 and due to the fact that human vision has a large depth of field, it was just possible to determine the best focus subjectively. To overcome this problem, the focal function curves were also plotted on the screen. The peak position within a focal function curve indicated that the corresponding object plane was in focus.

During the experiment, three sets of images were acquired. Each set contained three images which were acquired simultaneously, one image in focus and two images out of focus. An appropriate schematic is shown in FIG. 27.

Experiment 3:

Ray tracing is an extensively applicable technique for modeling the propagation of light through an optical system like a bright field microscope. Winlens® 4.4 optical design software and a reduced version of the experimental setup of the imaging system were used to determine a theoretical path of the light rays traversing through the system. The goal was to obtain a dataset which confirmed the results of experiment 1 and revealed basic connections between the sort of glass, its thickness and the distances between the object planes.

Figure 28:
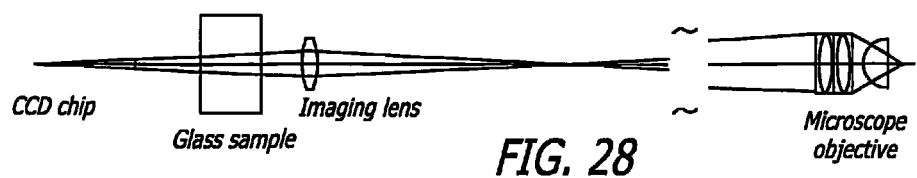
FIG. 28 is a ray trace of a reduced version of the imaging system.

Ray tracing applied to the optical component design produced the representative optical schematic in FIG. 28. The ray tracing analysis was completed using "red" light at 604 nm, "green" light at 522 nm and "blue" light at 462 nm.

Figure 29:
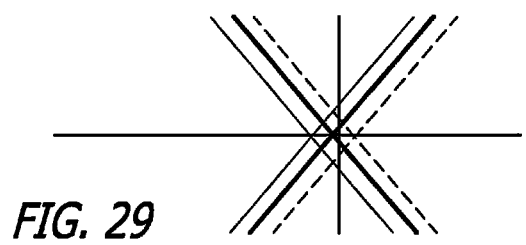
FIG. 29 is a zoom of the front focal region.

The image plane is found on the left-hand in the schematic of FIG. 28. There, the CCD sensor plane defines the optical space, where the "red", the "green" or the "blue" sensitive CCD of the 3-chip CCD camera is placed. The optical component next to the image plane in FIG. 28 is the glass sample. During the experiment the glass sample was modified in thickness and index of refraction. The imaging lens on the left-hand of the glass sample has an effective focal length (EFL) of about 24.54 mm and is made of N-BK7. The microscope objective consists of three optical components, two achromates and one plan convex lens. Each achromate is composed of a N-SF2 and a N-BK7 lens and has an EFL of about 38.11 mm. The achromates with their chromatic correction character are necessary to form an aplanat which corrects the microscope objective for chromatic aberrations. Since a 0.75 NA is necessary to resolve relatively small details within the specimen and spherical aberration increases with a large angle of incidence and reflection, a plan convex lens is included within the system, too. Its arrangement within the light path enlarges the cone angle and reduces the angle of incidence and reflection of the lens. The specimen plane is on the right-hand of the microscope objective. Despite the chromatic correction of the microscope objective the system still provides enough chromatic aberration to form disaccording object planes, which can be seen in FIG. 29.

Without a glass sample inside the ray diagram, the overall magnification of the optical system is about 20. The intermediate image plane is placed about 140 mm in front of the first surface of the microscope objective.

During the experiment, the thickness of the glass sample was varied from 0 mm up to 12 mm, while the image distance for paraxial rays was written down for each wavelength, "red", "green" and "blue". This variation was done for three types of glasses: N-BK7, N-BASF64 and N-SF57.

Figure 30:
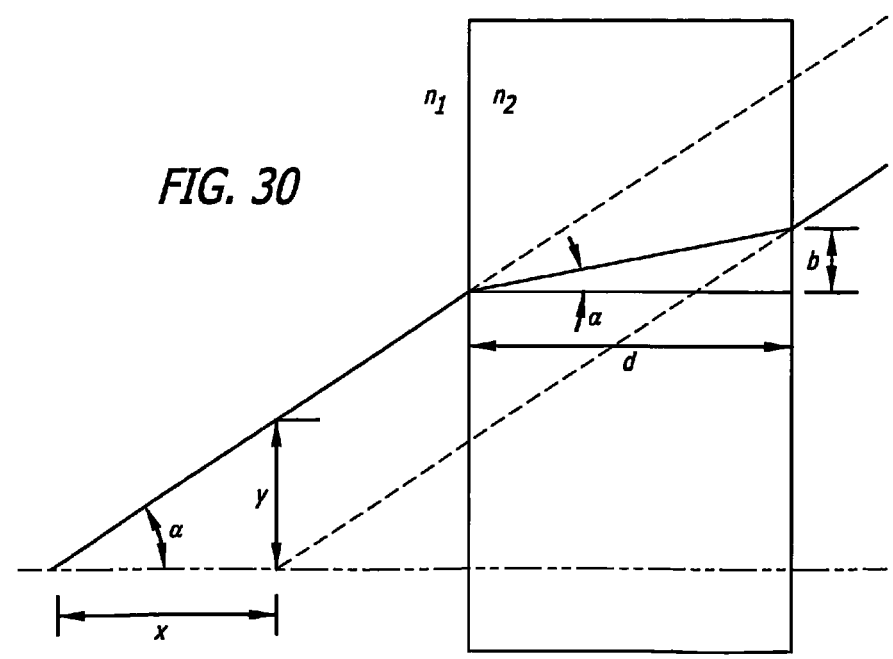
FIG. 30 is a monochromatic light from medium n1 passes a coplanar glass sample of the medium n2.

FIG. 30 demonstrates the refraction of a monochromatic beam of light which passes a coplanar glass sample with an index of refraction of $n_2$ and a thickness of d. It is shown that the coplanar glass sample affects just the optical path length but not the direction of the light. Equations (6)-(9) represent the coherence between the parameters in FIG. 30. A linear relationship, eq. (10) between the axial shift x of the image distance and the thickness d of the glass sample is obvious. Due to the Gaussian lens formula a change of the image distance is directly and linearly combined to a change of the object distance with respect to a constant EFL of the optical system. Considering the phenomenon of dispersion, the system causes multiple object distances, respectively object planes, each corresponding to a specific wavelength. In eq. (10) the constant c represents the slope of the linear function. The constant c is directly affected by the specific angle of refraction α', which in turn is influenced by the optical medium and the wavelength. Consequently, the position of each object plane is also linearly influenced by the variation of d.

$$\tan(\alpha') = \frac{b}{d} \tag{6}$$

$$\tan(\alpha) = \frac{y}{x} = \frac{y+b}{d} \tag{7}$$

$$\left[1 - \frac{\tan(\alpha)}{\tan(\alpha')}\right] * d = x \tag{8}$$

$$\left[1 - \frac{\tan(\alpha)}{\tan(\alpha')}\right] = c \tag{9}$$

$$c * d = x \tag{10}$$

Based on those considerations the obtained dataset will probably generate a chart similar to the left hand graph in FIG. 31. Here x demonstrates how the distance between two object planes is influenced by the thickness d of a glass sample. In the right hand graph, the distance x is the distance between two corresponding focal function curves (1) and (2) of the object planes. The offset $x_O$ is the original distance between two object planes produced by the usual chromatic aberration of the system. The indices of refraction of the glass samples are indicated by n.

Experimental Results:

Experiment 1:

Experiment 1 was carried out to determine the feasibility of changing the distances between the object planes within the specimen space. Referring to FIG. 31 the distance x between the best focal positions of two focal function curves {1} and {2} also represents the distance between two object planes. The theoretical trend shows that an increasing thickness of the glass sample should cause an increasing distance between the two object planes.

Figure 33:
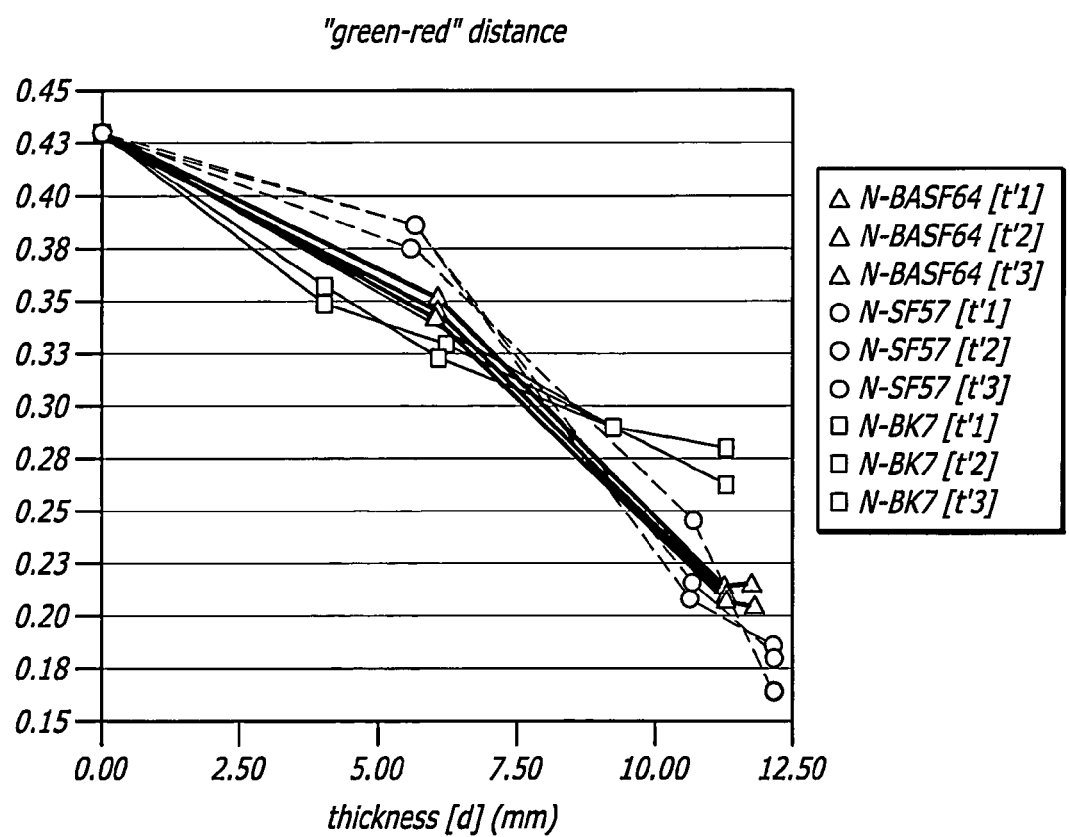
FIG. 33 is a plot of green-red distance versus the variation of thickness of the glass samples with different indices of refraction.

FIG. 32 and FIG. 33 present experimental results of inserting glass samples of variable thickness and index of refraction into the microscope light path. The labeling [a'1]-[a'3] and [b'1]-[b'3] within the legends present independent independent measurements ("average" measurements), in which each measurement was calculated by the average of 20 measurements. The test time for one of the 20 measurements was about one minute. FIG. 32 describes the "green-blue" distance which is defined as the distance between the object planes formed by the "blue" light at 462 nm and the "green" light at 522 nm. FIG. 33 describes the "green-red" distance which is defined as the distance between the object planes formed by the "red" light at 604 nm and the "green" light.

It is clear that an increasing thickness d or index of refraction n of the glass samples affects the absolute distance between the object planes. In FIG. 32 the "green-blue" distance increases with an increasing thickness of the glass samples and also the slope increases with respect to the increasing index of refraction n ($n_{[N-BK7]} < n_{[N-BASF64]} < n_{[N-SF57]}$).

The theory predicts increasing distance with respect to an increasing thickness and the increasing slope of the curves with respect to an increasing index of refraction of the glass samples. However, in experiment 1 the slope of the "green-red" distance of FIG. 33 is negative which indicates a decreasing distance. In FIG. 33 it is also shown that the curves cross each other and the direct correlation between the slope and the index of refraction of the glass sample used is less clear. This may be due to the fact that microscopes are complex optical instruments with many optical elements, the combination of which is designed to decrease chromatic and other aberrations. Without more complete modeling, the full complexity of this system is not easy to predict. The conclusion is that insertion of different glass samples can be used to change the chromatic aberration, but the exact differences and trends are better determined by experimental calibrations.

Experiment 1 shows that glass within the microscope light path can change the distance between the object planes that are formed by different wavelengths. The "green-blue" distance changed from 2.18 μm up to about 2.62 μm as read from FIG. 32, for a maximum change in distance of about 0.44 μm (using the N-SF57 12 glass sample). The "green-red" distance in FIG. 33 shows a maximum change of about 0.26 μm, from about 0.43 μm to about 0.16 μm (using the same glass sample). All measurement values that were acquired by the experimental setup of experiment 1 resulted in a SD that was smaller than five percent.

Figure 34:
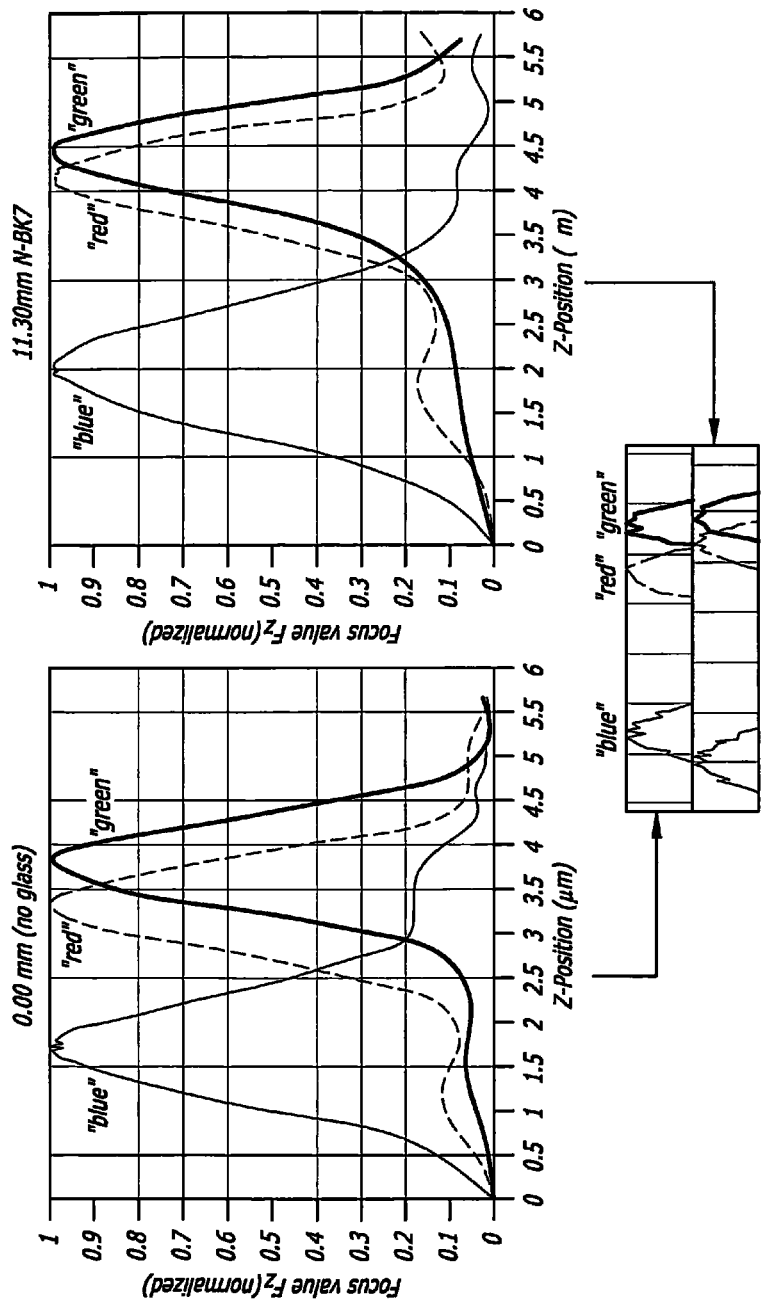
FIG. 34 illustrates how a glass sample in the microscope light path influences object plane position.

FIG. 34 represents a direct comparison of how a glass sample within the microscope light path influences the position of the object planes. There, the peak regions of the focal function curves are normalized so that one is able to compare them easily. Between the left and right family of curves in FIG. 34, the "red" and "green" curves converge closer together and the "blue" and "green" curves diverge farther apart. It is also noticeable that the pairs of focal function curves are not exactly the same. Due to their constellation, a default distance, an offset, can be measured, which is about 2.18 μm for the "green-blue" distance and about 0.43 μm for the "green-red" distance. Referring to FIGS. 32 and 33 this offset indicates that the y-axis of the "green-blue" distance chart starts at 2.15 μm and the y-axis of the "green-red" distance chart starts at 0.15 μm. Since the offset is large against the change of distance, it is more advantageous for visualization to remove the offset.

Experiment 2:

The experiment described hereinafter was carried out to demonstrate the capability of the system to acquire 2-D images simultaneously from different object planes within the specimen space. The 3-chip CCD camera which observed the specimen provided one set of three images. The object planes, corresponding to the three CCDs, were displaced to each other in z-direction and did not concur. Due to the thin specimen (micrometer slide) only one object plane can be in focus at one time. Thus, one of these three simultaneously acquired images provided most contrast and two of them are blurred.

Figure 35:
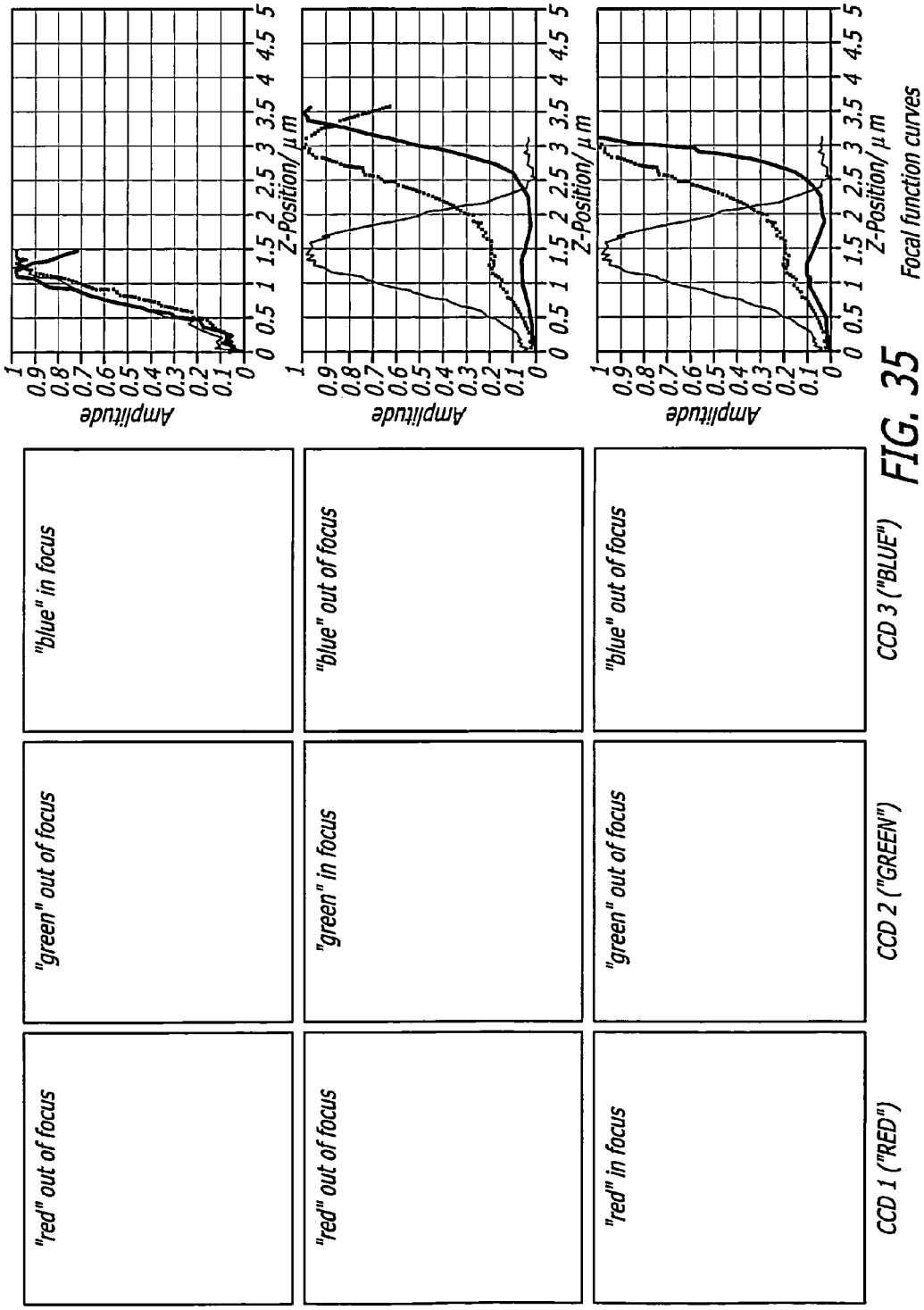
FIG. 35 illustrates multiplanar image acquisition with a micrometer slide.

As soon as one set of images was saved the microscope objective was moved in the z-direction until another object plane concurred with the specimen plane. The once sharp image blurred and an adjacent image exhibited the most contrast. This procedure was done three times (three sets), for each object plane, which resulted in nine images as shown in FIG. 35. To quantify each object plane within the z-range, the focal function curves are shown on the right-hand part of FIG. 35, where the "blue" curve corresponds to CCD 1, the "green" curve to CCD 2 and the "red" curve to CCD 3 of the 3-chip CCD camera. With no glass sample in the microscope light path, object planes for the "blue" and "green" wavelength were observed with a distance of about 2.15 μm. The "red" and "green" object planes were about 0.43 μm separated.

In FIG. 35 the first line of images shows the "blue" CCD in focus, the second line shows the "green" CCD in focus and the third line the "red" CCD in focus. Comparison of the images which are in focus shows that the "blue" best focal image differs substantially from the "red" and the "green" ones, which are almost identical. The bar pattern inside the image of the "blue" best focal image shows thinner bars than those of the "red" and "green" best focal image. However, the distance between the bars is the same for every best focal image.

FIG. 36 presents the grayscale images of FIG. 35 which are spatially filtered by a 31 tap highpass filter. The images acquired at best focal positions demonstrate a high frequency content (vertical lines), which can be used to identify best focus by vision. When CCD 1 ("red" wavelength) is in focus, CCD 2 ("green" wavelength) still represents a lot of high frequencies. This is due to the fact that the peak position of the "red" focal function curve is placed on half of the maximum of the "green" one.

However, in spite of some image degradation, it was shown that the image system is capable of obtaining three sharp 2-D images simultaneously by focusing on different object planes. Since a spatial distance between those object planes is demonstrated, the setup can be used either for focus search or to build up data for 3-D imaging.

Figure 37:
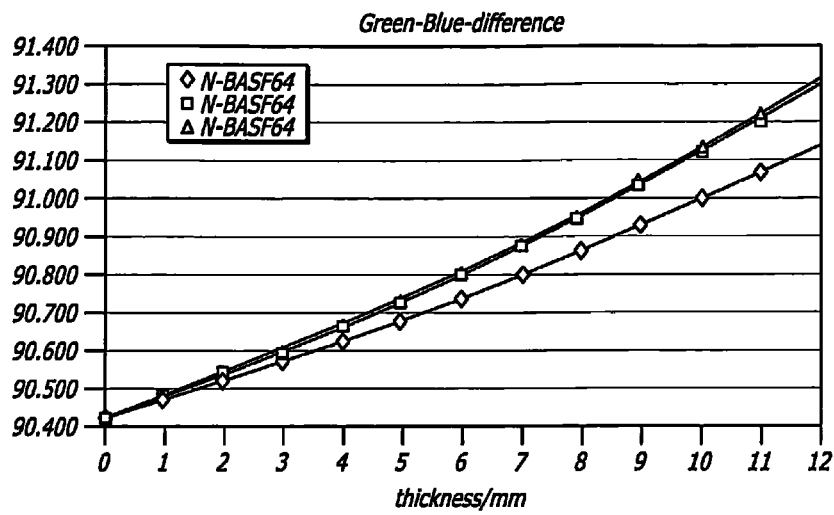
FIG. 37 is a graph illustrating distance between green and blue object planes as a function of glass thickness.
Figure 38:
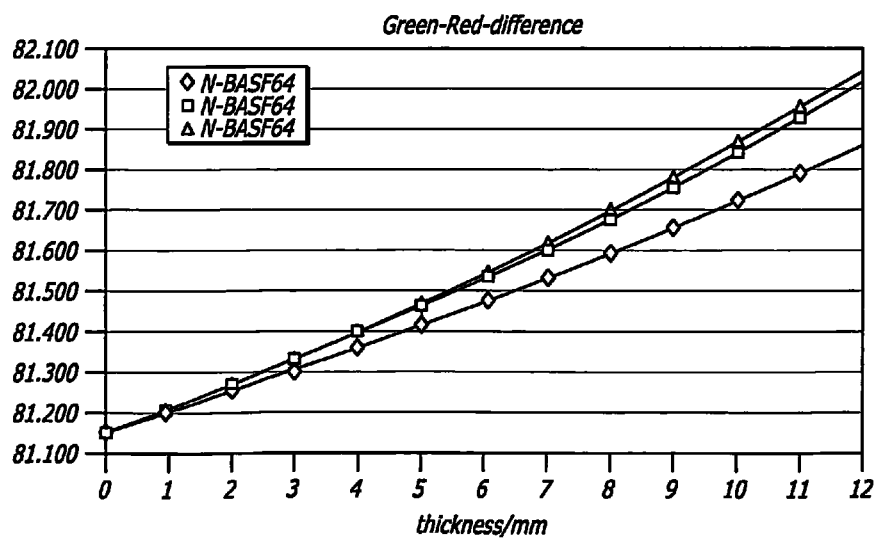
FIG. 38 is a graph illustrating distance between green and red object planes as a function of glass thickness.

Experiment 3:

The results of the extended ray-tracing experiment are shown in FIGS. 37 and 38. In reference to the fact that each wavelength, either "red", "green" or "blue", generates an independent object plane, the distances between those object planes can be measured. FIG. 37 represents the distance d between the object planes formed by the "green" and the "blue" light with respect to the thickness of the glass samples. FIG. 38 represents the same makeup as FIG. 37 but with the distance d between the object planes formed by the "green" and the "red" light. The distances are plotted on the ordinate axis scaled in micrometers and the thickness of the glass is plotted on the abscissa scaled in millimeters. Both charts show three curves corresponding to the three different kinds of glass N-BK7, N-BASF64 and N-SF57.

Both FIGS. 37 and 38 clarify a well-defined expansion of the distances between the object planes with respect to the thickness of the glass samples. (The numerical data is shown in appendix H.) Using the 12 mm N-SF57 glass sample generated a maximum change of distance of about 0.89 µm, followed by the 12 mm N-BASF64 glass sample and the 12 mm N-BK7 glass sample. The slopes of the curves either for the "green-blue" distance or for the "green-red" distance are the same with respect to each thickness of one kind of glass.

Nevertheless, an offset is added at the origin of each curve, which is about 90.42 µm for the "green-blue" distance and about 81.15 µm for the "green-red" distance. This offset forms the origin of all three diverging curves and is the only difference between FIGS. 37 and 38. The offsets are due to using a relatively simple model of the optical system and are not important.

The curves are slightly nonlinear, which is not surprising but was not predicted by FIG. 31 and the simple theory and optical models used here.

Consideration of Results:

The goal of these experiments was to prove the feasibility of simultaneous multiplanar image acquisition, based on chromatic aberrations. Simultaneous multiplanar image acquisition enables on-the-fly autofocus, faster autofocus for incremental scanning, and 3-D imaging. On-the-fly autofocus acquires a stack of images out of displaced object planes within a specimen space and calculates the best focal position out of this stack. Afterwards, the image of the best focal position is saved for later cell analysis. In 3-D imaging, the entire stack of images represents a volume (3-D) image.

These experiments do indicate that chromatic aberration leads to multiple object planes within the specimen space, where each object plane is formed by a respective wavelength. A 3-chip CCD camera can detect the images of three of those object planes, where each sensor acquires one of the three images. The goal of altering the chromatic aberration within the system to increase or decrease the distances between each object plane was achieved and enables automatic control over those distances for optimizing axially sampling for different applications and optical configurations. Additional chromatic aberration can be induced by inserting coplanar glass samples within the light path. Since a small stack of three images does not provide enough z-positions for the later autofocus algorithm, one can either change focus to collect more images or increase the number of simultaneously detected object planes, the latter of which may be necessary for continuous scanning. The number of simultaneously collected object planes can be increased by using a multiport microscope. With three sideports, such a microscope may carry three cameras with the 3-chip CCD technology. In contrast to the prior art image splitting module which provides eight channels and thus eight object planes, this design is able to observe nine object planes simultaneously within the light microscope. With the Dual-Cam or Multi-Image Module, two RGB cameras can be used for each sideport to either free up sideports or further increase the number of simultaneously acquired object planes.

Therefore, the automated scanning cytometry using chromatic aberration for multiplanar image acquisition is an improved design capable of replacing at least the image splitting system of the prior art. The 3-chip CCD camera is a prefabricated off-the-shelf component, as are more common single-chip RGB cameras that are used in consumer digital cameras. Due to the large amount of glass and quantity of surfaces, the prior art splitting module suffers from spherical and chromatic aberrations as well as less light efficiency. In contrast, the 3-chip CCD camera presents a more compact design. The camera's internal beam splitting prisms benefit from a minimized size and from reduction of optical aberrations.

Due to the standardized C-mount connector of the 3-chip CCD camera, the camera can be attached concentrically and the optical axis of the camera concurs with the optical axis of the microscope. Thus, a thin specimen (such as a monolayer of cells) can be imaged at the center of each CCD. If the image plane is tilted with respect to the camera, only part of the image will be in focus. This is because the camera image plane would slice through the conjugate of the specimen plane. In cases where the depth of field of the microscope is large enough, small deviations in CCD alignment can be tolerated. Since moderate or high NA objectives can image the specimen plane with a depth of field that is as low as a few microns, a precise and robust opto-mechanical setup is needed.

With reference to FIGS. 32-34, experiment 1 showed that the system is capable of simultaneous acquisition of multiple object planes. It also demonstrated that inserting coplanar glass samples within the light path of the optical microscope increases chromatic aberration and can enlarge the distances between the respective object planes. It is evident that the amount of chromatic aberration increases with an increasing convergence of the light cone and chromatic aberration cannot be induced within an infinitely corrected path. Thus, the physical position of the glass sample inside the light path of the imaging system has to feature a large cone angle.

However, in experiment 1, the largest cone angle was found inside the C-mount adapter. As per FIGS. 32-34, inserting glass samples of variable thickness and index of refraction at this position into the microscope light path produces a maximum change of 0.44 µm between the "blue" and the "green" object plane and 0.26 µm between the "red" and the "green" object plane. The maximum changes were acquired by using the thickest glass sample (12.20 mm) with the highest index of refraction (N-SF57 $n_e$=1.85504). This is because the amount of chromatic aberration increases with both the index of refraction and thickness of the coplanar glass sample. Experiment 1 showed that the distance between the "blue" and the "green" object planes increases while the distance between the "red" and the "green" object planes decreases with respect to the thickness of the glass samples and index of refraction. This behavior may occur because of the complex optical system of the microscope, and the design of the camera may also contribute.

In the designation of the Nikon CF Fluor microscope objective, the CF stands for "chrome free". This means the microscope objective is corrected for chromatic aberrations. However, chromatic aberration is a process of optimization.

Thus, it may never be possible to center all wavelengths into a single focal point. Due to this correction process, it may be that the axial order of the focal points of the wavelengths is interchanged. Nevertheless, the "blue" focal function curve deviates too much, which might be due to suboptimal chromatic correction. A second, possible explanation for the decreasing distance involves the construction of the 3-chip CCD camera, which may produce axial misalignment of the CCDs. If this is correct, the camera will not provide the same path length for each chip. In case the three CCDs provide the same path lengths values, the distance between the "blue" and the "green", as well as the "red" and the "green" object planes would increase with respect to the thickness and index of refraction of the glass samples. Therefore, both distances, the "green-red" distance, as well as the "green-blue" distance, would show positive slopes.

Hence, with reference to FIGS. 37 and 38, concurring path lengths are simulated in experiment 3 by using the optical ray tracing software. It showed similar results as experiment 1 but with diverging object planes for "blue" and "green" and "red" and "green". It is noticeable in both experiments 1 and 3 that the slopes of the curves depend on the index of refraction of the glass samples. Thus, a higher index of refraction causes the object planes to depart more than a lower index of refraction. In experiment, 3 the 12 mm N-SF57 glass sample causes the maximum change for both the "green-red" and the "green-blue" distance which is approximately 0.89 µm.

The description of experiment 3 leads to the assumption of a linear trend of the curves. However, the results seen in FIGS. 37 and 38 show a slight nonlinear trend, which may explained by the fact that vertical magnification is approximately the square of lateral magnification. (Bravo-Zanoguera, M. E. & Price, J. H. Simultaneous Multiplanar Image Acquisition in Light Microscopy. *SPIE Proc. Optical Diagnostics of Biological Fluids and Advanced Techniques Analytical Cytology* 3260 (1998)). Thus, changes in magnification caused by changes in object distance have approximately a squared dependence axially, and the more complete theory is more nonlinear and is asymmetrical about the focal plane. (Oliva, M. A., Bravo-Zanoguera, M. & Price, J. H. Filtering out contrast reversals for microscopy autofocus. *Applied Optics* 38, 638-646 (1999)).

However, the results of the ray tracing analysis also show a more defined trend, compared to the results of experiment 1. In experiment 1, the curves (FIGS. 32-34) actually cross each other with respect to the index of refraction. Since the distribution of the test results of experiment 1 presents a relatively low variance for both the "green-red" distance and the "green-blue" distance, the crossing cannot be randomly caused. Note that all test results show a standard deviation smaller than five percent. It should also be taken into consideration that the "green-red" distance and the "green-blue" distance were acquired at the same time. Thus variation in temperature and the system behavior over time can not be the reason for this crossing. Since the "green-blue" distance is not affected by the crossing, the crossing may be due to the inherent shape of the "red" focal function curve.

It is also observed that both experiments 1 and 3 represent an offset that embodies the original distance between the object planes. In experiment 1 (FIGS. 32-34), the offset is caused by chromatic aberrations of the lens elements within the optical path and possibly the axial misalignment of the CCDs. Without chromatic aberration and no axial misalignment of the CCDs all object planes would be coplanar and no offset would be produced. Experiment 3 (FIGS. 37 and 38) also represents an offset which is only caused by the chromatic aberrations of the lens elements within the system. The offsets of the ray tracing experiment are more than a magnitude higher than those of experiment 1. This may be due to the use of paraxial beams instead of the entire ray fan for determination of the object planes. Also, the simplified optical design of the model microscope differs a lot from the optical train in an actual microscope. Accordingly, the simplified model should introduce a numerical error and is not expected to match identically.

The ray tracing experiment revealed that the slopes of the curves for the "green-red" distance and the "green-blue" distance are equal with respect to the index of refraction of the glass sample. The only difference between the "green-red" distance and the "green-blue" distance are the offsets.

The ray tracing experiment also reveals an order of the object planes that results from the simplified optical model. The slopes of the "green-blue" distances as well as those of the "green-red" distances are positive. Thus, it is suggested that the object planes diverge and the "green" object plane is located between the "red" and the "blue" one. Insertion of glass samples to introduce chromatic aberrations in a real microscope may induce difference slopes due to the more complex optical system, which includes chromatic aberration corrections. The axial displacement of the CCDs of the experimental setup of experiment 1 is consequently verified.

With reference to FIGS. 32-34, 37, and 38, experiment 1 and 3 reveal that the insertion of glass samples with variable thickness and index of refraction enlarges the distances between adjacent object planes in equal shares. Experiment 3 is consistent with the results of experiment 1. Assume that there is an ideally corrected microscope which shows no spherical as well as chromatic aberrations. Referred to experiment 1, the concurring object planes of such an ideal microscope might be 0.44 µm separated to each other by using chromatic aberration characteristics. The differences in foci of 0.65-0.9 µm in the ray tracing experiment compare well to the axial steps of 0.1-0.24 µm used in previous tests of autofocus precision measurements performed on thousands of microscope fields using the same objective characteristics modeled here (20×, 0.75 NA). (Bravo-Zanoguera, M., Massenbach, B., Kellner, A. & Price, J. High-performance autofocus circuit for biological microscopy. *Review of Scientific Instruments* 69, 3966-3977 (1998); Price, J. H. & Gough, D. A. Comparison of phase-contrast and fluorescence digital autofocus for scanning microscopy. *Cytometry* 16, 283-297 (1994)).

Even though the purpose of these experiments was the exploration of chromatic aberration for autofocus microscopy, several other possibilities for simultaneously acquiring multiple object planes are also revealed. Other possibilities were explored using the 3-chip CCD technology.

The first possibility is the already described enhancement of chromatic aberration using different kinds of glass inside the optical light path of the microscope. A 3-chip CCD camera can be used to acquire the images of three corresponding object planes. Changes in chromatic aberration can be used to control both the "green-red" and "green-blue" distance between the focus planes. Conditions including CCD sensor axial alignment and the aberration corrections of the microscope may alter the differences in focal planes due to chromatic aberration. The choice of the triple bandpass filter (and the spectral response of the camera), which determines the wavelengths, also alters the separations of the focal planes. Thus, changing the wavelengths can be used to control the "red" and "green" and the "blue" and "green" focal plane differences. Thus, the axial sampling of the specimen can be controlled to fit the needs of the particular experiment (including the choice of objective, color of the sample and illumination wavelength needed for the image acquired subsequent to autofocusing).

For these measurements, the wavelengths were set manually. Different wavelengths could also be selected for different scans by using a filter wheel, a liquid crystal tunable filter (LCTF), or an acousto-optical tunable filter (AOTF). And axial micro-positioning of the CCDs inside the camera could be used to further control the distance between sampled object planes. Based on the Gaussian lens formula, each CCD contributes to a different image distance and therefore to a different object distance, too. Thus, the corresponding object planes can be definitely positioned within the specimen space. While displacement of the CCD sensors alone can be used to sample different focal planes, the use of chromatic aberration alone or in conjunction with CCD displacement offers a potential approach by taking advantage of a fundamental optical characteristic.

Micro-positioning in connection with chromatic aberration allows adjustment in the distances between the object planes and in fact the axial sampling rate. A 3-chip CCD camera with micro-positioned CCDs and color filters can acquire object planes out of the specimen space which altogether have the same distance. Here, each object plane is formed by a separate wavelength. Without chromatic aberrations, the camera is just able to sample the specimen axially with a constant sampling rate. Chromatic aberration can now be used for equally changing the distances between the object planes and thus also the axial sampling rate.

These experiments also show that the focus function curve can be used to accurately measure the chromatic aberration under any particular set of experimental conditions that may be needed by the microscopist. Changing objectives, filters, specimen characteristics (including various slides, coverslips, glass bottom microtiter plates, and different membranes and plastics in microtiter plates and culture chambers) and wavelengths (whether fluorescence or transmitted light) can alter the chromatic aberration. By performing autofocus on each wavelength under the exact conditions of the experiment, the differences in focus between the various wavelengths are determined and micropositioners on the detectors correct for chromatic aberration, improving the quality of the recorded multi-color image. This would not be limited to 3-color images, but could be done for any number of wavelengths.

Figure 39:
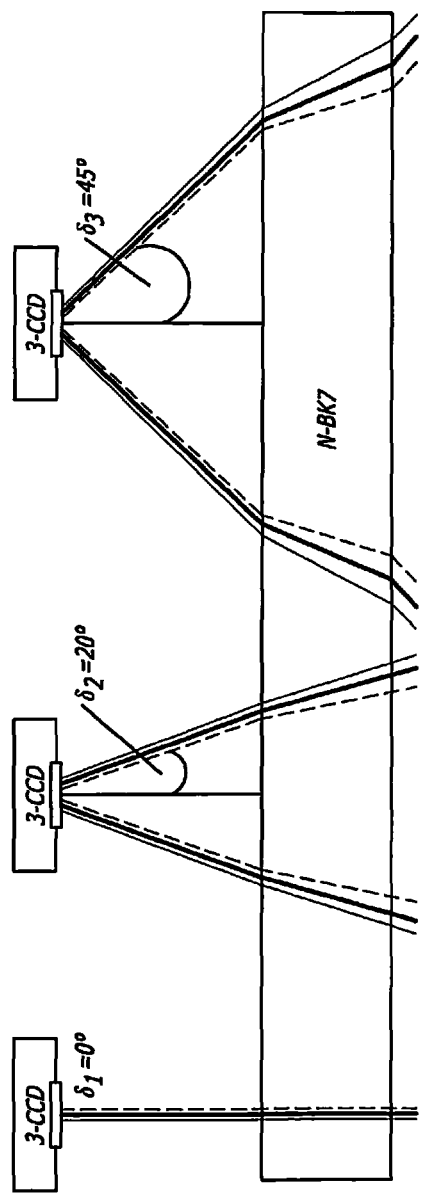
FIG. 39 shows an amount of chromatic aberration as a function of a half cone angle δ.

It is noted above that the position of the object planes can be changed by inducing chromatic aberration, use of a triple bandpass filter (respectively the spectral response of the camera), and micro-positioning of the CCDs. A fourth possibility could be the modification of the converging cone of light which passes the glass sample. It is obvious that an increasing cone angle δ induces more chromatic aberration as presented in FIG. 39.

An increasing chromatic aberration, in turn, causes the differences between the optical path lengths for the "red", "green" and "blue" CCD to become larger (in the simple ray tracing model) or change (larger or smaller in a complex optical system). Thus, this method is also capable of changing the distances between the object planes. This would require additional custom optical design and implementation.

Today most microscopes provide a multiport design and are capable of carrying multiple cameras simultaneously. A microscope having three ports may carry three cameras with the 3-chip CCD technology. Each camera acquires a stack of three images from the corresponding object planes. In turn, altogether nine object planes can be observed simultaneously. To perform the desired axial sampling density of the specimen space, the three stacks of object planes can be aligned with respect to each other using mechanical micro-positioning, or by using different glass inserts with the same or different corresponding wavelengths of light. I.e., each RGB camera could acquire images using a different set of three wavelengths or the same set of three wavelengths, with the same or different glass samples (thicknesses, Abbe numbers or dispersions, and/or indices of refraction). It may arise that a multiport microscope can be equipped with more than three cameras. But this in turn decreases the light efficiency since the optical path of the microscope is divided into the number of ports. However, phototoxicity is low in non-fluorescent (transmitted or reflected) illumination (because the specimen does not absorb much light). Thus, the brightness can be increased by using an arc lamp, a laser, or an LED, for instance, to tremendously increase the illumination and enable use of more than three 3-chip CCD cameras.

However, due to the construction of the microscope used for these measurements, the light intensity is not the same for all ports. Here, different intensities can be corrected by changing the beamsplitter in the base of the microscope or by adding neutral density filters in front of the outputs of the ports.

It should also be noted that the bandpass has to be as narrow as possible for each CCD. The way one discrete wavelength forms one object plane, many wavelengths are forming many object planes. A bandpass filter that lets many wavelengths pass causes the CCD to acquire not just the image of the central wavelength but also those of adjacent wavelengths. If the spreading of object planes within the specimen space is larger than the depth of field, additional blurring occurs within the image. The narrower wavelength bands of some light sources, including LEDs and lasers, can also serve this function.

Also important is the positioning of the glass samples within the cone of light. The axial position within the cone of light does not matter but the direction of the perpendicular of the coplanar glass sample matters significantly. Tilting the coplanar glass sample, with respect to the optical axis, leads to spherical aberration, called coma. For reduction of this aberration and to maintain the image quality, a very robust and precise opto-mechanical setup is needed.

Experiment 2 was carried out to verify that a multiplanar imaging system using chromatic aberration is capable of simultaneous acquisition of 2-D images from different z-positions within the specimen space. The new design is based on the use of axial displacement of the object planes within the specimen space, where each CCD is focusing on one of those planes. As a matter of fact, the peak value of the focal function curve indicates the z-position at which, specifically to the CCD, the corresponding object plane is in focus. In experiment 2, it was required to show that the peak positions of the focal function curves occur at different z-positions when using an infinitely thin specimen (micrometer slide).

Figure 40:
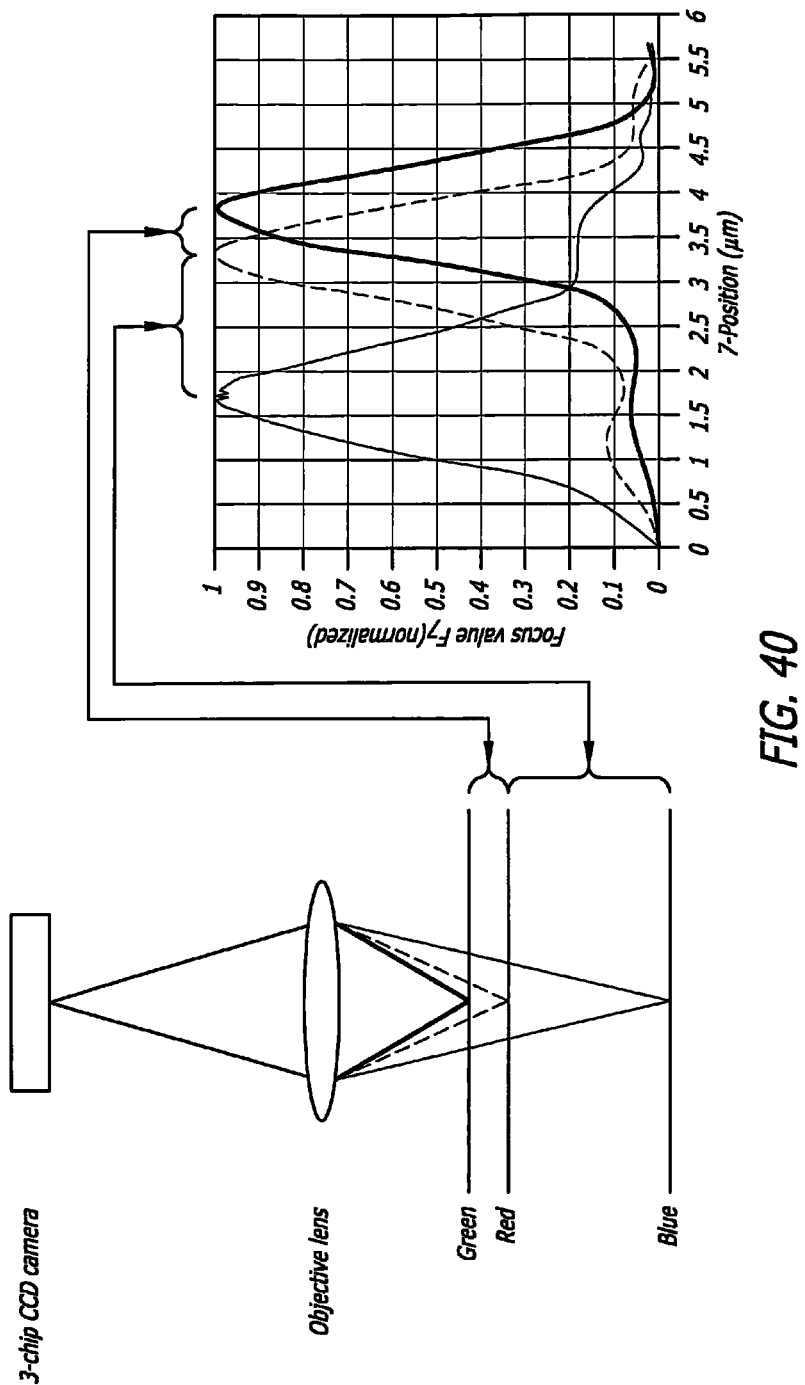
FIG. 40 illustrates a relationship between a cone of light, shape of focal function curves, and distance between object planes; and, FIG. 41 illustrates a magnification effect on the position of a set of object planes.
Figure 41:
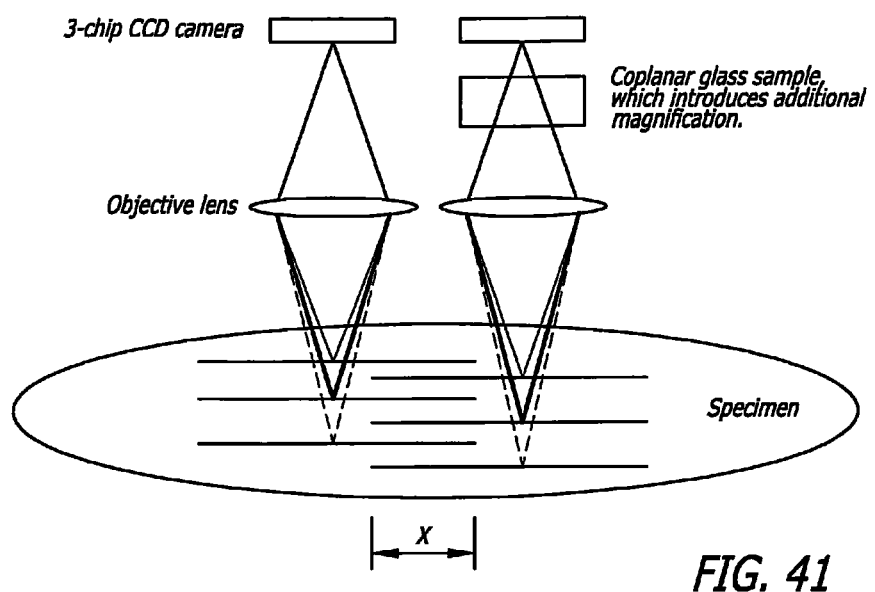

For the RGB camera to acquire the best possible image after autofocus has been performed, each detector should be at best focus. This would enable achieving the best quantitative cell analysis. For transparent specimens (illuminated by bright field, phase contrast, DIC or reflected light), the relative best focus positions for each color also represents the corrective calibration position for collecting the best image. Mechanical actuators on the CCD chips would enable correction of the differences for final collection of in-focus images at each wavelength. The test results of experiment 2 shown in FIGS. 35 and 36 reveal that the images of the "red" and "green" object plane are identical but the "blue" one shows some variation. Comparison of the distances between micrometer lines with different glass samples revealed that the largest experimental difference in magnification was 24.5× vs. 24.3×. Variations also occur when comparing the focus function curves for each CCD. In FIG. 40, the "red" and "green" focus function curves are also close to being identical but the "blue" one shows a broader peak. In FIG. 34, the relative through-focus sharpness measurements $F_z$ (Eq. 1) with and without an 11.3-mm thick stack of N-BK7 microscope slides. The focus function curves with the glass sample inserted are wider than those without, with the differences in width greatest for blue and least for red. The side peaks are also larger for red and blue. These differences can be caused both by changes in sampling (magnification) and resolution. Since the change in magnification was small (the largest change was from 24.5× to 24.3× with the glass inserts), we measured the changes in resolution for each wavelength using the 122-mm thick N-SF57 glass sample (Table 1). The resolutions with and without the glass sample for R, G and B and the decreases in resolution are shown in Table 2. The decreases in resolution with the glass insert were greatest for B and R at 0.75 µm and 0.63 µm, respectively, and least for G at 0.40 µm. Note that these differences are comparable to the differences measured between the wavelengths themselves without inserts (G–B difference of 0.71 µm, R–B difference of 0.28 µm and G–R difference of 0.43 µm), and are 2- to 3-fold greater than the differences in Rayleigh resolution (G–B and R–G). Since the focus function curves in FIG. 7 remained predominantly unimodal, these changes in resolution are unlikely to degrade autofocus performance. The differences in best foci as determined by Eq. 2 with α=8 for each color are 0.35 µm (B), 0.9 µm (R) 0.6 µm (G). With the shift in R focus greatest after insertion of the glass sample, the B and R foci are farther apart (2.1-vs. 1.7-µm) and the R and G foci are closer together (0.25-µm vs. 0.45-µm).

Figure 42:
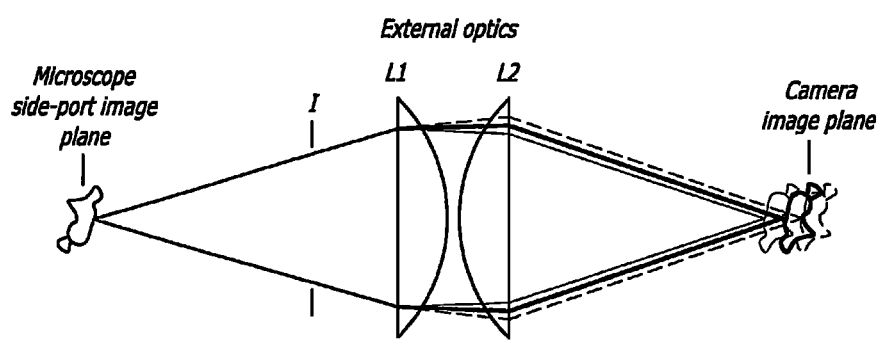
FIG. 42 illustrates replacement of the glass sample of FIGS. 1, 39 and 41 with a "dispersive relay lens" unit that also introduces chromatic aberration.

The glass sample can be replaced by a relay lens system with dispersive properties that also introduce chromatic aberration. FIG. 42 shows an example lens unit, a symmetric doublet, which produces chromatic aberration. Such a relay lens can replace, or be combined with, the glass sample of FIG. 1 to further help control chromatic aberration to achieve the desired separation distances between focal planes of different colors. The image generated by the microscope at the side-port that would normally be imaged onto a camera CCD is reimaged by lenses L1 and L2 onto the camera at the new camera image plane.

The following measurements of chromatic aberrations with various combinations of optics were carried out on a Nikon Ti-E automated microscope. Labview 8.0 was used to control the microscope (with the Nikon SDK), cameras, and light source and for all image processing. Imaging was performed in either bright field or phase contrast depending on the sample being imaged. Illumination was provided by a Onelight Spectra multispectral light source (http://www.onelightcorp.com/products/index.html, OneLight Corp, 314-1755 West Broadway, Vancouver, B.C., Canada V6J 4S5) configured to provide illumination from −400 nm to −750 nm. The Onelight was controlled via computer using the manufacturer-provided Labview drivers and library. Modes include: 1) illumination in a single band as narrow as 15 nm with a peak wavelength anywhere in the available spectrum, 2) simultaneous illumination in multiple color bands, each as narrow as 15 nm across the available spectrum, and 3) rapid switching (of a few milliseconds) between different illuminating spectra. For chromatic aberration measurements of the objectives and the objectives plus additional optics, a 10 um per division micrometer slide was used as the sample. Images were captured using a Prosilica EC650 firewire camera (http://www.prosilica.com/products/ec650.html, Prosilica Inc., 101-3750 North Fraser Way, Burnaby, B.C., V5J 5E9, Canada) acquiring images at 60 fps and controlled with Labview Imaqdx drivers. The z-position of the micrometer slide was moved in 25 nm steps over a 50 um range with a Mad City Labs Nano-Z500 piezo-electric stage insert (http://www.madcitylabs.com/nanoz500.html, Mad City Labs Inc., 2524 Todd Drive, Madison, Wis. 53713) purchased with the Nikon Ti-E microscope. Images were acquired at each z position for each wavelength of light, and the focus index (described below) was calculated in real-time before moving to the next z position as previously described (Bravo-Zanoguera, M., Massenbach, B., Kellner, A. & Price, J. High-performance autofocus circuit for biological microscopy. *Review of Scientific Instruments* 69, 3966-3977 (1998); Price, J. H. & Gough, D. A. Comparison of phase-contrast and fluorescence digital autofocus for scanning microscopy. *Cytometry* 16, 283-297 (1994)). This was done to minimize any effect drift may have on the chromatic aberration measurements. The chromatic aberration was measured for wavelengths from 412 nm in 25 nm increments up to 637 nm. Each wavelength measured had a bandwidth of approximately 15 nm. Chromatic aberration was measured in five separate trials for every configuration and the average of these trials is reported.

Figure 43:
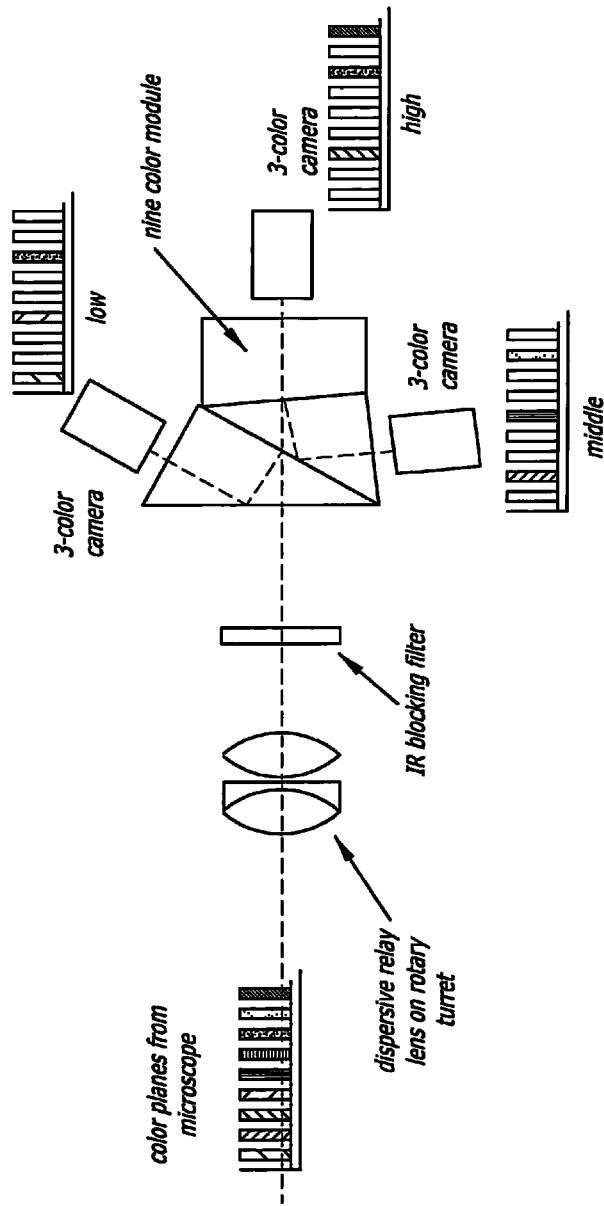
FIG. 43 illustrates the use of the relay lens of FIG. 42 (which can also be the glass sample of FIG. 1) in a nine-focal-plane color module, along with distribution of the color subbands distributed within each of the RGB bands of the "nine color module," which is a trichroic prism.

FIG. 43 shows the use of the relay lens of FIG. 42 in combination with a "nine color module," which is a trichroic prism, to image nine focal planes of nine different colors simultaneously. Nine focal planes (labeled by nine separate colors) from microscope port pass through dispersive relay optics. Various relay optics are placed on a rotary turret so different optics can be selected depending on the microscope's configuration. An IR blocking filter is used if needed. The nine colors are separated into low, middle, and high bands by a three-prism element with integrated thin-film interference coatings. The interference coatings select the respective subsets of color in the "low," "middle" and "high" wavelengths as shown. Each set of three bands is imaged to a separate three-color camera for detection as shown. Alternatively, the trichroic prism with interference coatings can be replaced by actuators to changes the positions of the CCD chips relative to one another so they will image different focal planes.

Figure 44:
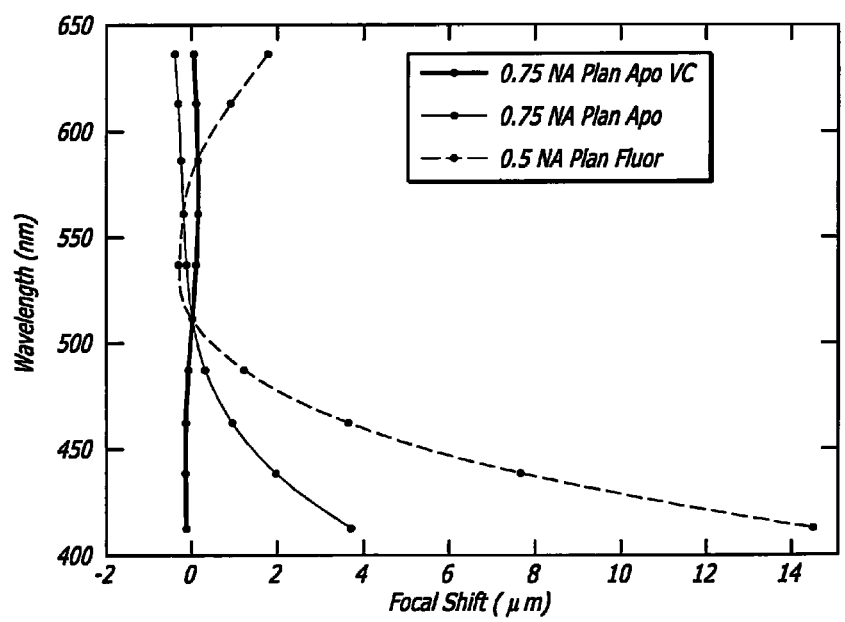
FIG. 44 illustrates the chromatic aberrations of the Nikon Ti-E microscope with a 1× tube lens for three different objectives.

FIG. 44 shows the chromatic aberrations of the Nikon Ti-E microscope with a 1× tube lens for three different objectives. The measured focal shifts are relative to the best focus of 512 nm light for three Nikon 20× objectives with the Nikon Ti-E 1× tube lens are plotted for wavelengths from 412-637 nm. The curves fit to the data points were generated using cubic spline interpolation in the Matlab curve fitting toolbox. Focus was measured in five trials using a 10 um/division micrometer slide as described in methods. Standard deviations are not shown as they are not substantially larger than the data points themselves.

Figure 45:
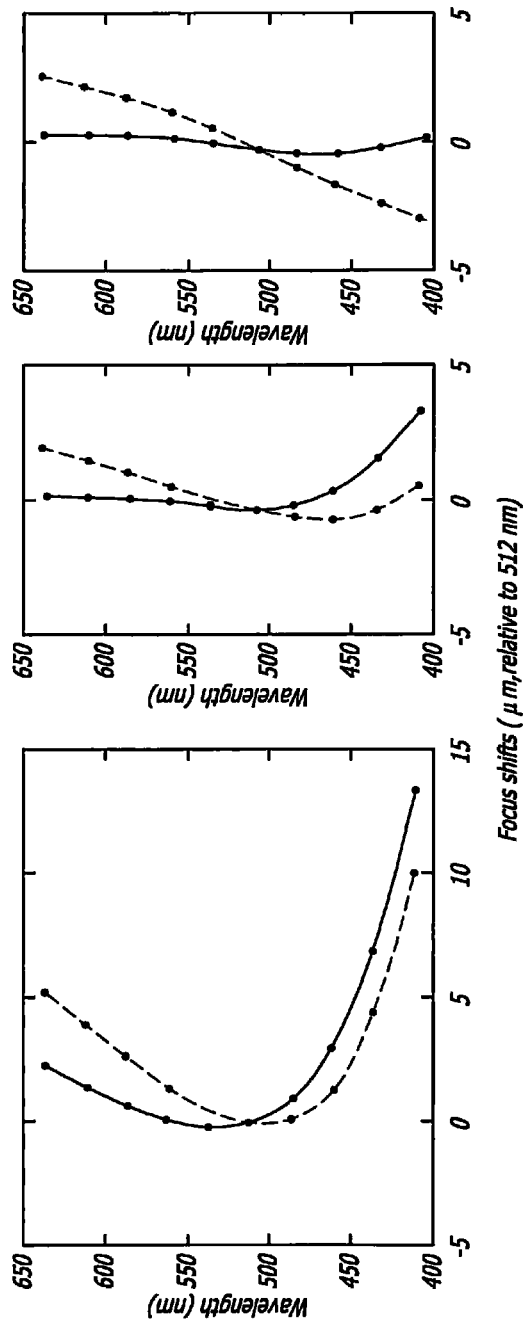
FIG. 45 illustrates chromatic aberration with three different Nikon objectives with and without the relay lens of FIG. 42.

FIG. 45 shows plots of the chromatic aberration with and without the relay lens of FIG. 42. Plots of chromatic aberration focal shifts for three objectives at wavelengths of 412-637 nm are shown without (black) and with (red) a relay lens designed to increase the chromatic aberration. The focal shifts were measured in bright field for best focus with a 10-µm spacing micrometer. The image was magnified 1.5× by a Nikon zoom lens onto a 640×480 camera (sampling of 4 pixels/µm). The three plots show the relative focus positions at different wavelengths with the following objectives: a) Nikon Plan Fluor 20×0.5 NA in Ph1 phase contrast., b) Nikon Plan Apo 20×0.75 NA in Ph2 phase contrast and c) Nikon Plan Apo VC 20×0.75 NA, which is corrected best.

Figure 46A:
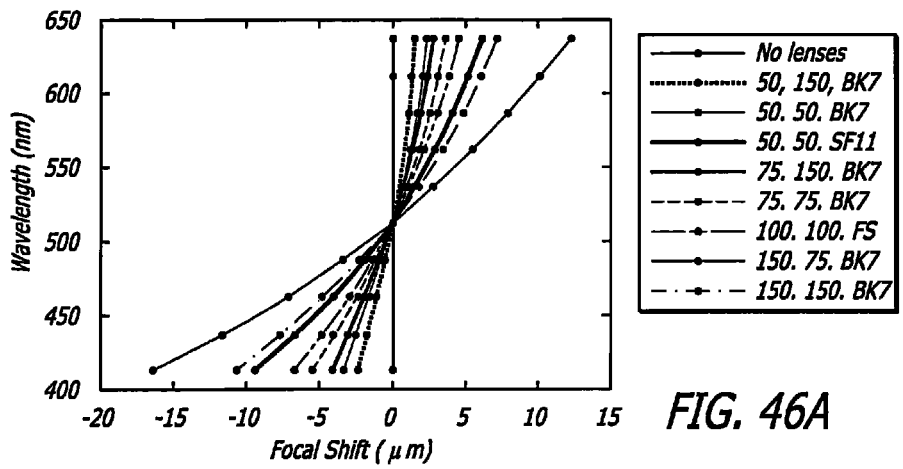
FIG. 46 illustrates the chromatic aberrations of the same three objectives as in FIG. 45 with different combinations of the types of lens elements in the lens unit of FIG. 42.
Figure 46B:
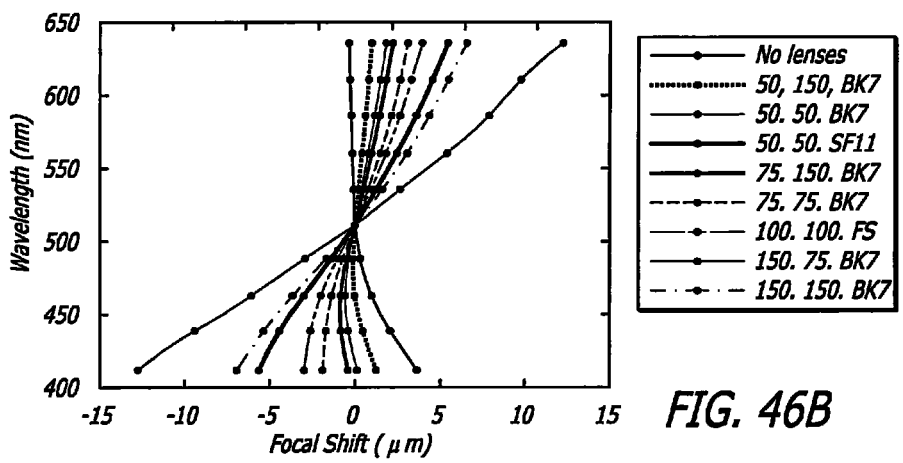
Figure 46C:
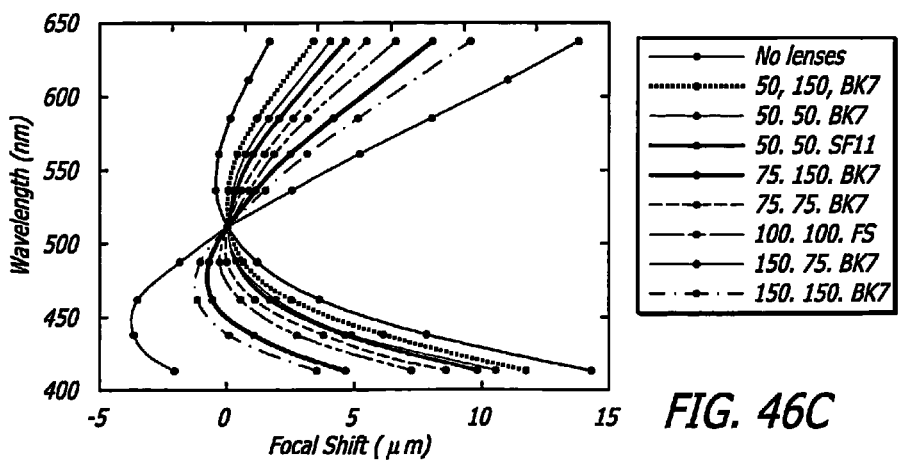

FIG. 46 shows the chromatic aberrations of the same three lenses as in FIG. 45 with different combinations of the types of lens elements in the lens unit of FIG. 42. The measured focal shifts are relative to the best focus of 512 nm light for three Nikon 20× objectives with additional external optics configured as in FIG. 42 are plotted for wavelengths from 412-637 nm. The Nikon objectives use are: (a) 0.75 NA Plan Apo VC, (b) 0.75 NA Plan Apo, and (c) 0.5 NA Plan Fluor. In the legend shown in (c), the first number is the focal length of L1 in mm, the second number is the focal length of L2 in mm, and the last entry is the glass used (FS fused silica and BK7). The lenses used in this experiment are detailed further in TABLE 3.

TABLE 3

Lens pairs used for FIG. 46.

| | Manufacturer | Lens 1 | f1 (mm) | Lens 2 | f2 (mm) | material |
|---|---|---|---|---|---|---|
| 1 | Thor | LA1131-A | 50 | LA1433-A | 150 | BK7 |
| 2 | Thor | LA1131-A | 50 | LA1131-A | 50 | BK7 |
| 3 | CVI | PLCX-25.4-38.1-SF11 | 50 | PLCX-25.4-38.1-SF11 | 50 | SF11 |
| 4 | Thor | LA1608-A | 75 | LA1433-A | 150 | BK7 |
| 5 | Thor | LA1608-A | 75 | LA1608-A | 75 | BK7 |
| 6 | Thor | LA4380 | 100 | LA4380 | 100 | FS |
| 7 | Thor | LA1433-A | 150 | LA1608-A | 75 | BK7 |
| 8 | Thor | LA1433-A | 150 | LA1433-A | 150 | BK7 |

These plots demonstrate the ability to alter chromatic aberration as needed for creating the appropriate focal plane separation for autofocus.

Figure 47:
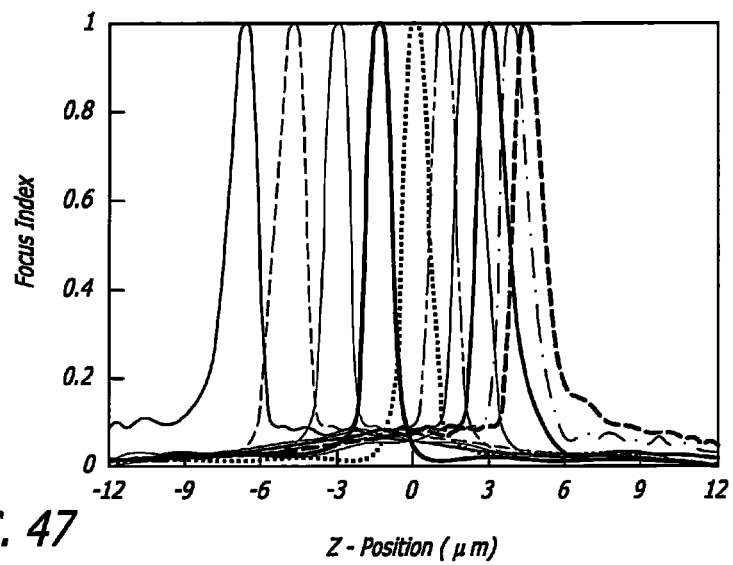
FIG. 47 illustrates the focus function curves for the Nikon 20× 0.75 NA Plan Apo VC objective in combination with one of the lens pairs of FIG. 46.

FIG. 47 shows the focus function curves for the Nikon 20×0.75 NA Plan Apo VC objective in combination with one of the lens pairs of FIG. 46 (L1=L2=100 mm focal length fused silica lenses) for wavelengths of 412-637 nm in 25 nm steps. Each point is the mean of five trials. SD is not shown because it is comparable to the size of the points. This figure illustrates how the appropriate selection of wavelength in addition to optics can be exploited to achieve a desired separation of focal planes for a given z position of the sample.

Figure 48:
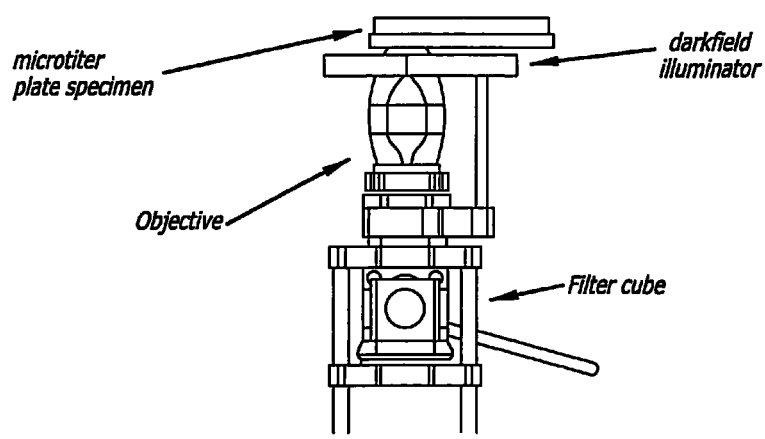
FIG. 48 illustrates the alternative method of dark field (oblique) illumination, which is useful for microtiter plates, and the position of a circular light source around the tip of the objective in the microscope.
Figure 49A:
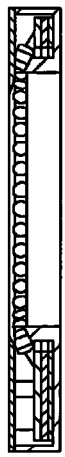
FIG. 49 illustrates an example reflected dark field light source, the Nerlite (New Hampshire, USA, www.nerlite.com) Microscan DF-50 strobed dark-field illuminator.
Figure 49B:
Figure 49C:
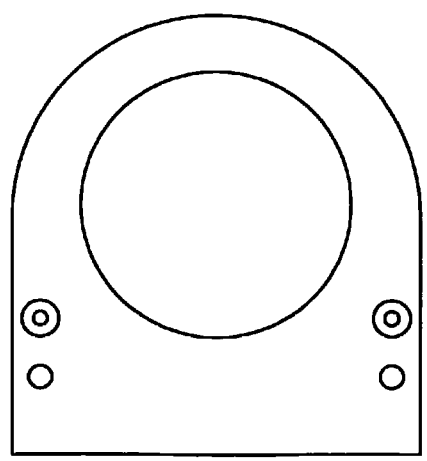
Figure 49D:
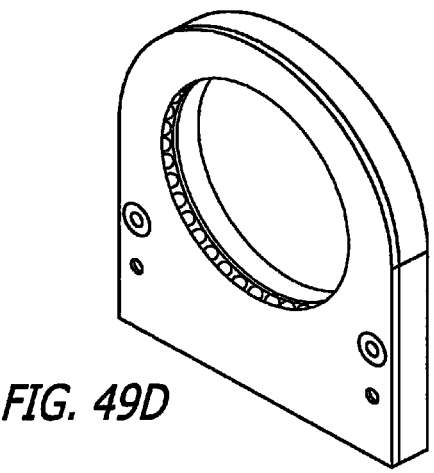
Figure 49E:
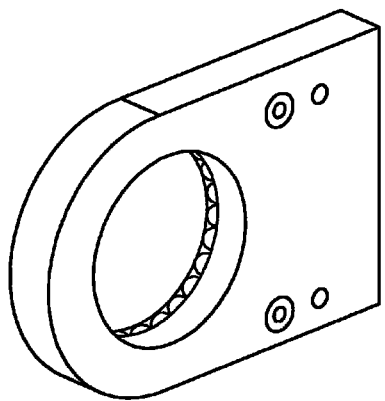
Figure 49F:
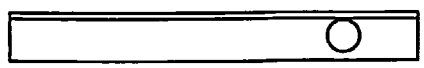

Microtiter plates with relatively small wells (96-well plates and higher densities) cause distortion of phase contrast transmitted microscope illumination and often have opaque lids that prevent all forms of transmitted illumination. An alternative is oblique dark field illumination configured as a light source shining from just below the specimen from the side (in an inverted microscope) at a large angle relative to the optical axis (i.e., a small grazing angle relative to the surface of the plate). FIG. 48 illustrates this alternative method of dark field (oblique) illumination, which is useful for microtiter plates, and the position of a circular light source around the tip of the objective in the microscope.

FIG. 49 illustrates an example reflected dark field oblique light source, the Nerlite (New Hampshire, USA, www.nerlite.com) Microscan DF-50 strobed dark-field illuminator. The left portion of the figure shows that angle of 20 degrees relative to the surface of the specimen (a grazing angle), which is 70 degrees relative to the optical axis. Nerlite SCM-1 strobe controller will be synchronized to RGB camera acquisition. As shown in FIG. 49, the illuminator consists of a ring of light emitting diodes, mounted and angled 70° from the optical axis. With a clear aperture of 50.8 mm, the convergence point of the illumination is 7.6 mm from the top face of the DF-50.

Figure 50:
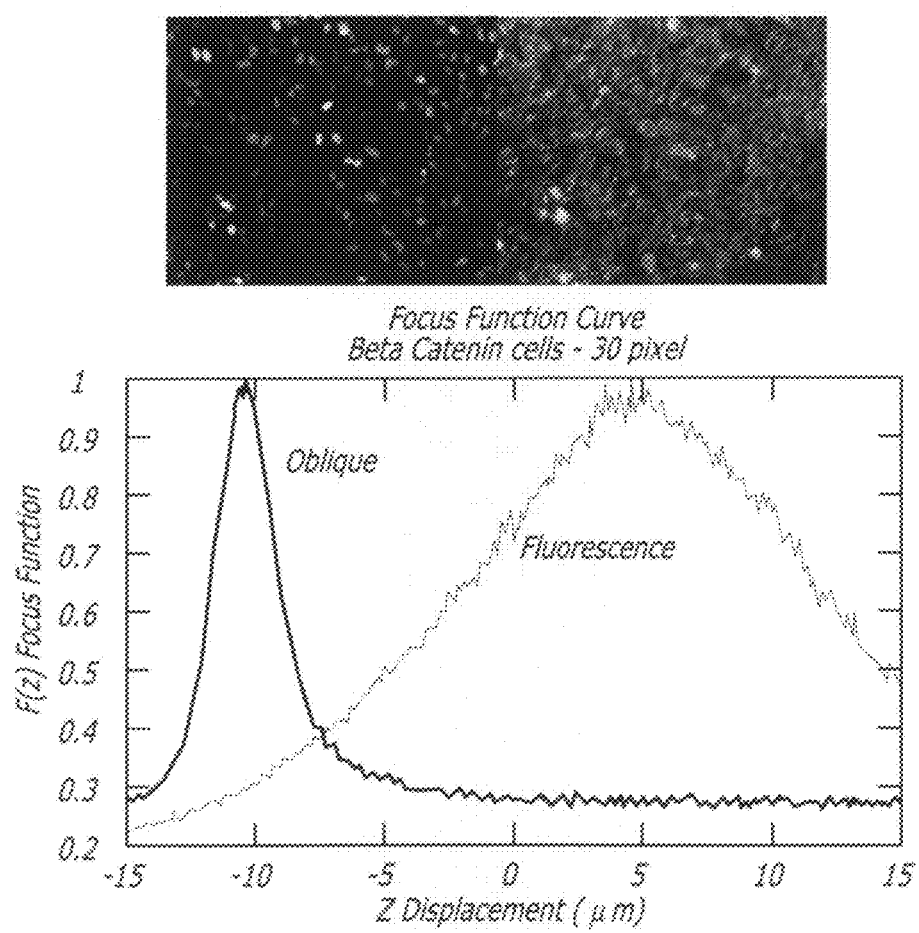
FIG. 50 illustrates reflected dark field illumination for chromatic aberration enabled multiplanar image acquisition on microtiter plates.

FIG. 50 (left) shows transmitted illumination using phase contrast of unstained cells performs better than fluorescence microscopy for autofocus. But the meniscus in the well of a microtiter plate acts as a lens and degrades the phase image. For this reason, HCS instruments using image-based autofocus typically focus in fluorescence, which exposes cells to unnecessary additional phototoxicity and photobleaching. Oblique white light illumination solves this problem by producing reflected dark field images. FIG. 50 shows phase contrast (left) and reflected illumination (right) images for the same field of view on NIH 3T3 cells cultured on a Greiner membrane-bottom microtiter plate. Oblique (reflected) illumination (right) is compared with fluorescence (left) on Hela cells from a β-catenin screen in Greiner 384-well membrane bottom microtiter plates. White light at a high angle of illumination relative to the optical axis provided the highest contrast "dark field" images from cells in microtiter plates. Focus function curves were recorded every 0.1-μm in oblique (red) and fluorescence (blue) to produce the plot. Note that oblique illumination produced a narrower peak width than phase contrast possibly indicating a dark field-like higher-frequency MTF (1) than in fluorescence on a Nikon 20× 0.5 NA. The setups were changed between illumination modes for both experiments, so best foci (focus function peaks) are not the same. Oblique illumination produces high contrast images and normal focus function curves, indicating excellent characteristics for autofocus. Oblique illumination is provided by either combinations of the appropriate colors of LEDs or continuous-wavelength white light illumination to provide for multiplanar imaging via chromatic aberration. LEDs can then be strobed (as with the Nerlite SCM-1 strobe controller for the DF-50 in FIG. 49.

Figure 51:
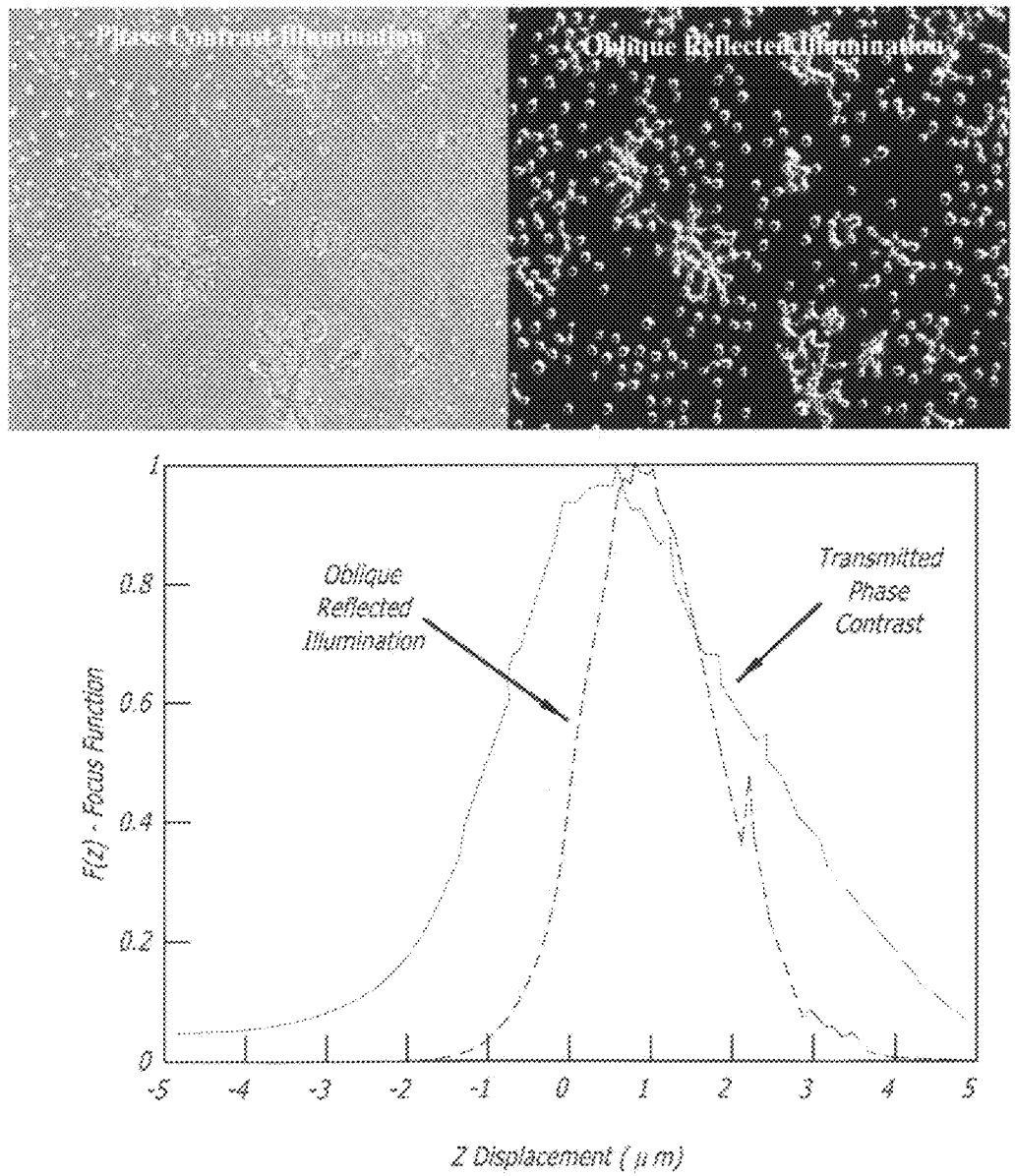
FIG. 51 illustrates oblique (reflected) illumination (top right) compared with phase contrast (top left) on MDA-MB-435 breast cancer cells suspended and centrifuged onto poly-L-lysine coated coverslips using an alternative light source.

FIG. 51 illustrates oblique (reflected) illumination (top right) compared with phase contrast (top left) on MDA-MB-435 breast cancer cells suspended and centrifuged onto poly-L-lysine coated coverslips. Two intensity-attenuated light-guide-delivered sources, a Nikon Intensilight and a Nikon Metal Halide lamp (chosen because they were readily available) were positioned on either of the objective to illuminate the sample for oblique illumination. Focus function curves were recorded every 0.1-μm in oblique and transmitted phase contrast modes to produce the plot (right). Note oblique illumination produced a narrower peak width possibly indicating an dark field-like higher-frequency MTF1 than the 0.52 LWD condenser and 20×0.5 NA Ph1 objective. This demonstrates an alternative white light source for providing illumination at a high angle relative to the optical axis to create dark field images.

The chromatic aberration based autofocus system includes of a system of one or more optical elements external to the light microscope that change the axial chromatic aberration produced by the microscope. For example, two plano-convex lenses with an iris between them that reimage the image produced by the microscope onto a detector (camera). The optics used are selected to separate the different axial focus positions of the different wavelengths of light. The optics required will be dependent on the chromatic aberration of the objective and microscope and could be different for different objectives.

Figure 52:
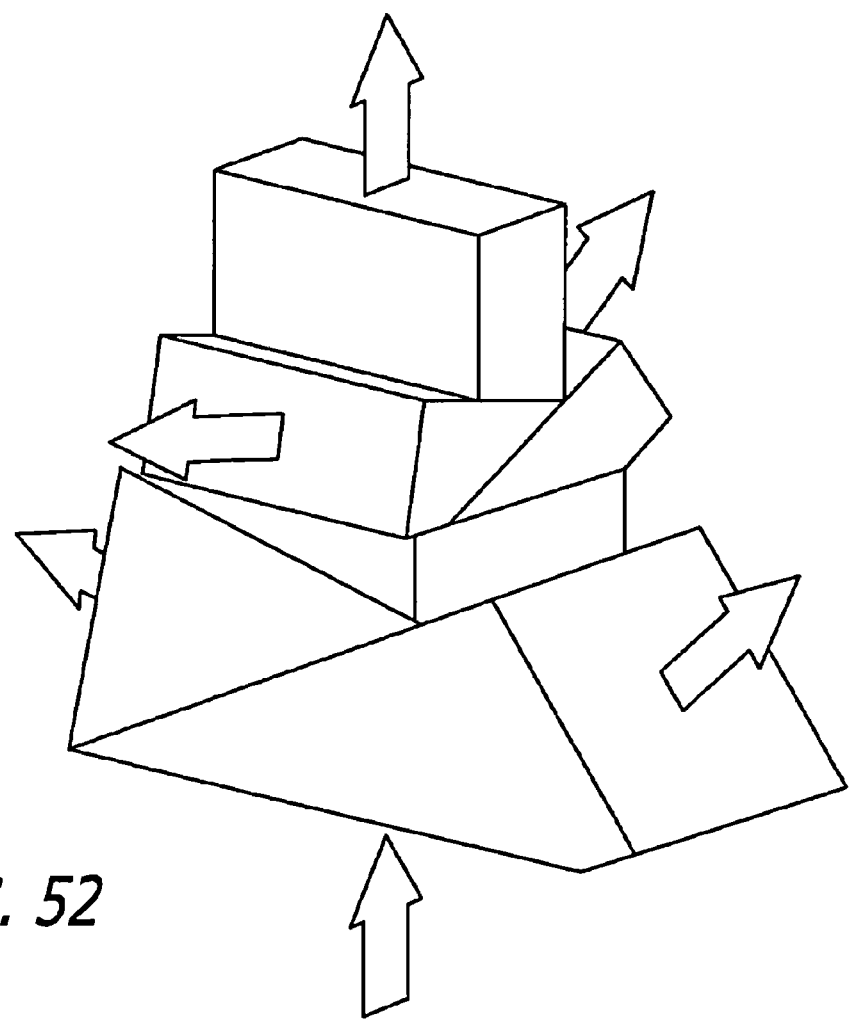
FIG. 52 illustrates a 5-color prism for creating a 5-color CCD camera.

The imaging camera can be any camera configured to collect color images. Examples include 3-chip RGB cameras and single-chip Bayer array color cameras. In the case of the RGB cameras, 3 wavelengths would simultaneously be incident upon the camera. Cameras can be configured with various numbers of CCD chips. FIG. 52 illustrates a 5-color prism for creating a 5-color CCD camera (http://www.alt-vision.com/color_prisms_tech_data.htm, Optec, Via Mantegna 34-20015 Parabiago (MI)—Italy). The wavelengths can be provided as individual wavelengths from a single or multiple light sources, or they could be provided after passing the light from a broad spectrum source through a filter selective of the appropriate wavelengths. In the case of the single chip camera, each wavelength could be provided as a strobe that is timed with the capture of the camera such that each frame captured corresponds to a different wavelength. This technique could also be applied to multiple wavelengths. This is done, for example, with a strobe controller that strobes each set of LEDs in the transmitted or dark field illumination system at slightly different times with a high speed grayscale camera.

The chromatic aberration autofocus implementation begins with the selection of an objective, optics, and wavelengths of light such that the different wavelengths of light focus at different planes in the sample. Then the quality of focus for different sample planes can be measured by taking an image without moving the sample. The quality of focus is measured by the focus index. The focus index measures the quantity of mid- to high-frequency content in the image. This can be implemented with a convolution filter or with a filter in frequency (Fourier) space.

Chromatic aberration autofocus performance was quantified by scanning a sample of NIH 3T3 cells grown on coverglass as previously described. (Bravo-Zanoguera, M., Massenbach, B., Kellner, A. & Price, J. High-performance autofocus circuit for biological microscopy. *Review of Scientific Instruments* 69, 3966-3977 (1998); Price, J. H. & Gough, D. A. Comparison of phase-contrast and fluorescence digital autofocus for scanning microscopy. *Cytometry* 16, 283-297 (1994)). Imaging of the sample was done in phase contrast mode with a Nikon 20×0.75 NA Plan Apo Ph2 objective. Autofocus performance was quantified with two different cameras: a 3CCD color camera and a single-CCD Bayer array camera. The 3CCD camera was a JAI CV-M9CI RGB cameralink camera (http://www.jai.com/EN/CameraSolutions/Products/Pages/CV-M9CLaspx, JAI Inc. —USA. 625 River Oaks Parkway, San Jose, Calif. 95134). The camera was controlled with Labview Imaq drivers and was operated at 30 fps with a bit depth of 10 bits/channel full frame. The single-chip Bayer camera was an Imaging Source DBK-21AF04 firewire camera (The Imaging Source, LLC, 6926 Shannon Willow Rd, Suite 400, Charlotte, N.C. 28226 http://www.theimagingsource.com/en_US/products/cameras/firewire-ccd-bayer/dbk21af04/) operating at 60 fps. The raw Bayer red, green and blue images were read from this camera without the added spectral overlap generated from bayer processing. Only every other line of green pixels was used to create the green image due to the fact that there are two green pixels for every red and blue pixel on this Bayer design. The Bayer camera was controlled in Labview with the Imaqdx drivers.

Previous studies on autofocus performance relied on 7-12 sampled planes with better focus performance being achieved with more planes (Bravo-Zanoguera, M., Massenbach, B., Kellner, A. & Price, J. High-performance autofocus circuit for biological microscopy. *Review of Scientific Instruments* 69, 3966-3977 (1998); Price, J. H. & Gough, D. A. Comparison of phase-contrast and fluorescence digital autofocus for scanning microscopy. *Cytometry* 16, 283-297 (1994)). So for each scan, nine different planes were sampled to find best focus at each field. This consisted of 3 different mechanical z positions; there were 3 different color planes for each mechanical position. The spacing of the mechanical z positions were selected to interdigitate the measured chromatic focal planes to achieve an approximately equal spacing of 9 different planes for determination of best focus.

As in previous studies, the focus index f(z) was determined by calculating the relative amount of mid to high frequency content present in the image of the sample for various z-positions of the sample (Bravo-Zanoguera, M., Massenbach, B., Kellner, A. & Price, J. High-performance autofocus circuit for biological microscopy. *Review of Scientific Instruments* 69, 3966-3977 (1998); Price, J. H. & Gough, D. A. Comparison of phase-contrast and fluorescence digital autofocus for scanning microscopy. *Cytometry* 16, 283-297 (1994)). A power weighted average was then used to calculate best focus as $$W_\alpha = \frac{\sum_z z f_z^\alpha}{\sum_z f_z^\alpha} \quad (11)$$

where n=8 is used as the weight for best focus here. The calculation of the focus index was achieved by using a band pass convolution filter along one dimension as $$f_z = \frac{\sum_x^n \sum_y^m (h(x) \otimes i_z(x, y))^2}{\left[\sum_x^n \sum_y^m \frac{i_z(x, y)}{nm}\right]^2} \quad (12)$$

In previous work, a 31-tap bandpass filter was designed it worked well for many samples given that the camera was sampling at 1.45 times the Nyquist cutoff frequency of the imaging system. (Oliva, M. A., Bravo-Zanoguera, M. & Price, J. H. Filtering out contrast reversals for microscopy autofocus. *Applied Optics* 38, 638-646 (1999)). For the following experiments, the filter was modified to enable the rapid tuning of the spatial frequency passband different samples and optical configurations. The power spectrum is first calculated across one dimension of the image. Then the mid to high frequencies are summed to give a focus index as $$f_z = \sum_{v=v_1}^{v_2} \sum_y w_v f_{y,v} \quad (13)$$

with $$f_{y,v} = \left|\sum_x i(x, y) e^{-\frac{2\pi i}{N} xv}\right|^2 \quad (14)$$

which is the power spectrum of each line of the image along one dimension. N is the number of pixels in the x dimension and $w_v$ is the weighting used for each frequency v (in this research $w_v$=1 for all v.

The frequencies used in the sum are selected based upon two criteria: 1) The focus function should only have one strong peak and 2) The mathematically determined focus should agree with the best focus determined by eye. The power weighted averaging is then applied as in Eq. 11. This new technique allows determination of appropriate filter conditions rapidly for different samples, objectives, magnifications, wavelengths and pixel sizes of various cameras. This is especially important when a change in objective, camera or relay lens magnification results in a different sampling rate relative to the Nyquist frequency.

In order to compare the focus index of different colors, a through focus z-series is used for calibration. This gives the full focus function curves for each color. In order to transform the curves so they each have the same scale (i.e. minimum at zero and maximum at 1), each focus index value is shifted by subtracting the minimum value and then scaled by dividing by the max-min value. This normalizes each focus index. For example, calibrations were performed at different wavelengths (450, 520, and 600 nm). These three wavelengths' shifts and scales were then applied to the focus indices measured in subsequent fields where only 3 physical z-positions were imaged, so the full through focus information may not be available. For a given color, the focus index for a specific z-position of the sample is related to the focus index of another color via their respective through focus f(z) function measurements (see, e.g., FIGS. 40 and 47 for example focus function curves). The normalized focus function curves plotted in FIG. 47 required both a shift to set the minimum of the curve at 0 and a scale to set the peak at 1 of the collected raw $f_r(z)$. This is implemented as $$f(z) = \frac{f_r(z) - \min(f_r(z))}{\max(f_r(z)) - \min(f_r(z))} \quad (15)$$

The shift is the subtraction of the min and the scale is division by the max minus min. The shift and scale for different colors can have largely different values, thus without some form of calibration, a larger focus index value at a given sample z position for one color does not necessarily imply it is in better focus than another color. To calibrate for a multi-field scan, a full through focus function curve is acquired for the three wavelengths used in the scan at the first field. Then the shift and scale from these curves are applied to the focus indices for the corresponding wavelengths in all subsequent fields. Similarly, the calibration also serves to determine the relative focal shift of the different colors. This calibration is based on three assumptions: 1) the content of each field is comparable to the calibration field, 2) the image content for the different wavelength is proportional to the number of cells being imaged, and 3) the shape of the focus function curves for the different wavelengths are similar. All three of these conditions were met for the samples imaged here.

Autofocus experiments were carried out over 1,012 microscope image fields of view. The images were scanned automatically and autofocus was repeated on each field to calculate the SD as a measure of autofocus performance. The sample was NIH 3T3 cells grown on a coverslip. Wavelengths of 450, 520, and 600 nm were used in the scan. The best focus for each wavelength was ~2.25 um apart. The sample was imaged at 3 different axial positions separated by ~0.75 um. This gave a total search range of 6.0 um. From the focus indices determined for each color at each axial position, a composite focus function was created and best focus was calculated. This was repeated 20× for each field. The results for a 3-CCD color camera were: Scan 1) combined SD of 100 nm (removal of 8 outliers reduced the SD to 57.8 nm) and Scan 2) combined SD of 165 nm (removal of 3 outliers reduced the SD to 66.0 nm). Outliers can be caused by clumps of cells, empty fields of view and thick debris such as dust and lint on the specimen. The results for a 3-color single chip Bayer array camera were a combined SD of 176 nm (removal of 10 outliers SD reduced the SD to 49.6 nm).

For 3-D image processing, the small magnification error produced by the differences in focal planes can be corrected. In the foregoing image splitting module, additional magnification correction optics were developed to correct this error. The new design with the 3-chip CCD technology can be corrected by using a standard zoom lens with a C-mount adapter in front of each 3-chip camera. Magnification differences between images in the same camera can be digitally corrected by the host computer. The information about the necessary magnification correction can be obtained, for instance, by a previously carried out calibration through the use of a micrometer slide. The calibration performed using Eq. 15 also corrects for differences in magnification between the various focal planes.

In spite of some image degradation, it was shown that the imaging system is capable of obtaining three sharp, almost matching 2-D images simultaneously by focusing on different object planes. Since an axial difference between those object planes is demonstrated, the setup can be used either for focus search or to build up data for 3-D imaging.

The new method, presented in this study, of using 3-chip CCD cameras in combination with the characteristics of chromatic aberrations allows for simultaneous multiplanar image acquisition and on-the-fly autofocusing. It is capable of producing three focal planes per RGB camera, and for three RGB cameras, nine channels, and thus nine object planes. Nevertheless, there are some improvements which can be implemented to increase the imaging performance.

1. Enhance light efficiency: Choosing nonpolarizing glass samples, preferably antireflection coated, for controlling the chromatic aberration will increase light efficiency.

2. Inserting a glass element decreased resolution probably by increasing all of the Seidel aberrations, most particularly spherical aberration. If needed, the spherical aberration induced at each color can be decreased by using several planar elements placed in different positions in the optical system, with each element composed of a particular glass with different refractive indices and Abbe numbers.

3. An element with parallel planar surfaces can act as an etalon and create interference patterns and ghost images, which can be reduced by using slight wedge angles (perhaps one to five degrees).

4. Change of axial sampling distances on-line: The sampling of thick specimens for 3-D imaging requires a particular set of axial sampling distances. The axial sampling distances of the volume-camera can be changed by changing the glass sample within the optical light path. In later applications this change can be realized on-line by a filter wheel which incorporates glass samples of various thicknesses and indices of refraction. Since the magnification of the entire system is also changed by a coplanar plate, the specimen has to be refocused by axially moving the specimen, microscope objective, CCD or another optical component.

5. Multi-filter wheel: A filter wheel can hold just a specific number of glass samples. Thus, the possibilities to adjust the object planes within the specimen space are limited. Here, an additional filter wheel which rotates above the other one can bear further glass samples and expands the number of glass combinations and thus of possible z-positions, too.

6. Conclusion: The experiments showed that the differences in focus due to chromatic aberration are comparable to those commonly used for axial sampling used in previous tests of autofocus precision (0.1-0.24 μm) with the same objective (20×, 0.75 NA). (Bravo-Zanoguera, M., Massenbach, B., Kellner, A. & Price, J. High-performance autofocus circuit for biological microscopy. *Review of Scientific Instruments* 69, 3966-3977 (1998); Price, J. H. & Gough, D. A. Comparison of phase-contrast and fluorescence digital autofocus for scanning microscopy. *Cytometry* 16, 283-297 (1994)). Inserting coplanar glass samples into the light path of the microscope can be used to alter amount of chromatic aberration and thus change the axial differences between the respective R–G–B focal planes. And various combinations of relay lenses can be used to alter chromatic aberration to produce the needed distances between focal planes. The simplified optics that split the light to measure three different focal planes using commercially available digital cameras will speed autofocus (by reducing the number of mechanical repositioning movements from 9 to 3) in conventional (incremental) scanning while achieving similar precision (as measured by SD), it will simplify the optics for on-the-fly autofocus in continuous scanning, and may enable fast 3-D imaging.

Taking advantage of chromatic aberration to obtain images from different foci depends on the presence of the expected wavelengths in the light coming from the specimen. With transmitted or reflected white light, the sample shouldn't absorb a color to the point of compromising the sharpness measurement. Absorption will not be a problem for unstained samples (where image contrast is generated via, e.g., phase contrast (Bravo-Zanoguera, M., Massenbach, B., Kellner, A. & Price, J. High-performance autofocus circuit for biological microscopy. *Review of Scientific Instruments* 69, 3966-3977 (1998); Price; J. H. & Gough, D. A. Comparison of phase-contrast and fluorescence digital autofocus for scanning microscopy. *Cytometry* 16, 283-297 (1994)), DIC (Shen, F., Hodgson, L., Price, J. H. & Hahn, K. M. Digital differential interference contrast autofocus for high-resolution oil-immersion microscopy. *Cytometry A* 73, 658-666 (2008)), or reflected epi-illumination. Tissues stained with absorbent color dyes (e.g., immunohistochemical stains) could alter the relative intensities of the chosen wavelengths. While the typically broad spectral absorbance curves of these dyes are unlikely to completely block any one wavelength, it may be useful to perform calibration to alter the relative camera gain or light source intensity for each wavelength. For fluorescence, the sample can be stained with the appropriate dyes or autofocus can first be performed using transmitted or reflected white light.

The new method of multiplanar image acquisition is achieved by using digital RGB cameras in combination with the characteristics of chromatic aberrations. Since chromatic aberration occurs in any optical system, or can be made to occur if the system is highly corrected, multiple object planes will be generated within the specimen space. In the measurements described above, three of those object planes correspond to three wavelengths which, in turn, can be acquired each by one of the three CCDs. Thus, the three CCDs of the camera are able to acquire three object planes simultaneously. The goal of this study was to also use the characteristics of chromatic aberration to displace those object planes with respect to each other. Here, a coplanar piece of glass induces additional chromatic aberration and influences the three wavelengths which form the object planes. The distances between the object planes determine the axial sampling rate of the multiplanar imaging system. The optimal spacing between the object planes and the search range for tracking focus is determined by the variation of the slide surface and the depth of field of the microscope objective. Varying the thickness and index of refraction of the glass sample enables distances between the object planes within the specimen space to be tuned. The addition of a planar glass element in the diverging (or converging) beam path of the optical system adds small amounts of chromatic aberration. The addition of a dispersive element may create larger amounts of chromatic aberration. The amount of chromatic aberration can thus be controlled by changing the thickness of the glass element, choosing the appropriate glass with a particular refractive index and Abbe number (dispersion), changing the characteristics of the relay lenses, and choosing the appropriate wavelengths.

The chromatic aberration is also apparent in single-chip RGB cameras. They are much cheaper. Since they acquire different wavelengths of light, they also show differences in focus.

Use of RGB camera technology in combination with chromatic aberrations provides some advantages and is capable of replacing the prior art image-splitting module. The RGB camera is an off-the-shelf component that shows a more robust opto-mechanical design than the image splitting system with its separate TDI cameras. An RGB camera represents a simplified but precise replacement of three single TDI cameras of the image-splitting module for continuous scanning.

The results show that an automated scanning cytometry system is in fact capable of using chromatic aberration to acquire multiplanar images simultaneously. It provides almost identical images, which is especially important for 3-D imaging and autofocus. Since a three port microscope is able to carry three of the 3-chip CCD cameras, a system can be designed that is capable of acquiring 2-D images of nine object planes simultaneously. It is also shown that induced chromatic aberration changes the distances between the object planes, which are in the same range as those commonly chosen to perform autofocus. The distance between the object planes shows an almost linear correlation to the thickness of the inserted glass samples, which, in turn, is especially helpful for later implementation of this new technology.

The scope of the novel multiplanar image acquisition system and method using chromatic aberration described and illustrated herein may suitably comprise, consist of, or consist essentially of the elements and procedures herein described. The novel multiplanar image acquisition system and method using chromatic aberration disclosed and illustrated herein may suitably be practiced in the absence of any element which is not specifically disclosed in the specification, illustrated in the drawings, and/or exemplified in the embodiments of this application. Moreover, although the novel multiplanar image acquisition system and method using chromatic aberration have been described with reference to certain embodiments, it should be understood that various modifications can be made without departing from the principles described and illustrated herein. Accordingly, the scope of protection to be accorded to the novel multiplanar image acquisition system and method using chromatic aberration is limited only by the following claims.

The invention claimed is:

1. A microscope system, comprising:
   a microscope with an imaging lens, an objective, and a stage for supporting a specimen;
   an image sensor;
   an optical path between the image sensor and the objective, in which the imaging lens is located between the image sensor and the objective; and,
   an optically transmissive element positioned in the optical path between the image sensor and the imaging lens to produce a plurality of object planes simultaneously along an optical axis of the objective that extends into a specimen space near the stage, each of the object planes associated with a respective color of a plurality of colors.

2. The microscope system of claim 1, wherein an image is produced via reflected dark field imaging of the specimen.

3. The microscope system of claim 1, wherein the optically transmissive element comprises a glass element.

4. The microscope of system of claim 3, wherein the optically transmissive element comprises a relay lens.

5. The microscope system of claim 3, wherein the image sensor comprises a charge-coupled device (CCD).

6. The microscope system of claim 5, wherein the glass element has an index of refraction in a range from about 1.518 to about 1.855 and has a thickness in a range of about 1.00 millimeter to about 12.20 millimeters.

7. The microscope system of claim 5, wherein the object planes are associated at least with blue, green, and red.

8. The microscope system of claim 3, wherein the image sensor comprises a Bayer filter chip.

9. The microscope system of claim 3, wherein the plurality of colors include at least blue, green, and red and the image sensor is at least one charge-coupled device (CCD) camera.

10. The microscope system of claim 1, further including an objective position controller having an output to position the objective and a focus circuit responsive to a degree of focus in an object plane of the plurality of object planes and having an output to cause the objective position controller to focus the objective at the object plane.

11. A cytometry system, comprising:
a microscope with an imaging lens, a scanning stage for supporting a specimen space, and an objective with an optical axis extending through the image space;
an image sensor;
an optical path between the image sensor and the objective, in which the imaging lens is located between the image sensor and the objective;
an optically transmissive element positioned in the optical path between the image sensor and the imaging lens to introduce chromatic aberration in the optical path that produces a plurality of object planes along an optical axis of the objective, each object plane associated with a respective color of a plurality of colors; and,
an autofocus circuit coupled to the image sensor and to the objective for determining a degree of focus at object planes sensed by the image sensor in the plurality of object planes and focusing the objective at an object plane having a degree of focus better than the degree of focus of another object plane sensed by the image sensor.

12. The cytometry system of claim 11, wherein the optically transmissive element comprises a glass element.

13. The cytometry system of claim 12, wherein the image sensor comprises a charge-coupled device (CCD).

14. The cytometry system of claim 13, wherein the glass element has an index of refraction in a range from about 1.518 to about 1.855 and has a thickness in a range of about 1.00 millimeter to about 12.20 millimeters.

15. The cytometry system of claim 13, wherein the object planes are associated at least with blue, green, and red.

16. The microscope system of claim 12, wherein the plurality of colors include at least blue, green, and red and the image sensor is at least one charge-coupled device (CCD) camera.

17. A microscope system, comprising:
a microscope with an imaging lens, an objective, and a stage for supporting a specimen;
an imaging device capable of acquiring images in at least two different colors simultaneously;
an optical path between the imaging device and the objective, in which the imaging lens is located between the imaging device and the objective; and,
a calibration system for determining axial differences in positions between focal planes of respective grayscale images making up a color image acquired by the imaging device.

18. The microscope system of claim 17, further including an autofocus system for calculating a best focus position of the imaging lens based on at least two color images acquired at different focal planes by the imaging device, and moving the lens to the best focus position.

19. The microscope system of claim 17, further including means for constructing a three-dimensional (3D) image using grayscale images of a color image acquired by the imaging device.

20. The microscope system of claim 17, wherein the imaging device includes a respective sensor for each of the two colors and the calibration system includes means for correcting the axial differences by adjusting a position of at least one of the sensors.

* * * * *